US 8,463,594 B2

(12) United States Patent
Au

(10) Patent No.: US 8,463,594 B2
(45) Date of Patent: Jun. 11, 2013

(54) SYSTEM AND METHOD FOR ANALYZING TEXT USING EMOTIONAL INTELLIGENCE FACTORS

(75) Inventor: Lawrence Au, Vienna, VA (US)

(73) Assignee: Sauriel LLC, Vienna, VA (US)

( * ) Notice: Subject to any disclaimer, the term of this patent is extended or adjusted under 35 U.S.C. 154(b) by 728 days.

(21) Appl. No.: 12/382,754

(22) Filed: Mar. 23, 2009

(65) Prior Publication Data

US 2009/0248399 A1    Oct. 1, 2009

Related U.S. Application Data

(60) Provisional application No. 61/064,722, filed on Mar. 21, 2008.

(51) Int. Cl.
*G06F 17/20* (2006.01)
*G06F 17/27* (2006.01)
*G10L 15/26* (2006.01)

(52) U.S. Cl.
USPC ............. 704/9; 704/1; 704/235; 715/256

(58) Field of Classification Search
None
See application file for complete search history.

(56) References Cited

U.S. PATENT DOCUMENTS

| | | | |
|---|---|---|---|
| 6,061,675 A * | 5/2000 | Wical | 706/45 |
| 6,105,046 A * | 8/2000 | Greenfield et al. | 715/207 |
| 6,941,302 B1 * | 9/2005 | Suchter | 1/1 |
| 6,961,692 B1 * | 11/2005 | Polanyi et al. | 704/9 |
| 7,363,214 B2 * | 4/2008 | Musgrove et al. | 704/9 |
| 7,603,268 B2 * | 10/2009 | Volcani et al. | 704/10 |
| 7,796,937 B2 * | 9/2010 | Burstein et al. | 434/353 |
| 8,024,173 B1 * | 9/2011 | Kinder | 704/1 |
| 2007/0143236 A1 * | 6/2007 | Huelsbergen et al. | 706/20 |
| 2008/0249764 A1 * | 10/2008 | Huang et al. | 704/9 |
| 2009/0216524 A1 * | 8/2009 | Skubacz et al. | 704/9 |

* cited by examiner

*Primary Examiner* — Paras D Shah
(74) *Attorney, Agent, or Firm* — Arent Fox LLP

(57) ABSTRACT

A system, method and computer program products for facilitating the automated reading, disambiguation, analysis, indexing, retrieval and scoring of text by utilizing emotional intelligence-based factors. Text quality is scored based upon character development, rhythm, per-page quality, gaps, and climaxes, among other factors. The scores may be standardized by subtracting the population mean from an individual raw score and then dividing the difference by the population standard deviation.

19 Claims, 103 Drawing Sheets

Character To Chromo-Num Table 200

| character | Chromo-Num |
|---|---|
| a | 1 |
| b | 2 |
| c | 3 |
| d | 4 |
| e | 5 |
| f | 8 |
| g | 3 |
| h | 5 |
| i | 1 |
| j | 1 |
| k | 2 |
| l | 3 |
| m | 4 |
| n | 5 |
| o | 7 |
| p | 8 |
| q | 1 |
| r | 2 |
| s | 3 |
| t | 4 |
| u | 6 |
| v | 6 |
| w | 6 |
| x | 5 |
| y | 1 |
| z | 7 |

FIG. 2

Gene-num Tuple to Literary DNA Mapping Table Figures 500

| Gene-num A | Category | FIGURE Numbers |
|---|---|---|
| 0 | get it? | FIG. 6, FIG. 7 |
| 1 | ah yes | FIG. 8, FIG. 9 |
| 2 | hmmm | FIG. 10, FIG. 11 |
| 3 | idealism | FIG. 12, FIG. 13 |
| 4 | aha | FIG. 14, FIG. 15 |
| 5 | message | FIG. 16, FIG. 17 |
| 6 | feeble unity | FIG. 18, FIG. 19 |
| 7 | mild allure | FIG. 20, FIG. 21 |
| 8 | wisdom | FIG. 22, FIG. 23 |
| 9 | idea of courage | FIG. 24, FIG. 25 |
| 10 | idea of respect | FIG. 26, FIG. 27 |
| 11 | detail | FIG. 28, FIG. 29 |
| 12 | danger | FIG. 30, FIG. 31 |
| 13 | turnaround | FIG. 32 |
| 14 | oh my | FIG. 33 |
| 15 | yeah | FIG. 34 |
| 16 | calamity | FIG. 35 |
| 17 | ideal | FIG. 36 |
| 18 | oops | FIG. 37 |
| 19 | success | FIG. 38 |
| 20 | holiness | FIG. 39 |
| 21 | optimism | FIG. 40 |
| 22 | evil | FIG. 41 |
| 23 | help | FIG. 42 |
| 24 | reputation | FIG. 43 |
| 25 | discernment | FIG. 44 |
| 26 | altruism | FIG. 45 |
| 27 | bravado | FIG. 45 |
| 28 | betrayal | FIG. 46 |
| 29 | torture | FIG. 46 |
| 30 | personal truth | N/A |
| 31 | private truth | N/A |
| 32 | charisma | N/A |
| 33 | luck | N/A |

FIG. 5

"get it?" Gene-num-a = 0 Gene-num-b 0 to 25 Literary DNA Mapping Table

| Gene-num-b | Literary DNA | Level | Pos | Neg |
|---|---|---|---|---|
| 0 | space | 1 | 0 | 0 |
| 1 | pausing | 1 | 0 | 0 |
| 2 | hey | 1 | 0 | 0 |
| 3 | closure | 2 | 1 | 0 |
| 4 | amazement | 2 | 2 | 0 |
| 5 | confirmation | 2 | 1 | 0 |
| 6 | apparition | 1 | 1 | 1 |
| 7 | familiarity | 1 | 1 | 0 |
| 8 | convergence | 2 | 1 | 0 |
| 9 | nascent courage | 2 | 2 | 0 |
| 10 | need for atttention | 2 | 0 | 1 |
| 11 | pay attention | 1 | 0 | 1 |
| 12 | cautious check | 1 | 1 | 2 |
| 13 | discovery | 2 | 2 | 1 |
| 14 | realization | 1 | 1 | 1 |
| 15 | naked eloquence | 1 | 2 | 0 |
| 16 | shock | 1 | 0 | 2 |
| 17 | getting intense | 2 | 1 | 1 |
| 18 | sinking in | 1 | 1 | 1 |
| 19 | arrival | 1 | 1 | 0 |
| 20 | destiny | 3 | 2 | 0 |
| 21 | awe | 3 | 2 | 0 |
| 22 | arousing | 1 | 1 | 2 |
| 23 | getting helped | 1 | 2 | 0 |
| 24 | reason | 2 | 2 | 0 |
| 25 | catchy discernment | 1 | 1 | 1 |

FIG. 6

"get it?" Gene-num-a = 0 Gene-num-b 26 to 50 Literary DNA Mapping Table

| Gene-num-b | Literary DNA | Level | Pos | Neg |
|---|---|---|---|---|
| 26 | need for absolution | 3 | 1 | 1 |
| 27 | potential courage | 3 | 2 | 0 |
| 28 | potential betrayal | 3 | 0 | 2 |
| 29 | discomfort | 3 | 0 | 2 |
| 30 | personal opinion | 3 | 1 | 0 |
| 31 | private opinion | 3 | 1 | 0 |
| 32 | need for self-reliance | 2 | 1 | 1 |
| 33 | need for luck | 3 | 1 | 1 |
| 34 | catchy discernment | 1 | 1 | 1 |
| 35 | need for absolution | 3 | 1 | 1 |
| 36 | potential courage | 3 | 2 | 0 |
| 38 | discomfort | 3 | 0 | 2 |
| 40 | private opinion | 3 | 1 | 0 |
| 41 | need for self-reliance | 2 | 1 | 1 |
| 42 | reason | 2 | 2 | 0 |
| 44 | need for absolution | 3 | 1 | 1 |
| 45 | potential courage | 3 | 2 | 0 |
| 47 | discomfort | 3 | 0 | 2 |
| 48 | personal opinion | 3 | 1 | 0 |
| 49 | private opinion | 3 | 1 | 0 |
| 50 | need for self-reliance | 2 | 1 | 1 |

FIG. 7

"ah yes" Gene-num-a = 1 Gene-num-b 1 to 25 Literary DNA Mapping Table

| Gene-num-b | Literary DNA | Level | Pos | Neg |
|---|---|---|---|---|
| 1 | general context | 1 | 1 | 0 |
| 2 | vaguely interesting | 1 | 1 | 0 |
| 3 | needing confirmation | 2 | 2 | 1 |
| 4 | surprising shift | 1 | 3 | 1 |
| 5 | reaching for meaning | 2 | 2 | 1 |
| 6 | trouble | 2 | 0 | 2 |
| 7 | desire | 1 | 2 | 1 |
| 8 | protectiveness | 2 | 2 | 1 |
| 9 | confidence | 1 | 3 | 0 |
| 10 | politeness | 1 | 2 | 1 |
| 11 | double checking | 1 | 1 | 1 |
| 12 | handling danger | 1 | 2 | 2 |
| 13 | handling difficulty | 1 | 2 | 2 |
| 14 | handling challenge | 1 | 2 | 2 |
| 15 | oddly fitting | 1 | 2 | 0 |
| 16 | impending | 1 | 1 | 2 |
| 17 | emerging character | 2 | 3 | 0 |
| 18 | politeness amid stress | 2 | 2 | 1 |
| 19 | satisfying a need | 2 | 3 | 1 |
| 20 | shrewdness | 2 | 3 | 0 |
| 21 | cheekiness | 2 | 3 | 0 |
| 22 | adjustment in | 1 | 1 | 2 |
| 23 | assistance | 1 | 3 | 0 |
| 24 | dealing with character | 2 | 3 | 1 |
| 25 | creative thinking | 2 | 2 | 1 |

FIG. 8

"ah yes" Gene-num-a = 1 Gene-num-b 26 to 50 Literary DNA Mapping Table

| Gene-num-b | Literary DNA | Level | Pos | Neg |
|---|---|---|---|---|
| 26 | considering limits | 2 | 2 | 1 |
| 27 | edge of trust | 2 | 3 | 1 |
| 28 | basis of betrayal | 2 | 1 | 2 |
| 29 | handling discomfort | 2 | 1 | 2 |
| 30 | personal choice | 2 | 2 | 0 |
| 32 | creative charisma | 2 | 2 | 0 |
| 34 | creative thinking | 2 | 2 | 1 |
| 35 | considering limits | 2 | 2 | 1 |
| 36 | edge of trust | 2 | 3 | 1 |
| 38 | handling discomfort | 2 | 1 | 2 |
| 41 | creative charisma | 2 | 2 | 0 |
| 42 | dealing with character | 2 | 3 | 1 |
| 44 | considering limits | 2 | 2 | 1 |
| 45 | edge of trust | 2 | 3 | 1 |
| 47 | handling discomfort | 2 | 1 | 2 |
| 48 | personal choice | 2 | 2 | 0 |
| 50 | creative charisma | 2 | 2 | 0 |

FIG. 9

"hmmm" Gene-num-a = 2 Gene-num-b 2 to 25 Literary DNA Mapping Table

| Gene-num-b | Literary DNA | Level | Pos | Neg |
| --- | --- | --- | --- | --- |
| 2 | dreaminess | 1 | 2 | 0 |
| 3 | dreamy ideal | 2 | 3 | 0 |
| 4 | dreamy realization | 1 | 3 | 0 |
| 5 | dreamy explanation | 1 | 2 | 0 |
| 6 | tentative perception | 1 | 2 | 1 |
| 7 | preferred belief | 1 | 2 | 0 |
| 8 | sensitivity to truth | 1 | 2 | 0 |
| 9 | sensitivity to situation | 1 | 3 | 0 |
| 10 | respecting sensitivity | 3 | 2 | 1 |
| 11 | significance | 3 | 1 | 1 |
| 12 | ominous | 1 | 1 | 3 |
| 13 | immanence | 3 | 2 | 2 |
| 14 | shocking dream | 2 | 2 | 2 |
| 15 | fantastic | 1 | 2 | 0 |
| 16 | sense of upheaval | 2 | 1 | 3 |
| 17 | sensitivity | 1 | 3 | 0 |
| 18 | conflict | 1 | 1 | 2 |
| 19 | dreamy | 1 | 3 | 0 |
| 20 | a clarion call | 3 | 3 | 0 |
| 21 | optimistic tone | 2 | 3 | 0 |
| 22 | foreboding | 1 | 1 | 2 |
| 23 | delicate need | 2 | 3 | 0 |
| 24 | memorable | 1 | 3 | 0 |
| 25 | sensitivity to opinions | 1 | 2 | 1 |

FIG. 10

"hmmm" Gene-num-a = 2 Gene-num-b 26 to 50 Literary DNA Mapping Table

| Gene-num-b | Literary DNA | Level | Pos | Neg |
|---|---|---|---|---|
| 26 | murky satisfaction | 2 | 2 | 1 |
| 27 | enchanted dreaming | 3 | 3 | 0 |
| 28 | sense of loss | 2 | 1 | 2 |
| 29 | sense of suffering | 2 | 1 | 2 |
| 30 | personal fantasy | 2 | 2 | 0 |
| 32 | sensitivity to | 2 | 2 | 0 |
| 34 | sensitivity to opinions | 1 | 2 | 1 |
| 35 | murky satisfaction | 2 | 2 | 1 |
| 36 | enchanted dreaming | 3 | 3 | 0 |
| 38 | sense of suffering | 2 | 1 | 2 |
| 41 | sensitivity to | 2 | 2 | 0 |
| 42 | memorable | 1 | 3 | 0 |
| 44 | murky satisfaction | 2 | 2 | 1 |
| 45 | enchanted dreaming | 3 | 3 | 0 |
| 47 | sense of suffering | 2 | 1 | 2 |
| 48 | personal fantasy | 2 | 2 | 0 |
| 50 | sensitivity to | 2 | 2 | 0 |

FIG. 11

"idealism" Gene-num-a = 3 Gene-num-b 3 to 25 Literary DNA Mapping Table

| Gene-num-b | Literary DNA | Level | Pos | Neg |
|---|---|---|---|---|
| 3 | true optimism | 2 | 4 | 0 |
| 4 | basis for belief | 2 | 4 | 0 |
| 5 | need for ideal | 3 | 2 | 1 |
| 6 | shakiness | 2 | 2 | 2 |
| 7 | explanation | 1 | 3 | 0 |
| 8 | soulful expectation | 3 | 3 | 0 |
| 9 | courageous ideal | 3 | 4 | 0 |
| 10 | respectful idea | 2 | 3 | 1 |
| 11 | issue of | 2 | 2 | 1 |
| 12 | dangerous ideal | 3 | 1 | 3 |
| 13 | provocative | 2 | 3 | 1 |
| 14 | challenging ideal | 3 | 2 | 2 |
| 15 | slogan | 1 | 1 | 1 |
| 16 | desire for upheaval | 3 | 2 | 2 |
| 17 | belief in an ideal | 1 | 4 | 0 |
| 18 | surprising detail | 1 | 3 | 1 |
| 19 | clarity | 1 | 4 | 0 |
| 20 | spiritual ideal | 3 | 4 | 0 |
| 21 | blind optimism | 3 | 1 | 2 |
| 22 | implication | 3 | 2 | 2 |
| 23 | working an idea | 3 | 2 | 1 |
| 24 | basis of | 3 | 2 | 1 |
| 25 | focusing | 3 | 2 | 1 |

FIG. 12

"idealism" Gene-num-a = 3 Gene-num-b 26 to 49 Literary DNA Mapping Table

| Gene-num-b | Literary DNA | Level | Pos | Neg |
|---|---|---|---|---|
| 26 | a beginning | 2 | 3 | 1 |
| 27 | basis for courage | 3 | 4 | 0 |
| 28 | misplaced ideal | 3 | 1 | 3 |
| 29 | basis for suffering | 3 | 1 | 3 |
| 30 | personally significant | 1 | 3 | 0 |
| 31 | privately significant | 1 | 3 | 0 |
| 34 | focusing | 3 | 2 | 1 |
| 35 | a beginning | 2 | 3 | 1 |
| 36 | basis for courage | 3 | 4 | 0 |
| 38 | basis for suffering | 3 | 1 | 3 |
| 40 | privately significant | 1 | 3 | 0 |
| 42 | basis of | 3 | 2 | 1 |
| 44 | a beginning | 2 | 3 | 1 |
| 45 | basis for courage | 3 | 4 | 0 |
| 47 | basis for suffering | 3 | 1 | 3 |
| 48 | personally significant | 1 | 3 | 0 |
| 49 | privately significant | 1 | 3 | 0 |

FIG. 13

"aha" Gene-num-a = 4 Gene-num-b 4 to 25 Literary DNA Mapping Table

| Gene-num-b | Literary DNA | Level | Pos | Neg |
|---|---|---|---|---|
| 4 | steeling oneself | 1 | 4 | 0 |
| 5 | hint about handling | 1 | 2 | 1 |
| 6 | an open question | 2 | 3 | 1 |
| 7 | omen | 2 | 3 | 1 |
| 8 | paying close attention | 1 | 1 | 0 |
| 9 | crucial courage | 2 | 3 | 1 |
| 10 | respecting context | 2 | 2 | 1 |
| 11 | tough detail | 2 | 1 | 1 |
| 12 | inventive bravery | 2 | 3 | 1 |
| 13 | turning point | 2 | 2 | 1 |
| 14 | crucial challenge | 2 | 1 | 3 |
| 15 | caught by surprise | 2 | 1 | 3 |
| 16 | surprising upheaval | 2 | 1 | 3 |
| 17 | rising in surprise | 2 | 4 | 0 |
| 18 | stoicism | 2 | 3 | 1 |
| 19 | completion | 2 | 3 | 0 |
| 20 | crucial destiny | 3 | 3 | 1 |
| 21 | persistence | 2 | 2 | 1 |
| 22 | concern | 2 | 1 | 1 |
| 23 | watch out | 1 | 1 | 1 |
| 24 | characterization | 2 | 2 | 0 |
| 25 | noticing | 2 | 2 | 1 |

FIG. 14

"aha" Gene-num-a = 4 Gene-num-b 26 to 49 Literary DNA Mapping Table

| Gene-num-b | Literary DNA | Level | Pos | Neg |
|---|---|---|---|---|
| 26 | explanatory mood | 2 | 2 | 1 |
| 27 | humility | 2 | 2 | 0 |
| 28 | suspicious thinking | 2 | 1 | 3 |
| 29 | personal thought | 2 | 1 | 1 |
| 30 | thinking of suffering | 2 | 1 | 3 |
| 31 | private realization | 2 | 2 | 0 |
| 33 | lucky freedom | 2 | 4 | 0 |
| 34 | noticing | 2 | 2 | 1 |
| 35 | explanatory mood | 2 | 2 | 1 |
| 36 | humility | 2 | 2 | 0 |
| 38 | personal thought | 2 | 1 | 1 |
| 40 | private realization | 2 | 2 | 0 |
| 42 | characterization | 2 | 2 | 0 |
| 44 | explanatory mood | 2 | 2 | 1 |
| 45 | humility | 2 | 2 | 0 |
| 47 | personal thought | 2 | 1 | 1 |
| 48 | thinking of suffering | 2 | 1 | 3 |
| 49 | private realization | 2 | 2 | 0 |

FIG. 15

"message" Gene-num-a = 5 Gene-num-b 5 to 25 Literary DNA Mapping Table

| Gene-num-b | Literary DNA | Level | Pos | Neg |
|---|---|---|---|---|
| 5 | stream of | 2 | 0 | 0 |
| 6 | uncertainty | 1 | 1 | 2 |
| 7 | elements of allure | 2 | 1 | 0 |
| 8 | points of view | 2 | 2 | 0 |
| 9 | need for courage | 2 | 3 | 1 |
| 10 | respectful description | 1 | 1 | 0 |
| 11 | yakety-yak | 1 | 0 | 0 |
| 12 | unsettling | 1 | 0 | 2 |
| 13 | a coming change | 1 | 1 | 1 |
| 14 | challenging concern | 1 | 1 | 2 |
| 15 | telling detail | 1 | 1 | 2 |
| 16 | a warning | 2 | 1 | 3 |
| 17 | frame of desire | 2 | 2 | 0 |
| 18 | needing consolation | 2 | 0 | 3 |
| 19 | optimism | 2 | 3 | 0 |
| 20 | inspiration | 3 | 3 | 0 |
| 21 | hopeful detail | 3 | 2 | 0 |
| 22 | risky detail | 2 | 0 | 2 |
| 23 | possible help | 2 | 1 | 0 |
| 24 | catchy reputation | 2 | 3 | 0 |
| 25 | hint about crux | 1 | 1 | 0 |

FIG.16

"message" Gene-num-a = 5 Gene-num-b 26 to 50 Literary DNA Mapping Table

| Gene-num-b | Literary DNA | Level | Pos | Neg |
|---|---|---|---|---|
| 26 | hint about oneself | 1 | 1 | 0 |
| 27 | hint about courage | 2 | 2 | 0 |
| 28 | hint about misplaced | 2 | 1 | 2 |
| 29 | hint about suffering | 2 | 1 | 2 |
| 30 | personal hint | 2 | 1 | 0 |
| 31 | hint about soul | 3 | 2 | 0 |
| 32 | persuasive message | 2 | 2 | 0 |
| 33 | wishful sentiment | 2 | 1 | 1 |
| 34 | hint about crux | 1 | 1 | 0 |
| 35 | hint about oneself | 1 | 1 | 0 |
| 36 | hint about courage | 2 | 2 | 0 |
| 38 | hint about suffering | 2 | 1 | 2 |
| 40 | hint about soul | 3 | 2 | 0 |
| 41 | persuasive message | 2 | 2 | 0 |
| 42 | catchy reputation | 2 | 3 | 0 |
| 44 | hint about oneself | 1 | 1 | 0 |
| 45 | hint about courage | 2 | 2 | 0 |
| 47 | hint about suffering | 2 | 1 | 2 |
| 48 | personal hint | 2 | 1 | 0 |
| 49 | hint about soul | 3 | 2 | 0 |
| 50 | persuasive message | 2 | 2 | 0 |

FIG. 17

"feeble unity" Gene-num-a = 6 Gene-num-b 6 to 25 Literary DNA Mapping Table

| Gene-num-b | Literary DNA | Level | Pos | Neg |
|---|---|---|---|---|
| 6 | sudden realization | 3 | 2 | 1 |
| 7 | hidden advantage | 2 | 3 | 1 |
| 8 | uncertain wisdom | 3 | 2 | 1 |
| 9 | feminine courage | 3 | 3 | 0 |
| 10 | shaky respect | 1 | 1 | 1 |
| 11 | confusion | 1 | 0 | 3 |
| 12 | painful love | 3 | 1 | 3 |
| 13 | romantic turnaround | 3 | 3 | 1 |
| 14 | holding it together | 2 | 1 | 1 |
| 15 | helplessness | 2 | 0 | 3 |
| 16 | teetering change | 2 | 0 | 2 |
| 17 | sensitivity | 2 | 2 | 0 |
| 18 | tender patience | 3 | 2 | 1 |
| 19 | in love | 3 | 3 | 0 |
| 20 | nascent desire | 3 | 3 | 0 |
| 21 | feeble optimism | 3 | 1 | 0 |
| 22 | bombastic ebullience | 2 | 0 | 2 |
| 23 | solidification | 2 | 1 | 0 |
| 24 | strangeness | 2 | 1 | 0 |
| 25 | trying to be good | 3 | 2 | 1 |

FIG. 18

"feeble unity" Gene-num-a = 6 Gene-num-b 26 to 49 Literary DNA Mapping Table

| Gene-num-b | Literary DNA | Level | Pos | Neg |
|---|---|---|---|---|
| 26 | delicate situation | 2 | 1 | 1 |
| 27 | piecing things together | 3 | 3 | 0 |
| 28 | suspicion | 3 | 0 | 3 |
| 29 | suffering | 3 | 0 | 3 |
| 30 | feeble personal truth | 3 | 1 | 0 |
| 31 | feeble private truth | 2 | 1 | 0 |
| 34 | trying to be good | 3 | 2 | 1 |
| 35 | delicate situation | 2 | 1 | 1 |
| 36 | piecing things together | 3 | 3 | 0 |
| 38 | suffering | 3 | 0 | 3 |
| 40 | feeble private truth | 2 | 1 | 0 |
| 42 | strangeness | 2 | 1 | 0 |
| 44 | delicate situation | 2 | 1 | 1 |
| 45 | piecing things together | 3 | 3 | 0 |
| 47 | suffering | 3 | 0 | 3 |
| 48 | feeble personal truth | 3 | 1 | 0 |
| 49 | feeble private truth | 2 | 1 | 0 |

FIG.19

"mild allure" Gene-num-a = 7 Gene-num-b 7 to 25 Literary DNA Mapping Table

| Gene-num-b | Literary DNA | Level | Pos | Neg |
|---|---|---|---|---|
| 7 | beautiful allure | 2 | 3 | 0 |
| 8 | catchy facts | 2 | 2 | 0 |
| 9 | catchy courage | 2 | 3 | 0 |
| 10 | respectfulness | 1 | 2 | 1 |
| 11 | prissy | 1 | 1 | 1 |
| 12 | catchy risk | 1 | 1 | 2 |
| 13 | alluring | 3 | 1 | 1 |
| 14 | alluring | 3 | 1 | 1 |
| 15 | outline of | 1 | 1 | 2 |
| 16 | alluring danger | 2 | 1 | 2 |
| 17 | alluring ideal | 2 | 2 | 0 |
| 18 | esoteric desire | 1 | 2 | 0 |
| 19 | alluring balance | 3 | 2 | 0 |
| 20 | higher power | 3 | 2 | 0 |
| 21 | faint hope | 2 | 1 | 0 |
| 22 | peeved | 1 | 1 | 2 |
| 23 | please help me | 2 | 2 | 1 |
| 24 | strangely | 2 | 3 | 0 |
| 25 | alluring | 2 | 2 | 0 |

FIG. 20

"mild allure" Gene-num-a = 7 Gene-num-b 26 to 50 Literary DNA Mapping Table

| Gene-num-b | Literary DNA | Level | Pos | Neg |
|---|---|---|---|---|
| 26 | attractive containment | 2 | 2 | 0 |
| 27 | alluring desire | 2 | 3 | 0 |
| 28 | catchy disappointment | 2 | 1 | 2 |
| 29 | allure of negativity | 2 | 1 | 2 |
| 30 | personal attraction | 2 | 1 | 0 |
| 31 | private attraction | 2 | 1 | 0 |
| 32 | mysterious allure | 2 | 3 | 0 |
| 33 | alluring originality | 2 | 3 | 0 |
| 34 | alluring discernment | 2 | 2 | 0 |
| 35 | attractive containment | 2 | 2 | 0 |
| 36 | alluring desire | 2 | 3 | 0 |
| 38 | allure of negativity | 2 | 1 | 2 |
| 40 | private attraction | 2 | 1 | 0 |
| 41 | mysterious allure | 2 | 3 | 0 |
| 42 | strangely attractive | 2 | 3 | 0 |
| 44 | attractive containment | 2 | 2 | 0 |
| 45 | alluring desire | 2 | 3 | 0 |
| 47 | allure of negativity | 2 | 1 | 2 |
| 48 | personal attraction | 2 | 1 | 0 |
| 49 | private attraction | 2 | 1 | 0 |
| 50 | mysterious allure | 2 | 3 | 0 |

FIG. 21

"wisdom" Gene-num-a = 8 Gene-num-b 8 to 25 Literary DNA Mapping Table

| Gene-num-b | Literary DNA | Level | Pos | Neg |
|---|---|---|---|---|
| 8 | beauty of | 3 | 3 | 0 |
| 9 | fortunate action | 3 | 3 | 0 |
| 10 | self- | 2 | 2 | 0 |
| 11 | discernment | 2 | 1 | 1 |
| 12 | maturity amid | 2 | 2 | 2 |
| 13 | expectation | 2 | 2 | 1 |
| 14 | equanimity | 2 | 1 | 1 |
| 15 | outline of | 3 | 1 | 0 |
| 16 | wisdom amid | 3 | 2 | 2 |
| 17 | important detail | 1 | 1 | 0 |
| 18 | handling | 2 | 1 | 1 |
| 19 | knowledge | 2 | 1 | 0 |
| 20 | mature wisdom | 3 | 2 | 0 |
| 21 | positive | 2 | 3 | 0 |
| 22 | deeper | 3 | 2 | 1 |
| 23 | understanding | 3 | 2 | 0 |
| 24 | recognition of | 3 | 1 | 1 |
| 25 | wise | 3 | 2 | 0 |

FIG. 22

"wisdom" Gene-num-a = 8 Gene-num-b 26 to 50 Literary DNA Mapping Table

| Gene-num- | Literary DNA | Level | Pos | Neg |
|---|---|---|---|---|
| 26 | inherent boundaries | 3 | 2 | 1 |
| 27 | holy inspiration | 3 | 3 | 0 |
| 28 | understanding negativity | 3 | 1 | 1 |
| 29 | understanding suffering | 3 | 2 | 2 |
| 30 | personal preference | 1 | 1 | 0 |
| 31 | private preference | 1 | 1 | 0 |
| 32 | persuasive wisdom | 1 | 2 | 0 |
| 34 | wise discernment | 3 | 2 | 0 |
| 35 | inherent boundaries | 3 | 2 | 1 |
| 36 | holy inspiration | 3 | 3 | 0 |
| 38 | understanding suffering | 3 | 2 | 2 |
| 40 | private preference | 1 | 1 | 0 |
| 41 | persuasive wisdom | 1 | 2 | 0 |
| 42 | recognition of knowledge | 3 | 1 | 1 |
| 44 | inherent boundaries | 3 | 2 | 1 |
| 45 | holy inspiration | 3 | 3 | 0 |
| 47 | understanding suffering | 3 | 2 | 2 |
| 48 | personal preference | 1 | 1 | 0 |
| 49 | private preference | 1 | 1 | 0 |
| 50 | persuasive wisdom | 1 | 2 | 0 |

FIG. 23

"idea of courage" Gene-num-a = 9 Gene-num-b 9 to 25 Literary DNA Mapping Table

| Gene-num-b | Literary DNA | Level | Pos | Neg |
|---|---|---|---|---|
| 9 | glory | 3 | 4 | 0 |
| 10 | respectfulness | 2 | 3 | 0 |
| 11 | devilishness | 1 | 1 | 3 |
| 12 | reckless thought | 1 | 0 | 4 |
| 13 | surprise | 1 | 2 | 2 |
| 14 | facing the inescapable | 1 | 2 | 1 |
| 15 | teeming activity | 1 | 1 | 0 |
| 16 | courage amid upheaval | 3 | 3 | 1 |
| 17 | courageous model | 3 | 2 | 0 |
| 18 | surprising situation | 2 | 1 | 3 |
| 19 | forcefulness | 1 | 2 | 2 |
| 20 | courageous opinion | 2 | 3 | 1 |
| 21 | hopefulness | 2 | 2 | 0 |
| 22 | risky opinion | 2 | 0 | 3 |
| 23 | encouragement | 2 | 3 | 0 |
| 24 | aggressive reputation | 2 | 3 | 1 |
| 25 | discerning courage | 2 | 3 | 0 |

FIG. 24

"idea of courage" Gene-num-a = 9 Gene-num-b 26 to 50 Literary DNA Mapping Table

| Gene-num-b | Literary DNA | Level | Pos | Neg |
|---|---|---|---|---|
| 26 | contextual detail | 1 | 0 | 0 |
| 27 | enchanted courage | 3 | 4 | 0 |
| 28 | punch-drunk courage | 3 | 1 | 2 |
| 29 | facing unpleasantness | 3 | 1 | 2 |
| 30 | personal action | 2 | 1 | 0 |
| 31 | lonely courage | 2 | 2 | 0 |
| 32 | persuasive courage | 2 | 3 | 0 |
| 33 | lucky action | 2 | 4 | 0 |
| 34 | discerning courage | 2 | 3 | 0 |
| 35 | contextual detail | 1 | 0 | 0 |
| 36 | enchanted courage | 3 | 4 | 0 |
| 38 | facing unpleasantness | 3 | 1 | 2 |
| 40 | lonely courage | 2 | 2 | 0 |
| 41 | persuasive courage | 2 | 3 | 0 |
| 42 | aggressive reputation | 2 | 3 | 1 |
| 44 | contextual detail | 1 | 0 | 0 |
| 45 | enchanted courage | 3 | 4 | 0 |
| 47 | facing unpleasantness | 3 | 1 | 2 |
| 48 | personal action | 2 | 1 | 0 |
| 49 | lonely courage | 2 | 2 | 0 |
| 50 | persuasive courage | 2 | 3 | 0 |

FIG. 25

"idea of respect" Gene-num-a = 10 Gene-num-b 10 to 25 Literary DNA Mapping Table

| Gene-num-b | Literary DNA | Level | Pos | Neg |
|---|---|---|---|---|
| 10 | angelicness | 3 | 3 | 0 |
| 11 | crucial needs | 1 | 2 | 2 |
| 12 | cautiousness | 2 | 1 | 1 |
| 13 | classic turnaround | 2 | 1 | 1 |
| 14 | simple challenge | 2 | 0 | 1 |
| 15 | outline of trickiness | 1 | 1 | 3 |
| 16 | crude pride | 2 | 2 | 2 |
| 17 | zeal | 2 | 2 | 1 |
| 18 | respect for tension | 1 | 2 | 1 |
| 19 | respecting need for success | 3 | 3 | 1 |
| 20 | burning soulfulness | 3 | 3 | 1 |
| 21 | new hope | 2 | 3 | 1 |
| 22 | selfishness | 1 | 1 | 3 |
| 23 | keeping head down | 1 | 2 | 1 |
| 24 | considering a reputation | 2 | 2 | 1 |
| 25 | respectful discernment | 2 | 2 | 0 |

FIG.26

"idea of respect" Gene-num-a = 10 Gene-num-b 26 to 50 Literary DNA Mapping Table

| Gene-num-b | Literary DNA | Level | Pos | Neg |
|---|---|---|---|---|
| 26 | responsibility | 1 | 2 | 1 |
| 27 | soulful intensity | 3 | 4 | 0 |
| 28 | impatience | 2 | 1 | 3 |
| 29 | considering suffering | 3 | 1 | 3 |
| 30 | respecting soul | 3 | 1 | 0 |
| 31 | respecting private truth | 3 | 1 | 0 |
| 32 | respectful persuasion | 3 | 2 | 0 |
| 33 | sensing luck | 3 | 1 | 0 |
| 34 | respectful discernment | 2 | 2 | 0 |
| 35 | responsibility | 1 | 2 | 1 |
| 36 | soulful intensity | 3 | 4 | 0 |
| 38 | considering suffering | 3 | 1 | 3 |
| 40 | respecting private truth | 3 | 1 | 0 |
| 41 | respectful persuasion | 3 | 2 | 0 |
| 42 | considering a reputation | 2 | 2 | 1 |
| 44 | responsibility | 1 | 2 | 1 |
| 45 | soulful intensity | 3 | 4 | 0 |
| 47 | considering suffering | 3 | 1 | 3 |
| 48 | respecting soul | 3 | 1 | 0 |
| 49 | respecting private truth | 3 | 1 | 0 |
| 50 | respectful persuasion | 3 | 2 | 0 |

FIG.27

"detail" Gene-num-a = 11 Gene-num-b 11 to 25 Literary DNA Mapping Table

| Gene-num-b | Literary DNA | Level | Pos | Neg |
|---|---|---|---|---|
| 11 | classic details | 1 | 1 | 0 |
| 12 | outline of | 1 | 0 | 3 |
| 13 | questionable | 2 | 1 | 2 |
| 14 | struggling with | 2 | 0 | 2 |
| 15 | petty | 1 | 1 | 1 |
| 16 | flood of detail | 1 | 0 | 0 |
| 17 | idolized detail | 2 | 2 | 1 |
| 18 | devilish path | 2 | 1 | 3 |
| 19 | balancing petty | 1 | 2 | 1 |
| 20 | unveiling | 3 | 3 | 1 |
| 21 | getting punchy | 1 | 1 | 2 |
| 22 | tricky details | 1 | 0 | 3 |
| 23 | grace for | 3 | 2 | 1 |
| 24 | inch-into- | 2 | 2 | 1 |
| 25 | catchy detail | 2 | 1 | 1 |

FIG.28

"detail" Gene-num-a = 11 Gene-num-b 26 to 50 Literary DNA Mapping Table

| Gene-num-b | Literary DNA | Level | Pos | Neg |
|---|---|---|---|---|
| 26 | caught in a bind | 3 | 1 | 3 |
| 27 | detail of | 1 | 2 | 1 |
| 28 | issue of trust | 3 | 1 | 2 |
| 29 | detail of suffering | 1 | 0 | 3 |
| 30 | personal detail | 1 | 1 | 0 |
| 31 | private detail | 1 | 1 | 0 |
| 32 | persuasive detail | 1 | 2 | 0 |
| 33 | detailed originality | 2 | 3 | 0 |
| 34 | catchy detail | 2 | 1 | 1 |
| 35 | caught in a bind | 3 | 1 | 3 |
| 36 | detail of | 1 | 2 | 1 |
| 38 | detail of suffering | 1 | 0 | 3 |
| 40 | private detail | 1 | 1 | 0 |
| 41 | persuasive detail | 1 | 2 | 0 |
| 42 | inch-into-limelight | 2 | 2 | 1 |
| 44 | caught in a bind | 3 | 1 | 3 |
| 45 | detail of | 1 | 2 | 1 |
| 47 | detail of suffering | 1 | 0 | 3 |
| 48 | personal detail | 1 | 1 | 0 |
| 49 | private detail | 1 | 1 | 0 |
| 50 | persuasive detail | 1 | 2 | 0 |

FIG. 29

"danger" Gene-num-a = 12 Gene-num-b 12 to 25 Literary DNA Mapping Table

| Gene-num-b | Literary DNA | Level | Pos | Neg |
|---|---|---|---|---|
| 12 | naked anxiety | 2 | 0 | 4 |
| 13 | aw-oh | 2 | 0 | 4 |
| 14 | facing surprise | 2 | 1 | 3 |
| 15 | crude overview | 1 | 1 | 1 |
| 16 | perilous upheaval | 3 | 0 | 4 |
| 17 | rising to a dangerous occasion | 3 | 2 | 2 |
| 18 | stubborn pride | 2 | 1 | 3 |
| 19 | step onto dangerous stage | 2 | 1 | 3 |
| 20 | crumbling inspiration | 3 | 1 | 1 |
| 21 | stoicism | 2 | 2 | 2 |
| 22 | undercurrent | 2 | 0 | 4 |
| 23 | near misconception | 3 | 2 | 1 |
| 24 | embarrassment | 2 | 0 | 3 |
| 25 | a risk | 2 | 1 | 3 |

FIG. 30

"danger" Gene-num-a = 12 Gene-num-b 26 to 50 Literary DNA Mapping Table

| Gene-num-b | Literary DNA | Level | Pos | Neg |
|---|---|---|---|---|
| 26 | disorientation | 2 | 0 | 2 |
| 27 | toughness | 2 | 1 | 2 |
| 28 | untrustworthy | 2 | 0 | 4 |
| 29 | risk of suffering | 2 | 0 | 4 |
| 30 | personal issue | 2 | 0 | 2 |
| 31 | delusional private truth | 2 | 0 | 2 |
| 32 | untrustworthy persuasion | 2 | 1 | 3 |
| 33 | bad luck | 2 | 0 | 4 |
| 34 | a risk | 2 | 1 | 3 |
| 35 | disorientation | 2 | 0 | 2 |
| 36 | toughness | 2 | 1 | 2 |
| 38 | risk of suffering | 2 | 0 | 4 |
| 40 | delusional private truth | 2 | 0 | 2 |
| 41 | untrustworthy persuasion | 2 | 1 | 3 |
| 42 | embarrasment | 2 | 0 | 3 |
| 44 | disorientation | 2 | 0 | 2 |
| 45 | toughness | 2 | 1 | 2 |
| 47 | risk of suffering | 2 | 0 | 4 |
| 48 | personal issue | 2 | 0 | 2 |
| 49 | delusional private truth | 2 | 0 | 2 |
| 50 | untrustworthy persuasion | 2 | 1 | 3 |

FIG. 31

"turnaround" Gene-num-a = 13 Gene-num-b 13 to 50 Literary DNA Mapping Table

| Gene-num-b | Literary DNA | Level | Pos | Neg |
| --- | --- | --- | --- | --- |
| 13 | discovering upheaval | 3 | 2 | 2 |
| 14 | tough turning point | 2 | 1 | 2 |
| 15 | outline of changes | 2 | 1 | 1 |
| 16 | impeding risk | 2 | 0 | 4 |
| 17 | coming changes | 3 | 1 | 1 |
| 18 | shift toward surprise | 2 | 1 | 1 |
| 19 | change in success | 2 | 2 | 1 |
| 20 | spiritual renewal | 3 | 3 | 1 |
| 21 | shift toward optimism | 2 | 2 | 1 |
| 22 | shift in perspective | 2 | 2 | 1 |
| 23 | classic turnaround | 2 | 2 | 1 |
| 24 | force of personality | 2 | 2 | 1 |
| 25 | influential facts | 2 | 2 | 1 |
| 26 | higher truth | 3 | 2 | 1 |
| 27 | enchanted truth | 3 | 4 | 0 |
| 28 | discovering limitation | 2 | 1 | 3 |
| 29 | painful significance | 2 | 1 | 3 |
| 30 | personal significance | 2 | 2 | 0 |
| 31 | turnaround private truth | 2 | 1 | 0 |
| 32 | turnaround persuasion | 2 | 1 | 0 |
| 33 | lucky turnaround | 2 | 3 | 0 |
| 34 | influential facts | 2 | 2 | 1 |
| 35 | higher truth | 3 | 2 | 1 |
| 36 | enchanted truth | 3 | 4 | 0 |
| 38 | painful significance | 2 | 1 | 3 |
| 40 | turnaround private truth | 2 | 1 | 0 |
| 41 | turnaround persuasion | 2 | 1 | 0 |
| 42 | force of personality | 2 | 2 | 1 |
| 44 | higher truth | 3 | 2 | 1 |
| 45 | enchanted truth | 3 | 4 | 0 |
| 47 | painful significance | 2 | 1 | 3 |
| 48 | personal significance | 2 | 2 | 0 |
| 49 | turnaround private truth | 2 | 1 | 0 |
| 50 | turnaround persuasion | 2 | 1 | 0 |

FIG.32

"oh my" Gene-num-a = 14 Gene-num-b 14 to 50 Literary DNA Mapping Table

| Gene-num-b | Literary DNA | Level | Pos | Neg |
|---|---|---|---|---|
| 14 | pure challenge | 2 | 0 | 3 |
| 15 | outline of challenge | 1 | 0 | 2 |
| 16 | rising risk | 2 | 0 | 4 |
| 17 | unfinished desires | 3 | 3 | 1 |
| 18 | test of ideal | 3 | 1 | 3 |
| 19 | challenging balance | 2 | 2 | 2 |
| 20 | shaky realization | 2 | 1 | 1 |
| 21 | shaky optimism | 2 | 1 | 1 |
| 22 | new daring | 3 | 2 | 1 |
| 23 | needing help with | 3 | 1 | 3 |
| 24 | newly in limelight | 2 | 2 | 1 |
| 25 | discerning a challenge | 2 | 1 | 2 |
| 26 | test of altruism | 3 | 2 | 2 |
| 27 | finding courage | 3 | 2 | 1 |
| 28 | challenging | 3 | 0 | 3 |
| 29 | challenging persistence | 2 | 1 | 2 |
| 30 | personal realization | 2 | 1 | 0 |
| 31 | upsetting | 2 | 0 | 3 |
| 32 | challenging | 2 | 0 | 2 |
| 33 | lucky excitement | 2 | 3 | 1 |
| 34 | discerning a challenge | 2 | 1 | 2 |
| 35 | test of altruism | 3 | 2 | 2 |
| 36 | finding courage | 3 | 2 | 1 |
| 38 | challenging persistence | 2 | 1 | 2 |
| 40 | upsetting | 2 | 0 | 3 |
| 41 | challenging | 2 | 0 | 2 |
| 42 | newly in limelight | 2 | 2 | 1 |
| 44 | test of altruism | 3 | 2 | 2 |
| 45 | finding courage | 3 | 2 | 1 |
| 47 | challenging persistence | 2 | 1 | 2 |
| 48 | personal realization | 2 | 1 | 0 |
| 49 | upsetting | 2 | 0 | 3 |
| 50 | challenging | 2 | 0 | 2 |

FIG.33

"yeah" Gene-num-a = 15 Gene-num-b 15 to 50 Literary DNA Mapping Table

| Gene-num-b | Literary DNA | Level | Pos | Neg |
|---|---|---|---|---|
| 15 | panorama | 2 | 2 | 0 |
| 16 | outline of risk | 2 | 0 | 2 |
| 17 | outline of desire | 3 | 1 | 0 |
| 18 | outline of conflict | 2 | 0 | 2 |
| 19 | suggestion of success | 1 | 1 | 0 |
| 20 | inspired eloquence | 3 | 1 | 0 |
| 21 | magical breakthrough | 1 | 3 | 0 |
| 22 | suggestion of punchiness | 2 | 0 | 1 |
| 23 | talk of success | 2 | 1 | 0 |
| 24 | suggestion of reputation | 2 | 1 | 0 |
| 25 | revealing talk | 3 | 2 | 1 |
| 26 | apparent confusion | 1 | 0 | 2 |
| 27 | eloquently enchanting | 2 | 3 | 0 |
| 28 | apparent misplaced trust | 2 | 1 | 3 |
| 29 | persistence | 1 | 1 | 2 |
| 30 | personal | 1 | 1 | 0 |
| 31 | suggestion of soul | 2 | 2 | 0 |
| 32 | suggestion of catchiness | 2 | 1 | 0 |
| 34 | revealing talk | 3 | 2 | 1 |
| 35 | apparent confusion | 1 | 0 | 2 |
| 36 | eloquently enchanting | 2 | 3 | 0 |
| 38 | persistence | 1 | 1 | 2 |
| 40 | suggestion of soul | 2 | 2 | 0 |
| 41 | suggestion of catchiness | 2 | 1 | 0 |
| 42 | suggestion of reputation | 2 | 1 | 0 |
| 44 | apparent confusion | 1 | 0 | 2 |
| 45 | eloquently enchanting | 2 | 3 | 0 |
| 47 | persistence | 1 | 1 | 2 |
| 48 | personal | 1 | 1 | 0 |
| 49 | suggestion of soul | 2 | 2 | 0 |
| 50 | suggestion of catchiness | 2 | 1 | 0 |

FIG.34

"calamity" Gene-num-a = 16 Gene-num-b 16 to 50 Literary DNA Mapping Table

| Gene-num-b | Literary DNA | Level | Pos | Neg |
| --- | --- | --- | --- | --- |
| 16 | dangerous opportunity | 2 | 1 | 3 |
| 17 | a risky step | 3 | 1 | 3 |
| 18 | anguish amid danger | 3 | 1 | 3 |
| 19 | shift towards success | 3 | 2 | 1 |
| 20 | alluring risk | 2 | 2 | 2 |
| 21 | hope amid danger | 2 | 1 | 3 |
| 22 | teetering on | 2 | 2 | 2 |
| 23 | risky view | 3 | 1 | 3 |
| 24 | attractive upheaval | 3 | 2 | 2 |
| 25 | dangerous but true | 3 | 1 | 3 |
| 26 | overreaching desire | 3 | 1 | 3 |
| 27 | enchanting revolt | 3 | 2 | 2 |
| 28 | inner flaw | 3 | 0 | 4 |
| 29 | limit of stress | 3 | 0 | 3 |
| 30 | personal trouble | 2 | 0 | 1 |
| 31 | private trouble | 2 | 0 | 1 |
| 32 | dangerous charisma | 2 | 1 | 3 |
| 34 | dangerous but true | 3 | 1 | 3 |
| 35 | overreaching desire | 3 | 1 | 3 |
| 36 | enchanting revolt | 3 | 2 | 2 |
| 38 | limit of stress | 3 | 0 | 3 |
| 40 | private trouble | 2 | 0 | 1 |
| 41 | dangerous charisma | 2 | 1 | 3 |
| 42 | attractive upheaval | 3 | 2 | 2 |
| 44 | overreaching desire | 3 | 1 | 3 |
| 45 | enchanting revolt | 3 | 2 | 2 |
| 47 | limit of stress | 3 | 0 | 3 |
| 48 | personal trouble | 2 | 0 | 1 |
| 49 | private trouble | 2 | 0 | 1 |
| 50 | dangerous charisma | 2 | 1 | 3 |

FIG.35

"ideal" Gene-num-a = 17 Gene-num-b 17 to 50 Literary DNA Mapping Table

| Gene-num-b | Literary DNA | Level | Pos | Neg |
|---|---|---|---|---|
| 17 | abstract beauty | 2 | 3 | 0 |
| 18 | risky expectation | 2 | 1 | 3 |
| 19 | approaching balance | 3 | 1 | 0 |
| 20 | underlying purpose | 3 | 2 | 0 |
| 21 | awaiting success | 2 | 2 | 0 |
| 22 | selfish ideals | 2 | 2 | 2 |
| 23 | help to rise to occasion | 2 | 4 | 0 |
| 24 | classic ideals | 2 | 3 | 0 |
| 25 | hopeful details | 3 | 3 | 1 |
| 26 | catchy underlying tension | 3 | 3 | 1 |
| 27 | assertiveness | 2 | 2 | 0 |
| 28 | mistake | 2 | 0 | 4 |
| 29 | suffering for an ideal | 2 | 1 | 3 |
| 30 | personal ideal | 2 | 1 | 0 |
| 31 | lonely ideal | 2 | 1 | 0 |
| 32 | persuasive idea | 2 | 2 | 0 |
| 33 | lucky idea | 3 | 4 | 0 |
| 34 | hopeful details | 3 | 3 | 1 |
| 35 | catchy underlying tension | 3 | 3 | 1 |
| 36 | assertiveness | 2 | 2 | 0 |
| 38 | suffering for an ideal | 2 | 1 | 3 |
| 40 | lonely ideal | 2 | 1 | 0 |
| 41 | persuasive idea | 2 | 2 | 0 |
| 42 | classic ideals | 2 | 3 | 0 |
| 44 | catchy underlying tension | 3 | 3 | 1 |
| 45 | assertiveness | 2 | 2 | 0 |
| 47 | suffering for an ideal | 2 | 1 | 3 |
| 48 | personal ideal | 2 | 1 | 0 |
| 49 | lonely ideal | 2 | 1 | 0 |
| 50 | persuasive idea | 2 | 2 | 0 |

FIG.36

"oops" Gene-num-a = 18 Gene-num-b 18 to 50 Literary DNA Mapping Table

| Gene-num-b | Literary DNA | Level | Pos | Neg |
|---|---|---|---|---|
| 18 | bitterness | 2 | 0 | 3 |
| 19 | bittersweet intensity | 2 | 1 | 3 |
| 20 | surprising new purpose | 3 | 3 | 1 |
| 21 | needed good consolation | 2 | 1 | 3 |
| 22 | surprising risk | 3 | 1 | 3 |
| 23 | yikes | 2 | 0 | 4 |
| 24 | surprise in success | 2 | 3 | 1 |
| 25 | surprising discernment | 2 | 2 | 0 |
| 26 | surprisingly extravagant | 2 | 2 | 0 |
| 27 | surprise in harmony | 3 | 3 | 1 |
| 28 | shift in trust | 3 | 1 | 2 |
| 29 | unpleasantness | 2 | 0 | 1 |
| 30 | personal conflict | 2 | 0 | 1 |
| 31 | private conflict | 2 | 0 | 1 |
| 32 | discontinuity | 2 | 0 | 1 |
| 34 | surprising discernment | 2 | 2 | 0 |
| 35 | surprisingly extravagant | 2 | 2 | 0 |
| 36 | surprise in harmony | 3 | 3 | 1 |
| 38 | unpleasantness | 2 | 0 | 1 |
| 40 | private conflict | 2 | 0 | 1 |
| 41 | discontinuity | 2 | 0 | 1 |
| 42 | surprise in success | 2 | 3 | 1 |
| 44 | surprisingly extravagant | 2 | 2 | 0 |
| 45 | surprise in harmony | 3 | 3 | 1 |
| 47 | unpleasantness | 2 | 0 | 1 |
| 48 | personal conflict | 2 | 0 | 1 |
| 49 | private conflict | 2 | 0 | 1 |
| 50 | discontinuity | 2 | 0 | 1 |

FIG.37

"success" Gene-num-a = 19 Gene-num-b 19 to 50 Literary DNA Mapping Table

| Gene-num-b | Literary DNA | Level | Pos | Neg |
|---|---|---|---|---|
| 19 | fulfillment | 3 | 3 | 0 |
| 20 | transcendence | 3 | 4 | 0 |
| 21 | complete balance | 3 | 3 | 0 |
| 22 | risky balance | 2 | 2 | 2 |
| 23 | powerful help | 3 | 3 | 0 |
| 24 | reputation and success | 3 | 3 | 0 |
| 25 | deeper truth | 3 | 3 | 0 |
| 26 | essence | 3 | 3 | 1 |
| 27 | inner truth | 3 | 4 | 0 |
| 28 | handling trust | 3 | 2 | 1 |
| 29 | incongruity | 2 | 0 | 1 |
| 30 | personal balance | 2 | 1 | 0 |
| 31 | lonely balance | 2 | 1 | 0 |
| 32 | persuasive success | 2 | 2 | 0 |
| 33 | luckiness | 2 | 2 | 0 |
| 34 | deeper truth | 3 | 3 | 0 |
| 35 | essence | 3 | 3 | 1 |
| 36 | inner truth | 3 | 4 | 0 |
| 38 | incongruity | 2 | 0 | 1 |
| 40 | lonely balance | 2 | 1 | 0 |
| 41 | persuasive success | 2 | 2 | 0 |
| 42 | reputation and success | 3 | 3 | 0 |
| 44 | essence | 3 | 3 | 1 |
| 45 | inner truth | 3 | 4 | 0 |
| 47 | incongruity | 2 | 0 | 1 |
| 48 | personal balance | 2 | 1 | 0 |
| 49 | lonely balance | 2 | 1 | 0 |
| 50 | persuasive success | 2 | 2 | 0 |

FIG.38

"holiness" Gene-num-a = 20 Gene-num-b 20 to 50 Literary DNA Mapping Table

| Gene-num-b | Literary DNA | Level | Pos | Neg |
|---|---|---|---|---|
| 20 | lovely inspiration | 3 | 4 | 0 |
| 21 | inspiration | 3 | 3 | 0 |
| 22 | risky purpose | 3 | 1 | 1 |
| 23 | soulful assistance | 3 | 4 | 0 |
| 24 | alluring inspiration | 3 | 4 | 0 |
| 25 | soulful detail | 2 | 3 | 1 |
| 26 | towards realization | 2 | 3 | 1 |
| 27 | inner strength | 3 | 4 | 0 |
| 28 | slickness | 2 | 1 | 3 |
| 29 | spiritual suffering | 2 | 0 | 4 |
| 30 | personal purpose | 2 | 2 | 0 |
| 31 | lonely purpose | 2 | 2 | 0 |
| 32 | purposeful persuasion | 2 | 2 | 0 |
| 34 | soulful detail | 2 | 3 | 1 |
| 35 | towards realization | 2 | 3 | 1 |
| 36 | inner strength | 3 | 4 | 0 |
| 38 | spiritual suffering | 2 | 0 | 4 |
| 40 | lonely purpose | 2 | 2 | 0 |
| 41 | purposeful persuasion | 2 | 2 | 0 |
| 42 | alluring inspiration | 3 | 4 | 0 |
| 44 | towards realization | 2 | 3 | 1 |
| 45 | inner strength | 3 | 4 | 0 |
| 47 | spiritual suffering | 2 | 0 | 4 |
| 48 | personal purpose | 2 | 2 | 0 |
| 49 | lonely purpose | 2 | 2 | 0 |
| 50 | purposeful persuasion | 2 | 2 | 0 |

FIG. 39

"optimism" Gene-num-a = 21 Gene-num-b 21 to 50 Literary DNA Mapping Table

| Gene-num-b | Literary DNA | Level | Pos | Neg |
| --- | --- | --- | --- | --- |
| 21 | euphoria | 3 | 4 | 0 |
| 22 | cute immaturity | 2 | 2 | 2 |
| 23 | wish for help | 2 | 1 | 1 |
| 24 | magnetic allure | 2 | 2 | 0 |
| 25 | confidence | 2 | 2 | 0 |
| 26 | optimism jauntiness | 2 | 2 | 1 |
| 27 | enchanted optimism | 3 | 3 | 0 |
| 28 | stalemate | 1 | 1 | 1 |
| 29 | hope amid suffering | 1 | 2 | 2 |
| 30 | personal power | 3 | 2 | 0 |
| 31 | inner soul | 3 | 3 | 0 |
| 32 | successful persuasion | 3 | 1 | 0 |
| 33 | successful originality | 3 | 2 | 0 |
| 34 | confidence | 2 | 2 | 0 |
| 35 | jauntiness | 2 | 2 | 1 |
| 36 | enchanted optimism | 3 | 3 | 0 |
| 38 | hope amid suffering | 1 | 2 | 2 |
| 40 | inner soul | 3 | 3 | 0 |
| 41 | successful persuasion | 3 | 1 | 0 |
| 42 | magnetic allure | 2 | 2 | 0 |
| 44 | jauntiness | 2 | 2 | 1 |
| 45 | enchanted optimism | 3 | 3 | 0 |
| 47 | hope amid suffering | 1 | 2 | 2 |
| 48 | personal power | 3 | 2 | 0 |
| 49 | inner soul | 3 | 3 | 0 |
| 50 | successful persuasion | 3 | 1 | 0 |

FIG.40

"evil" Gene-num-a = 22 Gene-num-b 22 to 50 Literary DNA Mapping Table

| Gene-num-b | Literary DNA | Level | Pos | Neg |
|---|---|---|---|---|
| 22 | teetering beliefs | 3 | 2 | 2 |
| 23 | tricky guidance | 2 | 1 | 3 |
| 24 | trickiness | 2 | 1 | 2 |
| 25 | tricky discernment | 2 | 1 | 2 |
| 26 | regrettable | 3 | 1 | 2 |
| 27 | suspense | 3 | 2 | 2 |
| 28 | dangerous loss | 3 | 0 | 4 |
| 29 | delusion suffering | 3 | 0 | 4 |
| 30 | personal delusion | 3 | 0 | 4 |
| 31 | lonely delusion | 3 | 0 | 4 |
| 32 | evil charisma | 3 | 1 | 3 |
| 34 | tricky discernment | 2 | 1 | 2 |
| 35 | regrettable | 3 | 1 | 2 |
| 36 | suspense | 3 | 2 | 2 |
| 38 | delusion suffering | 3 | 0 | 4 |
| 40 | lonely delusion | 3 | 0 | 4 |
| 41 | evil charisma | 3 | 1 | 3 |
| 42 | trickiness | 2 | 1 | 2 |
| 44 | regrettable | 3 | 1 | 2 |
| 45 | suspense | 3 | 2 | 2 |
| 47 | delusion suffering | 3 | 0 | 4 |
| 48 | personal delusion | 3 | 0 | 4 |
| 49 | lonely delusion | 3 | 0 | 4 |
| 50 | evil charisma | 3 | 1 | 3 |

FIG.41

"help" Gene-num-a = 23 Gene-num-b 23 to 49 Literary DNA Mapping Table

| Gene-num-b | Literary DNA | Level | Pos | Neg |
|---|---|---|---|---|
| 23 | pathetic | 2 | 0 | 2 |
| 24 | helpful characterization | 3 | 1 | 0 |
| 25 | helpful wisdom | 3 | 2 | 0 |
| 26 | taking on more | 2 | 2 | 1 |
| 27 | helpful activity | 2 | 1 | 0 |
| 28 | needing help with mistrust | 2 | 1 | 3 |
| 29 | needing help with suffering | 2 | 1 | 3 |
| 30 | needing personal help | 2 | 1 | 2 |
| 31 | helpful private truth | 3 | 1 | 0 |
| 34 | helpful wisdom | 3 | 2 | 0 |
| 35 | taking on more | 2 | 2 | 1 |
| 36 | helpful activity | 2 | 1 | 0 |
| 38 | needing help with suffering | 2 | 1 | 3 |
| 40 | helpful private truth | 3 | 1 | 0 |
| 42 | helpful characterization | 3 | 1 | 0 |
| 44 | taking on more | 2 | 2 | 1 |
| 45 | helpful activity | 2 | 1 | 0 |
| 47 | needing help with suffering | 2 | 1 | 3 |
| 48 | needing personal help | 2 | 1 | 2 |
| 49 | helpful private truth | 3 | 1 | 0 |

FIG.42

"reputation" Gene-num-a = 24 Gene-num-b 24 to 50 Literary DNA Mapping Table

| Gene-num-b | Literary DNA | Level | Pos | Neg |
| --- | --- | --- | --- | --- |
| 24 | hallmark | 1 | 2 | 0 |
| 25 | a defining characteristic | 1 | 2 | 0 |
| 26 | wild expansiveness | 2 | 3 | 1 |
| 27 | affecting reputation | 2 | 2 | 1 |
| 28 | ominous | 2 | 0 | 4 |
| 29 | uncomfortable reputation | 2 | 0 | 3 |
| 30 | personality | 2 | 1 | 0 |
| 31 | private self-image | 2 | 1 | 0 |
| 32 | persuasion | 2 | 2 | 0 |
| 34 | a defining characteristic | 1 | 2 | 0 |
| 35 | wild expansiveness | 2 | 3 | 1 |
| 36 | affecting reputation | 2 | 2 | 1 |
| 38 | uncomfortable reputation | 2 | 0 | 3 |
| 40 | private self-image | 2 | 1 | 0 |
| 41 | persuasion | 2 | 2 | 0 |
| 42 | hallmark | 1 | 2 | 0 |
| 44 | wild expansiveness | 2 | 3 | 1 |
| 45 | affecting reputation | 2 | 2 | 1 |
| 47 | uncomfortable reputation | 2 | 0 | 3 |
| 48 | personality | 2 | 1 | 0 |
| 49 | private self-image | 2 | 1 | 0 |
| 50 | persuasion | 2 | 2 | 0 |

FIG.43

"discernment" Gene-num-a = 25 Gene-num-b 25 to 48 Literary DNA Mapping Table

| Gene-num-b | Literary DNA | Level | Pos | Neg |
|---|---|---|---|---|
| 25 | true discernment | 2 | 3 | 0 |
| 26 | inner confusion | 2 | 0 | 2 |
| 27 | discriminating | 2 | 1 | 0 |
| 28 | sensing loss | 2 | 1 | 2 |
| 29 | sensing suffering | 2 | 1 | 2 |
| 30 | personal revelation | 2 | 1 | 0 |
| 34 | true discernment | 2 | 3 | 0 |
| 35 | inner confusion | 2 | 0 | 2 |
| 36 | discriminating | 2 | 1 | 0 |
| 38 | sensing suffering | 2 | 1 | 2 |
| 44 | inner confusion | 2 | 0 | 2 |
| 45 | discriminating | 2 | 1 | 0 |
| 47 | sensing suffering | 2 | 1 | 2 |
| 48 | personal revelation | 2 | 1 | 0 |

FIG. 44

"altruism" Gene-num-a = 26 Gene-num-b 26 to 49 Literary DNA Mapping Table

| Gene-num-b | Literary DNA | Level | Pos | Neg |
|---|---|---|---|---|
| 26 | true confusion | 2 | 0 | 4 |
| 27 | action amid | 2 | 2 | 1 |
| 28 | confusing mistrust | 2 | 0 | 2 |
| 29 | painful confusion | 2 | 0 | 3 |
| 30 | quirkiness | 2 | 2 | 1 |
| 31 | personal issue | 2 | 0 | 1 |
| 35 | true confusion | 2 | 0 | 4 |
| 36 | action amid | 2 | 2 | 1 |
| 38 | painful confusion | 2 | 0 | 3 |
| 40 | personal issue | 2 | 0 | 1 |
| 44 | true confusion | 2 | 0 | 4 |
| 45 | action amid | 2 | 2 | 1 |
| 47 | painful confusion | 2 | 0 | 3 |
| 48 | quirkiness | 2 | 2 | 1 |
| 49 | personal issue | 2 | 0 | 1 |

"bravado" Gene-num-a = 27 Gene-num-b 27 to 49 Literary DNA Mapping Table

| Gene-num-b | Literary DNA | Level | Pos | Neg |
|---|---|---|---|---|
| 27 | true bravado | 2 | 4 | 0 |
| 28 | untrustworthy | 2 | 0 | 2 |
| 29 | bravado amid | 2 | 1 | 2 |
| 30 | personal activity | 2 | 1 | 0 |
| 31 | lonely activity | 2 | 1 | 0 |
| 33 | enchanted luck | 2 | 3 | 0 |
| 36 | true bravado | 2 | 4 | 0 |
| 38 | bravado amid | 2 | 1 | 2 |
| 40 | lonely activity | 2 | 1 | 0 |
| 45 | true bravado | 2 | 4 | 0 |
| 47 | bravado amid | 2 | 1 | 2 |
| 48 | personal activity | 2 | 1 | 0 |
| 49 | lonely activity | 2 | 1 | 0 |

FIG. 45

"betrayal" Gene-num-a = 28 Gene-num-b 28 to 48 Literary DNA Mapping Table

| Gene-num-b | Literary DNA | Level | Pos | Neg |
|---|---|---|---|---|
| 28 | truly untrustworthy | 2 | 0 | 4 |
| 30 | misplaced trust | 2 | 1 | 3 |
| 48 | misplaced trust | 2 | 1 | 3 |

"torture" Gene-num-a = 29 Gene-num-b 29 to 48 Literary DNA Mapping Table

| Gene-num-b | Literary DNA | Level | Pos | Neg |
|---|---|---|---|---|
| 29 | true suffering | 2 | 0 | 4 |
| 30 | personal view of | 2 | 0 | 3 |
| 38 | true suffering | 2 | 0 | 4 |
| 47 | true suffering | 2 | 0 | 4 |
| 48 | personal view of | 2 | 0 | 3 |

FIG.46

Literary DNA To Literary Phrase Resonance Mapping Display

*Analyzing the "Declaration of Independence" by Thomas Jefferson,*
*Literary DNA are shown below in parenthesis,*
*Positive-Negative magnitudes are numbers connected by dashes, Positive before Negative*
*Literary Resonance are numbers with asterisks,*
*Bold Face type below shows high level emotions,*
*Plain type below shows mid level emotions,*
*Italics below show low level emotions.*

When in the Course of human (3-1: unfinished desires), Course of human events it becomes (3-1: catchy underlying tension), events it becomes necessary for one (0-4: true confusion) 0.0*, necessary for one people to dissolve (1-3: overreaching desire), people to dissolve the political bands (0-2: outline of risk), the political bands which have connected (2-0: panorama) 4.0*, which have connected them with another (3-0: eloquently enchanting), them with another and to assume (3-0: alluring desire), *and to assume among the powers (1-1: prissy), among the powers of the earth (2-1: balancing petty details),* of the earth , the separate (2-1: shift towards success), , the separate and equal station (0-2: outline of risk) 8.0*, *and equal station to which the (1-0: teeming activity) 4.0*, to which the Laws of Nature (1-0: teeming activity),* Laws of Nature and of Nature's (2-0: panorama), and of Nature's God entitle them (1-0: talk of success), God entitle them , a decent (3-0: encouragement), , a decent respect to the (3-0: respectfulness), respect to the opinions of mankind (3-1: burning soulfulness), opinions of mankind requires that they (3-1: surprising new purpose), requires that they should declare the (3-1: surprising new purpose), should declare the causes which impel (2-0: mature wisdom), causes which impel them to the (2-2: wisdom amid calamity), them to the separation . (2-2: crude pride)

We hold these truths to be (0-2: outline of risk) 4.0*, truths to be self-evident , that (0-2: outline of conflict), **self-evident , that all men are (3-1: surprising new purpose) 8.0*, all men are created equal , (3-1: spiritual renewal), created equal , that they are (2-1: change in success), that they are endowed by their (4-0: transcendence), endowed by their Creator with certain (2-2: alluring risk), Creator with certain unalienable Rights , (2-1: shift towards success),** *unalienable Rights , that among these (2-1: balancing petty details), that among these are Life , (0-0: flood of detail),* are Life , Liberty and the (0-2: outline of risk) 8.0*, *Liberty and the pursuit of Happiness (3-0: magical breakthrough) 8.5*,* pursuit of Happiness . (2-0: awe)

Literary DNA To Literary Paragraph Resonance Mapping Display

*Analyzing a portion of the "I Have A Dream" speech by Martin Luther King, Jr.*

| Pos | Neg | Net | Change Coverage | Literary Resonance | Paragraph |
|---|---|---|---|---|---|
| 31 | 23 | 8 | 0 | 0 | You have been the veterans of creative suffering. Continue to work with the faith that unearned suffering is redemptive. Go back to Mississippi, go back to Alabama, go back to Georgia, go back to Louisiana, go back to the slums and ghettos of our northern cities, knowing that somehow this situation can and will be changed. |
| 20 | 24 | -4 | 4 | 4 | Let us not wallow in the valley of despair. I say to you today, my friends, that in spite of the difficulties and frustrations of the moment, I still have a dream. It is a dream deeply rooted in the American dream. |
| 35 | 33 | 3 | 3 | 5 | I have a dream that one day this nation will rise up and live out the true meaning of its creed: ' We hold these truths to be self-evident: that all men are created equal. I have a dream that one day on the red hills of Georgia the sons of former slaves and the sons of former slave owners will be able to sit down together at a table of brotherhood. |
| 33 | 38 | -5 | 5 | 8 | I have a dream that one day even the state of Mississippi, a desert state, sweltering with the heat of injustice and oppression, will be transformed into an oasis of freedom and justice. I have a dream that my four children will one day live in a nation where they will not be judged by the color of their skin but by the content of their character. |

FIG.50

Literary DNA To Story Resolution Mapping Display

*Analyzing text from the closing paragraphs of Peter Rabbit by Beatrix Potter*

| Paragraph Number | Paragraph | Net | Peter | Mr. McGregor | Peter & Mr. McGregor | Mother | Peter & Mother |
|---|---|---|---|---|---|---|---|
| 18 | The first thing he [ Peter ] saw was Mr . McGregor hoeing onions . His back was turned towards Peter , and beyond him was the gate ! Peter got down very quietly off the wheelbarrow , and started running as fast as he could go , along a straight walk behind some black-currant bushes . | -11 | -5 | -17 | -19 | -10 | -12 |
| 19 | Mr . McGregor caught sight of him at the corner , but Peter did not care . He slipped underneath the gate , and was safe at last in the wood outside the garden . Mr . McGregor hung up the little jacket and the shoes for a scare-crow to frighten the blackbirds . | -9 | -14 | -26 | -28 | | |
| 20 | Peter never stopped running or looked behind him till he got home to the big fir-tree . He was so tired that he flopped down upon the nice soft sand on the floor of the rabbit-hole , and shut his eyes . | 0 | -14 | | | | |
| 21 | His mother was busy cooking ; she wondered what he had done with his clothes . It was the second little jacket and pair of shoes that Peter had lost in a fortnight ! I am sorry to say that Peter was not very well during the evening . | 5 | 5 | | | -5 | -7 |
| 22 | His mother put him to bed , and made some camomile tea ; and she gave a dose of it to Peter ! ' One table-spoonful to be taken at bed-time . But Flopsy , Mopsy , and Cotton-tail had bread and milk and blackberries , for supper . | 21 | 12 | | | 16 | 14 |

FIG. 52

Literary DNA To Story Overview Mapping Display

*Analyzing text from Peter Rabbit by Beatrix Potter*

| Paragraph Range | Most Intense Paragraph in Range | Avg Net | Peter | Mr. McGregor | Peter & Mr. McGregor | mother | Peter & Mother |
|---|---|---|---|---|---|---|---|
| 1 to 6 | ONCE upon a time there were four little Rabbits , and their names were-- Flopsy , Mopsy , Cotton-tail , and Peter . They lived with their Mother in a sand-bank , underneath the root of a very big fir tree . | -3 | -26 | -6 | -8 | -10 | -12 |
| 7 to 12 | It was a blue jacket with brass buttons , quite new . Peter gave himself up for lost , and shed big tears ; but his sobs were overheard by some friendly sparrows , who flew to him in great excitement , and implored him to exert himself . | 1 | -18 | 8 | 6 | | |
| 13 to 18 | He went back towards the tool-shed , but suddenly , quite close to him , he heard the noise of a hoe--scr-r-ritch , scratch , scratch , scritch . Peter scuttered underneath the bushes . But presently , as nothing happened , he came out , and climbed upon a wheelbarrow , and peeped over . | 2 | -5 | -17 | -19 | | |
| 19 to 22 | His mother put him to bed , and made some camomile tea ; and she gave a dose of it to Peter ! ' One table-spoonful to be taken at bed-time . But Flopsy , Mopsy , and Cotton-tail had bread and milk and blackberries , for supper | 3 | 12 | -26 | -28 | 16 | 14 |

FIG. 53

Examples Of Gene-num Tuple to Literary DNA
Mapping Development Method

Story Gap Analysis Method 5600

Salient Character Theme Emotion Tuples Display-A

*Analyzing themes from two main characters of Stars Of Mithra by Nora Roberts*

| | | | | | | |
|---|---|---|---|---|---|---|
| Grace | eyes | challenging balance<br>facing surprise<br>stubborn pride<br>respectfulness | | Seth | eyes | unveiling meaning<br>facing surprise<br>challenging balance<br>respectfulness |
| | wonder | reckless thought<br>impeding risk<br>perilous upheaval<br>zeal | | | think | idolized detail<br>aw-oh |
| | smile | painful love | | | wonder | impeding risk<br>aw-oh |
| | feel | painful love | | | smile | crude pride |
| | think | maturity amid danger<br>rising risk<br>aw-oh | | | feel | impeding risk<br>perilous upheaval |

FIG. 58

Salient Character Theme Emotion Tuples Display-B

*Analyzing themes from two main characters of Rising Sun by Michael Crichton*

| | | | | | |
|---|---|---|---|---|---|
| John | know | alluring danger<br>respectfulness<br>maturity amid danger<br>respectful idea<br>reckless thought<br>aw-oh<br>catchy courage<br>impeding risk<br>devilishness | Eddie | daddy | need for courage |
| | | | | okay | sense of upheaval<br>preferred belief<br>sensitivity to situation |
| | | | | how | rising risk<br>courage amid upheaval |
| | okay | respecting sensitivity | | know | respectfulness<br>desire for upheaval |
| | american | perilous upheaval<br>risky expectation | | american | maturity amid danger |
| | | | | want | facing surprise<br>rising risk |
| | japanese | need good consolation<br>anguish amid danger<br>rising risk<br>attractive upheaval<br>stoicism<br>yikes<br>teetering on disappointment<br>inspiration<br>undercurrent | | girl | test of idea |

FIG. 59

Compact Literary DNA Resonance Display

When in the Course of human *events it becomes*
*necessary for one people to dissolve the political*
*bands* which have connected them with another, and
to assume among the powers of the earth, the separate
*and equal station* to which the Laws of Nature and of
Nature's God entitle them a decent respect to the
opinions of mankind requires that they should declare
the causes which impel them to the separation.

"the separate and
equal station"
emotional strengths
0 positive, 2 negative;
outline of risk --
with resonance 8.0

"opinions of mankind
requires that they"
emotional strengths
3 positive, 1 negative;
surprising new purpose Legend:

1) bold font indicates green color
2) italic font indicates red color
3) plain font indicates brown color
4) Larger fonts indicate brighter colors
5) Balloon boxes are examples of boxes appearing when the cursor hovers over text.

FIG. 60

Story Resolution Arc Display
*Analyzing text from the closing paragraphs of Peter Rabbit by Beatrix Potter*

| Paragraph Number | Paragraph | Net | Peter | Mr. McGregor | Peter & Mr. McGregor | Mother | Peter and Mother | Overall Story |
|---|---|---|---|---|---|---|---|---|
| 18 | The first thing he [Peter] saw was Mr. McGregor hoeing onions. His back was turned towards Peter, and beyond him was the gate! Peter got down very quietly off the wheelbarrow, and started running as fast as he could go, along a straight walk behind some black-currant bushes. | -11 | -5 |  | -15 | -17 | -12 -10 | -63 |
| 19 | Mr. McGregor caught sight of him at the corner, but Peter did not care. He slipped underneath th gate, and was safe at last in the wood outside the garden. Mr McGregor hung up the little jacket and the shoes for a scare-crow to frighten the blackbirds. | -9 | -14 |  | -28 -26 |  |  | -90 |
| 20 | Peter never stopped running or looked behind him till he got home to the big fire tree. He was so tired that he flopped down upon the nice soft sand on the floor of the rabbit-hole, and shut his eyes. | 0 | -14 |  |  |  |  | -90 |
| 21 | His mother was busy cooking; she wondered what he had done with his clothes. It was the second little jacket and pair of shoes that Peter had lost in a fortnight! I am sorry to say that Peter was not very well during the evening. | 5 | 5 |  |  |  | -7 -5 | -61 |
| 22 | His mother put him to bed, and made some camomile tea; and she gave a dose of it to Peter! One table-spoonful to be taken at bet-time. But Flopsy, Mopsy, and Cotton-tail had bread and milk and blackberries, for supper. | 21 | 12 |  |  |  | 14 16 | -12 |

Resolution ◄─── zero ───► Tension

FIG.61

*Genre Theme Phrases Table 1 of 2*

| Genre | Phrases |
|---|---|
| Romance | alone, arms, closer, desire, desired, eyes, hair, herself, himself, love, of hers, of his, scent, skin, smile, together, want, wanted |
| Mystery | answer, answered, ask, bizarre, confused, confusion, few, find, hear, how, inner, inside, joy, know, look, lurk, many, mean, mind, mysterious, mystery, odd, probe, problem, riddle, secret, shadow, strange, suffer, tell, thought, vast, whole, why |
| Thriller | after, aggressive, all over, all right, allright, along, at will, before, begin, break, burst, chase, climb, climbing, come on, control, cry, dance, day, do it, ecstatic, elude, eluding, end, ended, every inch, excite, excitement, explode, explosive, eyed, faint, fall, fast, fed up, fierce, fiery, fight, finally, fire, flail, flare, flaring, giggle, glance, go on, greed, greedily, grind, grinding, grindingly, groan, happen, happened, happening, hide, hideaway, hideout, hunt, ill, in front, in time, keep, keep, kill, leave, lie, lighting, look at, lookout, loom, make it, moment, move, next, no longer, oh-oh, pick, possible, provocative, pursue, pursuit, pursuit, reach, ready, repeated, roll, run, scare, scared, shake, shock, shoot, shout, shut up, slay, slayer, slide, sob, split, step, swear, swiftly, test, think, think of, throw, throw, time, today, today, tonight, tremble, trembling, try, turn, turned, urgency, violence, violent, wake, walk, watch, way, wink, winking, world, wound, wound up, wrath, yell |
| Fashion | alley, apartment, art, atrium, barn, barstool, bed, bedsheet, bell, black, blonde, blouse, blue, bridge, brown, brunette, building, bus, bus, buxom, car, chair, city, coat, color, craftman's, danish, desk, dish, donut, door, dumpling, famous, fireplace, floor, food, frequently, front-door, front-door, gray, green, hairdo, hall, hallway, heavy, home, house, jacket, jammie, jammie, lane, lapel, large, lounge, m&m, m&ms, man's, mansion, mantelpiece, match, mirror, motorcycle, neighborhood, nightgown, nightie, okay, own, painting, person's, pizza, poor, pajamas, red, redhead, restaurant, rich, road, room, sandwich, seat, shack, shirt, shoe, shop, shopping, short, sidewalk, sign, small, socks, sofa, sound, soup, split-level, stair, stair-case, staircase, stool, street, style, suit, sweater, sweeten, sweetened, table, tall thin, tower, town, trousers, truck, undies, village, walkway, wall, wall, well-built, white, window, window-pane, window-panes, woman's, yeah, yellow |
| Fantasy | dragon, holy grail, knight, magic, potion, sorcery, sorcerer, spell, wand, warlock, warrior, witch, wizard |

FIG.63

*Genre Theme Phrases Table 2 of 2*

| Genre | Phrases |
|---|---|
| Science | abstraction, atomic, brain, brain disease, cardiac, chemical, chromosome, computer, computer science, computer scientist, dilation, disc, dna, eeg, electrode, electronic, emotional state, energy, epileptic seizure, evolutionary, explosion, gene, hospital, infection, intelligence, machine, mathematical, mechanical, metal, nerve cell, penetration, physical, physics, plague, program, psychiatrist, recombinant, representation, retro-virus, science, scientific, seizure, space, spaceship, stimulation, storage, tape, technology, tectonic, theory, time line, time-line, virus, warp. |
| Erotica | all the way, anus, bare, boner, boobs, breast, breasts, butt, butthole, buttock, caress, clit, clitoris, cock, copulate, cum, cunt, delicious, desirability, desire, erect, erection, faster, fear, feel, finger, flail, fondle, fuck, fucking, g-spot, gently, hard, hard-on, heave, honey, jism, juicy, kiss, kisser, kissing, leg, legs, lip, lips, looking at, lovebud, lust, lustily, lusting, moan, naked, nipple, nipples, nostril, nude, nudity, ogle, orgasm, orgasms, penetrate, penis, phallus, pleasure, pre-cum, pussy, ram, saliva, scream, screaming, sex, sexy, shriek, shudder, sigh, skin, slippery, smell, spurt, spurting, squeeze, strong, suck, sucking, swallow, swallowing, sway, sweet, taste, thigh, thighs, throat, thrust, tit, tits, to the full, touch, touched, up and down, vagina, vibrate, vibrator, wanton, wantonness, wet, wetness, whimper, yoni. |
| Spiritual | able, abolish, above, absolution, accept, accomplish, accomplishment, active, alive, among, angel, anguish, animal, appear, applaud, archangel, aware, awareness, become, being, belief, beneath, blessed, body, bravery, cause, change, change, changed, completely, consciousness, consent, courage, create, dark, darkness, death, decided, declare, deep, design, desolate, destiny, destroy, destroyed, destructive, direction, doom, doomed, dream, earth, easy, endless, endlessly, enjoy, ensure, equal, ever, evil, excellent, faith, form, formation, foundation, freedom, give, god, golden thread, good, gospel, grace, great, greater, grow, hallow, happiness, heaven, hell, herself, himself, history, human, idea, ideal, idealist, ignorance, illumination, imagination, important, importantly, inalienable, individual, inextricably, institute, insufferable, intellectual, join, joy, judge, justice, knowing, language, learn, lesser, life, light, limit, live, mankind, manner, matter, memory, morning, mourning, myself, naturally, nature, necessity, need, new, night, object, obscene, ocean, ode, organize, our, ourselves, path, people, peril, persistence, person, plant, play, power, prepared, presence, principle, quality, quiet, realized, remember, require, required, respect, rested, rise, rise, roots, safety, sauriel, scary, sea, seek, serve, service, serving, seven seas, sign, soul, speak, star, story, suffer, sufferable, suffered, sunrise, sunset, superb, survival, survive, themselves, tide, truth, truthful, tyranny, ultimate, unalienable, understand, understanding, unlearn, vast, vision, want, wickedness, wisdom, wish, womb, wonder, work, yourself, yourselves. |

FIG.64

Story Page Quality Display

| % Mashup | Title | Author | Page Quality | Romance | Thriller | Fashion | Spiritual | Other |
|---|---|---|---|---|---|---|---|---|
| 0 | Peter Rabbit | Beatrix Potter | 147 | 3 | 9 | 9 | 9 | tears:6 overhear:6 fly:6 underneath:6 care:6 implore:6 slip:6 sparrow:6 exert:3 gate:3 corner:3 shed:3 brass buttons:3 scratch:3 friendly:3 hang:3 |
| 0 | The Gospel Of Mary Magdalene | Karen King, translator | 40 | 1 | 6 | 2 | 40 | text:4 resolved:4 bind:3 type:3 print:3 edition:3 page:3 nag hammadi library:2 extant:2 preach:2 foolish:2 flesh:2 named:2 magdala:2 writing:1 excavation:1 available:1 include:1 copy:1 king:1 commentary:1 1:1 conqueror:1 archaeological:1 overcome:1 |
| 0 | Declaration Of Independence | Thomas Jefferson | 25 | 0 | 3 | 0 | 60 | opinion:6 security:3 direct object:3 sufferance:3 dissolve:3 decent:3 system:3 colony:3 connect:3 governed:3 abuse:3 separate:3 evince:3 political:3 transient:3 band:3 man:3 |
| 0 | The Sound And the Fury | William Faulkner | 19 | 9 | 124 | 29 | 23 | water:26 hand:24 mother:14 tree:9 head:8 against:6 father:4 feed:4 line:4 sky:4 cold:3 stand:3 dead:3 telling:3 woods:3 sit:3 face:3 blood:2 a little:2 2 swing:2 hold:2 slant:2 man:2 lean:2 behind:2 girl:2 shoulder:1 put:1 ditch:1 foot:1 palm:1 assuredly:1 month:1 knee:1 grass:1 talk:1 |
| 0 | Full Speed | Janet Evanovich | 13 | 1 | 17 | 11 | 5 | as well:1 boy:1 head:1 dog:1 against:1 far:1 cabin:1 hand:1 pull:1 |
| 0 | The Stars Of Mithra | Nora Roberts | 10 | 28 | 30 | 2 | 13 | hand:15 face:5 wait:3 ms:3 woman:3 last:2 open:1 spring:1 |
| 0 | Led Astray | Sandra Brown | 9 | 23 | 22 | 8 | 12 | head:9 hand:7 against:4 woman:3 around:2 open:1 |
| 0 | "I have a dream" speech | Martin Luther King, Jr. | 4 | 0 | 6 | 3 | 13 | come to:2 segregation:2 valley:2 remind:1 america:1 spot:1 cooling:1 gradualism:1 default:1 luxury:1 place:1 hand:1 heat:1 |

FIG.68

Story Romance Display

| % Mashup | Title | Author | Page Quality | Romance | Thriller | Fashion | Spiritual | Other |
|---|---|---|---|---|---|---|---|---|
| 0 | The Stars Of Mithra | Nora Roberts | 10 | 28 | 30 | 2 | 13 | hand:15 face:5 wait:3 ms:3 woman:3 last:2 open:1 spring:1 |
| 0 | Led Astray | Sandra Brown | 9 | 23 | 22 | 8 | 12 | head:9 hand:7 against:4 woman:3 around:2 open:1 |
| 0 | The Sound And the Fury | William Faulkner | 19 | 9 | 124 | 29 | 23 | water:26 hand:24 mother:14 tree:9 head:8 against:6 father:4 feed:4 line:4 sky:4 cold:3 stand:3 dead:3 telling:3 woods:3 sit:3 face:3 blood:2 a little:2 2 swing:2 hold:2 slant:2 man:2 lean:2 behind:2 girl:2 shoulder:1 put:1 ditch:1 foot:1 palm:1 assuredly:1 month:1 knee:1 grass:1 talk:1 |
| 0 | Peter Rabbit | Beatrix Potter | 147 | 3 | 9 | 9 | 9 | tears:6 overhear:6 fly:6 underneath:6 care:6 implore:6 slip:6 sparrow:6 exert:3 gate:3 corner:3 shed:3 brass buttons:3 scratch:3 friendly:3 hang:3 |
| 0 | The Gospel Of Mary Magdalene | Karen King, translator | 40 | 1 | 6 | 2 | 40 | text:4 resolved:4 bind:3 type:3 print:3 edition:3 page:3 nag hammadi library:2 extant:2 preach:2 foolish:2 flesh:2 named:2 magdala:2 writing:1 excavation:1 available:1 include:1 copy:1 king:1 commentary:1 1:1 conqueror:1 archaeological:1 overcome:1 |
| 0 | Full Speed | Janet Evanovich | 13 | 1 | 17 | 11 | 5 | as well:1 boy:1 head:1 dog:1 against:1 far:1 cabin:1 hand:1 pull:1 |
| 0 | Declaration Of Independence | Thomas Jefferson | 25 | 0 | 3 | 0 | 60 | opinion:6 security:3 direct object:3 sufferance:3 dissolve:3 decent:3 system:3 colony:3 connect:3 governed:3 abuse:3 separate:3 evince:3 political:3 transient:3 band:3 man:3 |
| 0 | "I have a dream" speech | Martin Luther King, Jr. | 4 | 0 | 6 | 3 | 13 | come to:2 segregation:2 valley:2 remind:1 america:1 spot:1 cooling:1 gradualism:1 default:1 luxury:1 place:1 hand:1 heat:1 |

FIG.69

Story Spirituality Display

| % Ma-shup | Title | Author | Page Quality | Romance | Thriller | Fashion | Spiritual | Other |
|---|---|---|---|---|---|---|---|---|
| 0 | Declaration Of Independence | Thomas Jefferson | 25 | 0 | 3 | 0 | 60 | opinion:6 security:3 direct object:3 sufferance:3 dissolve:3 decent:3 system:3 colony:3 connect:3 governed:3 abuse:3 separate:3 evince:3 political:3 transient:3 band:3 man:3 |
| 0 | The Gospel Of Mary Magdalene | Karen King, translator | 40 | 1 | 6 | 2 | 40 | text:4 resolved:4 bind:3 type:3 print:3 edition:3 page:3 nag hammadi library:2 extant:2 preach:2 foolish:2 flesh:2 named:2 magdala:2 writing:1 excavation:1 available:1 include:1 copy:1 king:1 commentary:1 1:1 conqueror:1 archaelogical:1 overcome:1 |
| 0 | The Sound And the Fury | William Faulkner | 19 | 9 | 124 | 29 | 23 | water:26 hand:24 mother:14 tree:9 head:8 against:6 father:4 feed:4 line:4 sky:4 cold:3 stand:3 dead:3 telling:3 woods:3 sit:3 face:3 blood:2 a little:2 2 swing:2 hold:2 slant:2 man:2 lean:2 behind:2 girl:2 shoulder:1 put:1 ditch:1 foot:1 palm:1 assuredly:1 month:1 knee:1 grass:1 talk:1 |
| 0 | The Stars Of Mthra | Nora Roberts | 10 | 28 | 30 | 2 | 13 | hand:15 face:5 wait:3 ms:3 woman:3 last:2 open:1 spring:1 |
| 0 | "I have a dream" speech | Martin Luther King, Jr. | 4 | 0 | 6 | 3 | 13 | come to:2 segregation:2 valley:2 remind:1 america:1 spot:1 cooling:1 gradualism:1 default:1 luxury:1 place:1 hand:1 heat:1 |
| 0 | Led Astray | Sandra Brown | 9 | 23 | 22 | 8 | 12 | head:9 hand:7 against:4 woman:3 around:2 open:1 |
| 0 | Peter Rabbit | Beatrix Potter | 147 | 3 | 9 | 9 | 9 | tears:6 overhear:6 fly:6 underneath:6 care:6 implore:6 slip:6 sparrow:6 exert:3 gate:3 corner:3 shed:3 brass buttons:3 scratch:3 friendly:3 hang:3 |
| 0 | Full Speed | Janet Evanovich | 13 | 1 | 17 | 11 | 5 | as well:1 boy:1 head:1 dog:1 against:1 far:1 cabin:1 hand:1 pull:1 |

FIG.70

Story Mashup of Declaration Of Independence Display

| % Ma-shup | Title | Author | Page Qua-lity | Rom-ance | Thril-ler | Fash-ion | Spi-ritual | Other |
|---|---|---|---|---|---|---|---|---|
| 100 | Declar-ation Of Indepen-dence | Thomas Jefferson | 25 | 0 | 3 | 0 | 60 | opinion:6 security:3 direct object:3 sufferance:3 dissolve:3 decent:3 system:3 colony:3 connect:3 governed:3 abuse:3 separate:3 evince:3 political:3 transient:3 band:3 man:3 |
| 2 | The Sound And the Fury [MASHUP THEMES-- light:3] | William Faulkner | 19 | 9 | 124 | 29 | 23 | water:26 hand:24 mother:14 tree:9 head:8 against:6 father:4 feed:4 line:4 sky:4 cold:3 stand:3 dead:3 telling:3 woods:3 sit:3 face:3 blood:2 a little:2 2 swing:2 hold:2 slant:2 man:2 lean:2 behind:2 girl:2 shoulder:1 put:1 ditch:1 foot:1 palm:1 assuredly:1 month:1 knee:1 grass:1 talk:1 |
| 0 | The Gospel Of Mary Mag-dalene | Karen King, translator | 40 | 1 | 6 | 2 | 40 | text:4 resolved:4 bind:3 type:3 print:3 edition:3 page:3 nag hammadi library:2 extant:2 preach:2 foolish:2 flesh:2 named:2 magdala:2 writing:1 excavation:1 available:1 include:1 copy:1 king:1 commentary:1 1:1 conqueror:1 archaeological:1 overcome:1 |
| 0 | Peter Rabbit | Beatrix Potter | 147 | 3 | 9 | 9 | 9 | tears:6 overhear:6 fly:6 underneath:6 care:6 implore:6 slip:6 sparrow:6 exert:3 gate:3 corner:3 shed:3 brass buttons:3 scratch:3 friendly:3 hang:3 |
| 0 | The Stars Of Mithra | Nora Roberts | 10 | 28 | 30 | 2 | 13 | hand:15 face:5 wait:3 ms:3 woman:3 last:2 open:1 spring:1 |
| 0 | "I have a dream" speech | Martin Luther King, Jr. | 4 | 0 | 6 | 3 | 13 | come to:2 segregation:2 valley:2 remind:1 america:1 spot:1 cooling:1 gradualism:1 default:1 luxury:1 place:1 hand:1 heat:1 |
| 0 | Led Astray | Sandra Brown | 9 | 23 | 22 | 8 | 12 | head:9 hand:7 against:4 woman:3 around:2 open:1 |
| 0 | Full Speed | Janet Evanovich | 13 | 1 | 17 | 11 | 5 | as well:1 boy:1 head:1 dog:1 against:1 far:1 cabin:1 hand:1 pull:1 |

FIG. 71

Story Mashup of Declaration Of Independence and "I have a dream" Display
(Bold indicates similar stories)

| % Ma-shup | Title | Author | Page Quality | Rom-ance | Thril-ler | Fash-ion | Spi-ritual | Other |
|---|---|---|---|---|---|---|---|---|
| 29 | Declaration Of Independence | Thomas Jefferson | 25 | 0 | 3 | 0 | 60 | opinion:6 security:3 direct object:3 sufferance:3 dissolve:3 decent:3 system:3 colony:3 connect:3 governed:3 abuse:3 separate:3 evince:3 political:3 transient:3 band:3 man:3 |
| 6 | "I have a dream" speech | Martin Luther King, Jr. | 4 | 0 | 6 | 3 | 13 | come to:2 segregation:2 valley:2 remind:1 america:1 spot:1 cooling:1 gradualism:1 default:1 luxury:1 place:1 hand:1 heat:1 |
| 4 | The Sound And the Fury | William Faulkner | 19 | 9 | 124 | 29 | 23 | water:26 hand:24 mother:14 tree:9 head:8 against:6 father:4 feed:4 line:4 sky:4 cold:3 stand:3 dead:3 telling:3 woods:3 sit:3 face:3 blood:2 a little:2 2 swing:2 hold:2 slant:2 man:2 lean:2 behind:2 girl:2 shoulder:1 put:1 ditch:1 foot:1 palm:1 assuredly:1 month:1 knee:1 grass:1 talk:1 |
| 1 | The Stars Of Mithra | Nora Roberts | 10 | 28 | 30 | 2 | 13 | hand:15 face:5 wait:3 ms:3 woman:3 last:2 open:1 spring:1 |
| 1 | Full Speed | Janet Evanovich | 13 | 1 | 17 | 11 | 5 | as well:1 boy:1 head:1 dog:1 against:1 far:1 cabin:1 hand:1 pull:1 |
| 1 | Led Astray | Sandra Brown | 9 | 23 | 22 | 8 | 12 | head:9 hand:7 against:4 woman:3 around:2 open:1 |
| 0 | The ... Mag-dalene | Karen ... | 40 | 1 | 6 | 2 | 40 | text:4 resolved:4 bind:3 type:3 print:3 edition:3 page:3 nag hammadi library:2 extant:2 preach:2 foolish:2 flesh:2 named:2 magdala:2 writing:1 excavation:1 available:1 include:1 copy:1 king:1 commentary:1 1:1 conqueror:1 archaeological:1 overcome:1 |
| 0 | Peter Rabbit | Beatrix Potter | 147 | 3 | 9 | 9 | 9 | tears:6 overhear:6 fly:6 underneath:6 care:6 implore:6 slip:6 sparrow:6 exert:3 gate:3 corner:3 shed:3 brass buttons:3 scratch:3 friendly:3 hang:3 |

Annotations pointing to The Sound And the Fury: MASHUP THEMES-- light:2 hand:1 time:1 dark:1
Annotation pointing to The ... Magdalene: MASHUP THEMES-- hand:1 time:1

FIG. 72

Story Mashup of "I have a dream" and The Stars Of Mithra Display
(Bold indicates similar stories)

| % Mashup | Title | Author | Page Quality | Romance | Thriller | Fashion | Spiritual | Other |
|---|---|---|---|---|---|---|---|---|
| 45 | The Stars Of Mithra | Nora Roberts | 10 | 28 | 30 | 2 | 13 | hand:15 face:5 wait:3 ms:3 woman:3 last:2 open:1 spring:1 |
| 24 | The Sound And the Fury | William Faulkner | 19 | 9 | 124 | 29 | 23 | water:26 hand:24 mother:14 tree:9 head:8 against:6 father:4 feed:4 line:4 sky:4 cold:3 stand:3 dead:3 telling:3 woods:3 sit:3 face:3 blood:2 a little:2 2 swing:2 hold:2 slant:2 man:2 lean:2 behind:2 girl:2 shoulder:1 put:1 ditch:1 foot:1 palm:1 assuredly:1 month:1 knee:1 grass:1 talk:1 |
| 24 | Led Astray | Sandra Brown | 9 | 23 | 22 | 8 | 12 | head:9 hand:7 against:4 woman:3 around:2 open:1 |
| 12 | Full Speed | Janet Evanovich | 13 | 1 | 17 | 11 | 5 | as well:1 boy:1 head:1 dog:1 against:1 far:1 cabin:1 hand:1 pull:1 |
| 2 | The Gospel Of Mary Magdalene | Karen King, translator | 40 | 1 | 6 | 2 | 40 | text:4 resolved:4 bind:3 type:3 print:3 edition:3 page:3 nag hammadi library:2 extant:2 preach:2 foolish:2 flesh:2 named:2 magdala:2 writing:1 excavation:1 available:1 include:1 copy:1 king:1 commentary:1 1:1 conqueror:1 archaelogical:1 overcome:1 |
| 2 | "I have a dream" speech | Martin Luther King, Jr. | 4 | 0 | 6 | 3 | 13 | come to:2 segregation:2 valley:2 remind:1 america:1 spot:1 cooling:1 gradualism:1 default:1 luxury:1 place:1 hand:1 heat:1 |
| 1 | Peter Rabbit | Beatrix Potter | 147 | 3 | 9 | 9 | 9 | tears:6 overhear:6 fly:6 underneath:6 care:6 implore:6 slip:6 sparrow:6 exert:3 gate:3 corner:3 shed:3 brass buttons:3 scratch:3 friendly:3 hang:3 |
| 0 | Declaration Of Independence | Thomas Jefferson | 25 | 0 | 3 | 0 | 60 | opinion:6 security:3 direct object:3 sufferance:3 dissolve:3 decent:3 system:3 colony:3 connect:3 governed:3 abuse:3 separate:3 evince:3 political:3 transient:3 band:3 man:3 |

FIG. 73

Story Mashup of Full Speed and Led Astray Display

MASHUP THEMES -- know:11, think:11, head:5, want:4, hand:4, look:4, eyes:3, night:3, against:3, yeah:3, love:3, of his:2, turned:2, car:2, herself:2, kiss:2, feel:2, woman:2, hard:2, try:2, how:2, reach:1, around:1, closer:1, lip:1, open:1, people:1, chair:1, wanted:1, time:1, tell:1, why:1, hair:1

| % Mashup | Title | Author | Page Quality | Romance | Thriller | Fashion | Spiritual | Other |
|---|---|---|---|---|---|---|---|---|
| 38 | Led Astray | Sandra Brown | 9 | 23 | 22 | 8 | 12 | head:9 hand:7 against:4 woman:3 around:2 open:1 |
| 37 | The Sound And the Fury | William Faulkner | 19 | 9 | 124 | 29 | 23 | water:26 hand:24 mother:14 tree:9 head:8 against:6 father:4 feed:4 line:4 sky:4 cold:3 stand:3 dead:3 telling:3 woods:3 sit:3 face:3 blood:2 a little:2 2 swing:2 hold:2 slant:2 man:2 lean:2 behind:2 girl:2 shoulder:1 put:1 ditch:1 foot:1 palm:1 assuredly:1 month:1 knee:1 grass:1 talk:1 |

MASHUP THEMES -- know:13, think:11, look:10, head:5, want:4, try:4, hand:4, eyes:3, against:3, give:2, turned:2, feel:2, love:1, hear:1, before:1, reach:1, around:1, leave:1, good:1, tell:1, time:1, why:1

| % Mashup | Title | Author | Page Quality | Romance | Thriller | Fashion | Spiritual | Other |
|---|---|---|---|---|---|---|---|---|
| 33 | Full Speed | Janet Evanovich | 13 | 1 | 17 | 11 | 5 | as well:1 boy:1 head:1 dog:1 against:1 far:1 cabin:1 hand:1 pull:1 |
| 14 | The Stand Mit | | | | | | | hand:15 face:5 wait:3 ms:3 woman:3 last:2 open:1 spring:1 |

MASHUP THEMES -- know:13, look:10, think:8, yeah:4, try:4, skin:2, give:2, head:1, before:1, as well:1, boy:1, day:1, how:1, find:1, room:1, own:1, dog:1, against:1, hear:1, far:1, bed:1, cabin:1, hand:1, good:1, leave:1, pull:1, ask:1, truck:1, donut:1

| % Mashup | Title | Author | Page Quality | Romance | Thriller | Fashion | Spiritual | Other |
|---|---|---|---|---|---|---|---|---|
| 1 | The Gospel Of Mary Magdalene | translator | | | | | | text:4 resolved:4 bind:3 type:3 print:3 edition:3 page:3 nag hammadi library:2 extant:2 preach:2 foolish:2 flesh:2 named:2 magdala:2 writing:1 excavation:1 available:1 include:1 copy:1 king:1 commentary:1 1:1 conqueror:1 archaeological:1 overcome:1 |
| 1 | "I have a dream" speech | Martin Luther King, Jr. | 4 | 0 | 6 | 3 | 13 | come to:2 segregation:2 valley:2 remind:1 america:1 spot:1 cooling:1 gradualism:1 default:1 luxury:1 place:1 hand:1 heat:1 |
| 0 | Declaration Of Independence | Thomas Jefferson | 25 | 0 | 3 | 0 | 60 | opinion:6 security:3 direct object:3 sufferance:3 dissolve:3 decent:3 system:3 colony:3 connect:3 governed:3 abuse:3 separate:3 evince:3 political:3 transient:3 band:3 man:3 |
| 0 | Peter Rabbit | Beatrix Potter | 147 | 3 | 9 | 9 | 9 | tears:6 overhear:6 fly:6 underneath:6 care:6 implore:6 slip:6 sparrow:6 exert:3 gate:3 corner:3 shed:3 brass buttons:3 scratch:3 friendly:3 hang:3 |

FIG.74

Story Mashup of Full Speed and The Stars Of Mithra Display
(Bold indicates similiar stories)

| % Ma-shup | Title | Author | Page Quality | Romance | Thriller | Fashion | Spiritual | Other |
|---|---|---|---|---|---|---|---|---|
| 33 | The Sound And the Fury | William Faulkner | 19 | 9 | 124 | 29 | 23 | water:26 hand:24 mother:14 tree:9 head:8 against:6 father:4 feed:4 line:4 sky:4 cold:3 stand:3 dead:3 telling:3 woods:3 sit:3 face:3 blood:2 a little:2 2 swing:2 hold:2 slant:2 man:2 lean:2 behind:2 girl:2 shoulder:1 put:1 ditch:1 foot:1 palm:1 assuredly:1 month:1 knee:1 grass:1 talk:1 |
| 30 | Full Speed | Janet Evanovich | 13 | 1 | 17 | 11 | 5 | as well:1 boy:1 head:1 dog:1 against:1 far:1 cabin:1 hand:1 pull:1 |
| 29 | The Stars Of Mithra | Nora Roberts | 10 | 28 | 30 | 2 | 13 | hand:15 face:5 wait:3 ms:3 woman:3 last:2 open:1 spring:1 |
| 25 | Led Astray | Sandra Brown | 9 | 23 | 22 | 8 | 12 | head:9 hand:7 against:4 woman:3 around:2 open:1 |
| 1 | The Gospel Of Mary Magdalene | Karen King, translator | 40 | 1 | 6 | 2 | 40 | text:4 resolved:4 bind:3 type:3 print:3 edition:3 page:3 nag hammadi library:2 extant:2 preach:2 foolish:2 flesh:2 named:2 magdala:2 writing:1 excavation:1 available:1 include:1 copy:1 king:1 commentary:1 1:1 conqueror:1 archaeological:1 overcome:1 |
| 1 | "I have a dream" speech | Martin Luther King, Jr. | 4 | 0 | 6 | 3 | 13 | come to:2 segregation:2 valley:2 remind:1 america:1 spot:1 cooling:1 gradualism:1 default:1 luxury:1 place:1 hand:1 heat:1 |
| 1 | Declaration Of Independence | Thomas Jefferson | 25 | 0 | 3 | 0 | 60 | opinion:6 security:3 direct object:3 sufferance:3 dissolve:3 decent:3 system:3 colony:3 connect:3 governed:3 abuse:3 separate:3 evince:3 political:3 transient:3 band:3 man:3 |
| 1 | Peter Rabbit | Beatrix Potter | 147 | 3 | 9 | 9 | 9 | tears:6 overhear:6 fly:6 underneath:6 care:6 implore:6 slip:6 sparrow:6 exert:3 gate:3 corner:3 shed:3 brass buttons:3 scratch:3 friendly:3 hang:3 |

FIG.75

Automatically Generated Analyses of Mashups with
Martin Luther King, Jr.'s "I have a dream" speech.

---

Analysis For Story Mashup of "I have a dream"
and The Stars Of Mithra Display

The Stars Of Mithra and "I Have A Dream" are so different they cannot fully combine in a mashup. A mashup of The Stars Of Mithra with shades of "I Have A Dream" is similar to (1) A Kiss Remembered by Sandra Brown, (2) Led Astray by Sandra Brown, (3) The Sound And The Fury by William Faulkner. A mashup of "I Have A Dream" with shades of The Stars Of Mithra is similar to (1) Peter Rabbit by Beatrix Potter, (2) The Gospel Of Mary Magdalene by Karen King (translator).

---

Analysis For Story Mashup of Declaration Of Independence
and "I have a dream" Display The Declaration Of Independence and "I Have A Dream" are so different they cannot fully combine in a mashup. A mashup of The Declaration Of Independence with shades of "I Have A Dream" is not similar to any stories. A mashup of "I Have A Dream" with shades of The Declaration Of Independence is similar to The Sound And The Fury by William Faulkner

Automatically Generated Analyses of Mashups with
Janet Evanovich's Full Speed

---

Analysis Of Full Speed Alone

The story Full Speed by Janet Evanovich is similar to the story The Sound And The Fury by William Faulkner

---

Analysis Of Story Mashup of Full Speed and Sandra Brown's Led Astray

Led Astray and Full Speed are similar. A mashup between them is similar to The Sound And The Fury by William Faulkner

---

Analysis Of Story Mashup of Full Speed
and Nora Robert's The Stars Of Mithra

Full Speed and The Stars Of Mithra are similar. A mashup between them is similar to (1) The Sound And The Fury by William Faulkner, (2) Led Astray by Sandra Brown

FIG. 77

Higher Dimension Emotional Analysis Methods

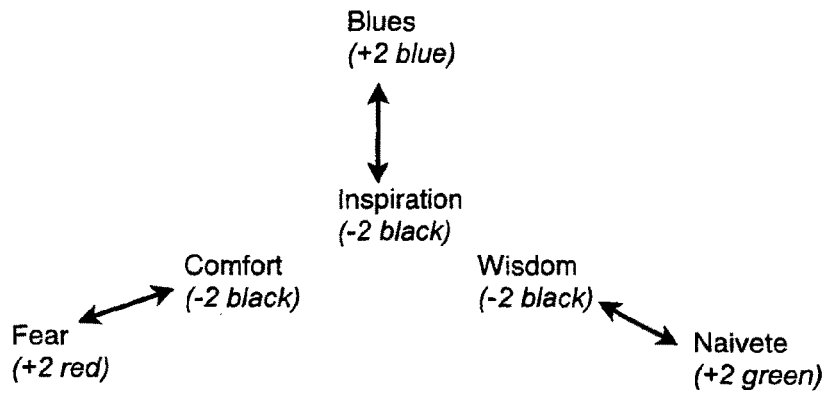

"idea of courage" Gene-num-a = 9 Gene-num-b 9 to 25
Higher Dimensional Literary DNA Mapping Table

| Gene-num-b | Literary DNA | L | P | N | Fear | Blues | Naivete |
|---|---|---|---|---|---|---|---|
| 9 | glory | 3 | 4 | 0 | -2 | -2 | -1 |
| 10 | respectfulness | 2 | 3 | 0 | 1 | 0 | -1 |
| 11 | devilishness | 1 | 1 | 3 | 1 | -1 | 1 |
| 12 | reckless thought | 1 | 0 | 4 | 2 | 0 | 2 |
| 13 | surprise | 1 | 2 | 2 | 2 | -1 | 1 |
| 14 | facing the inescapable | 1 | 2 | 1 | 1 | 2 | -2 |
| 15 | teeming activity | 1 | 1 | 0 | 0 | -1 | -1 |
| 16 | courage amid upheaval | 3 | 3 | 1 | -2 | -1 | -2 |
| 17 | courageous model | 3 | 2 | 0 | -2 | 0 | -1 |
| 18 | surprising situation | 2 | 1 | 3 | 2 | 0 | -1 |
| 19 | forcefulness | 1 | 2 | 2 | 1 | 1 | 1 |
| 20 | courageous opinion | 2 | 3 | 1 | -2 | -2 | -1 |
| 21 | hopefulness | 2 | 2 | 0 | 0 | -1 | -1 |
| 22 | risky opinion | 2 | 0 | 3 | 1 | 1 | 1 |
| 23 | encouragement | 2 | 3 | 0 | -2 | -1 | 0 |
| 24 | aggressive reputation | 2 | 3 | 1 | 2 | 0 | 1 |
| 25 | discerning courage | 2 | 3 | 0 | -2 | 0 | -2 |

FIG. 80

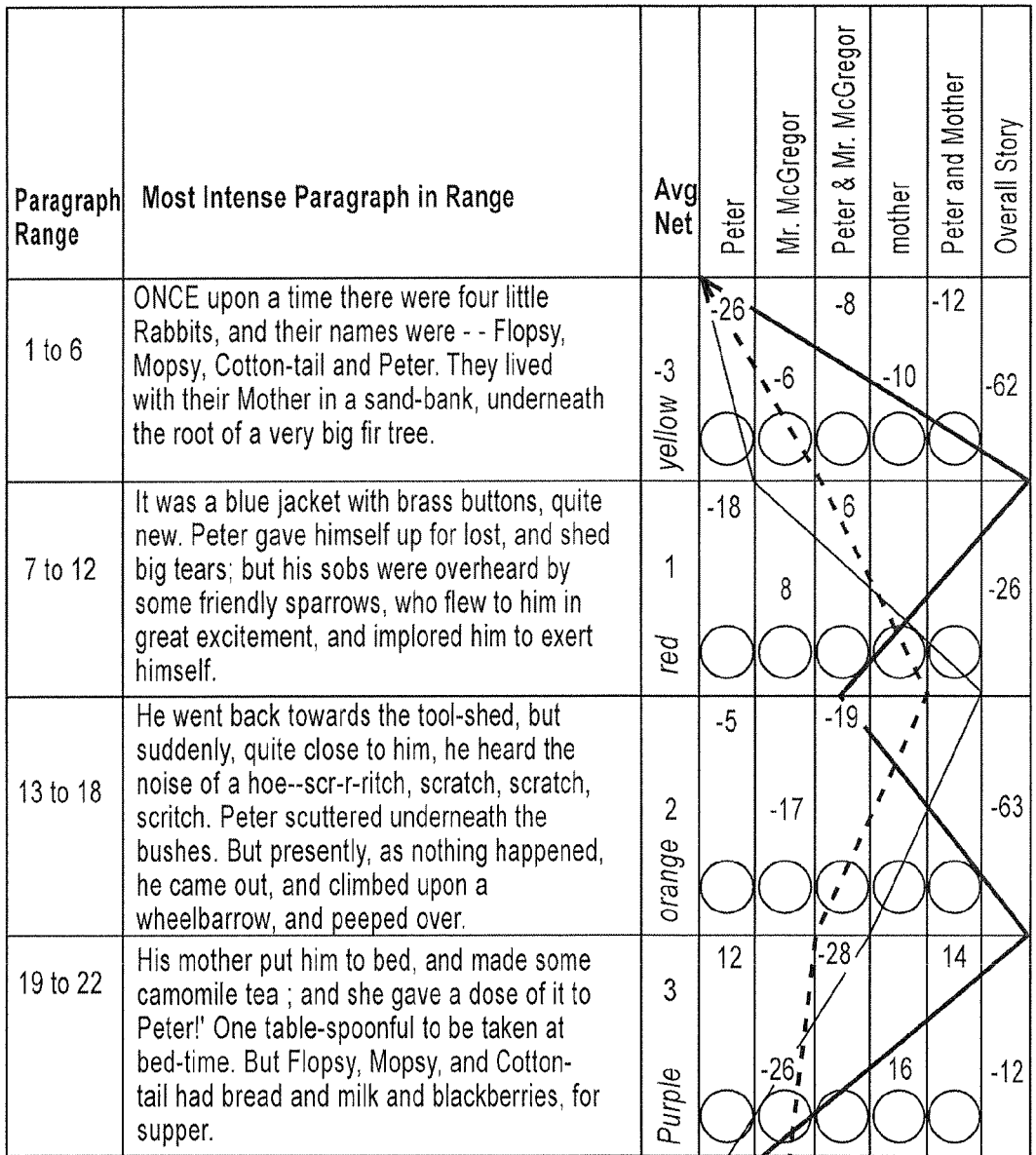
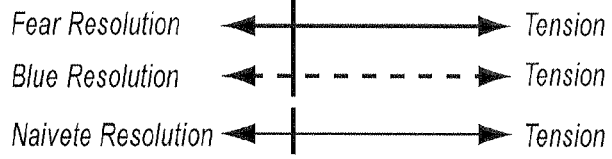
FIG.81

FIG. 82

Overview Of The Sound And The Fury

Rhetorical Sentiment Dimensions 8700

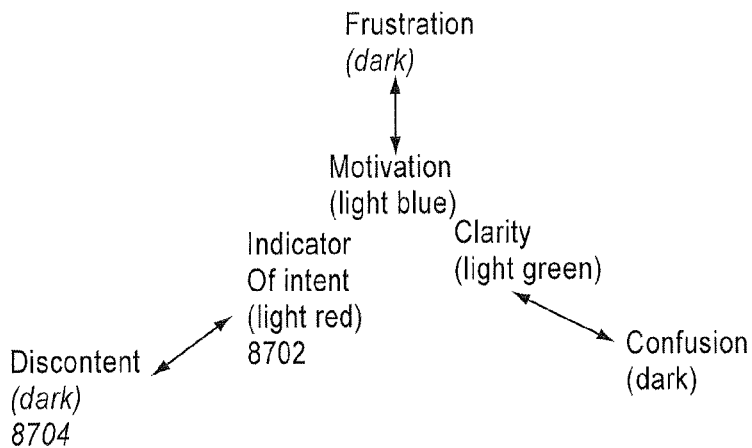

"idea of courage" Gene-num-a = 9 Gene-num-b 9 to 20
Higher Dimensional Literary DNA Mapping Table 8750

| Gene-num-b | Literary DNA | Motivation/ Frustration | Clarity/ Confusion | Indicator-of-Intent/ Discontent |
|---|---|---|---|---|
| 9 | glory | motivation 1/2 | clarity 1/4 | indicator-of-Intent 3 |
| 10 | respectful wisdom | | clarity 1 | indicator-of-Intent 1 |
| 11 | devilishness | motivation 1 | confusion 3 | |
| 12 | harsh thought | | confusion 3 | discontent 1/2 |
| 13 | surprise | frustration 1 | clarity 1/4 | discontent 1/2 |
| 14 | facing the inescapable | motivation 1 | clarity 1/4 | discontent 1 |
| 15 | teeming activity | | | indicator-of-Intent 1 |
| 16 | courage amid upheaval | motivation 1 | clarity 2 | discontent 1 |
| 17 | courageous model | motivation 1/2 | clarity 1/4 | |
| 18 | surprising situation | frustration 1 | clarity 1/4 | discontent 2 |
| 19 | forcefulness | motivation 1 | confusion 2 | indicator-of-intent 1 |
| 20 | courageous opinion | motivation 2 | clarity 1/4 | discontent 1 |

FIG.87

Example Of Automatic Generation
Of Rhetorical Metaphors or Key Phrases 8900

Motivation/Frustration Graph 8910

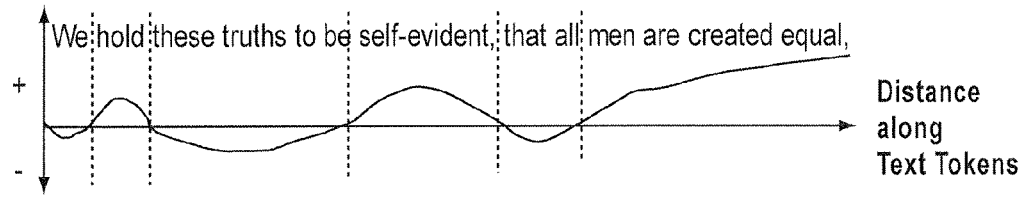

| Sign | Previous Text Segment | Text Segment |
|---|---|---|
| Positive | hold | self-evident |
| Positive | self-evident | men are created equal |

Clarity/Confusion Graph 8920

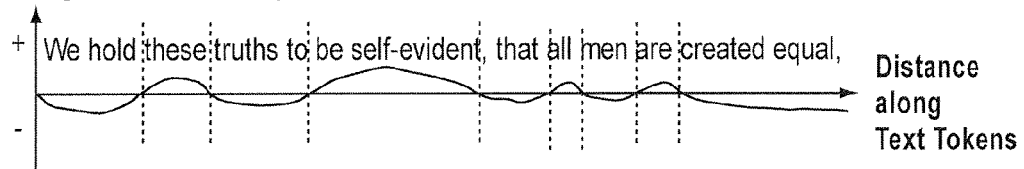

| Sign | Previous Text Segment | Text Segment |
|---|---|---|
| Negative | We hold | truths to |
| Negative | men | created equal |

Indicator-of-intent/Discomfort Graph

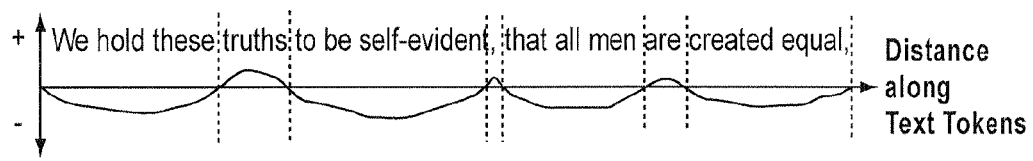

| Sign | Previous Text Segment | Text Segment |
|---|---|---|
| Negative | We hold these | to be self-evident |
| Negative | to be self-evident | that all men |
| Negative | that all men | created equal |

FIG.89

Rhetorical Automatic Ontology Generator Method 9000
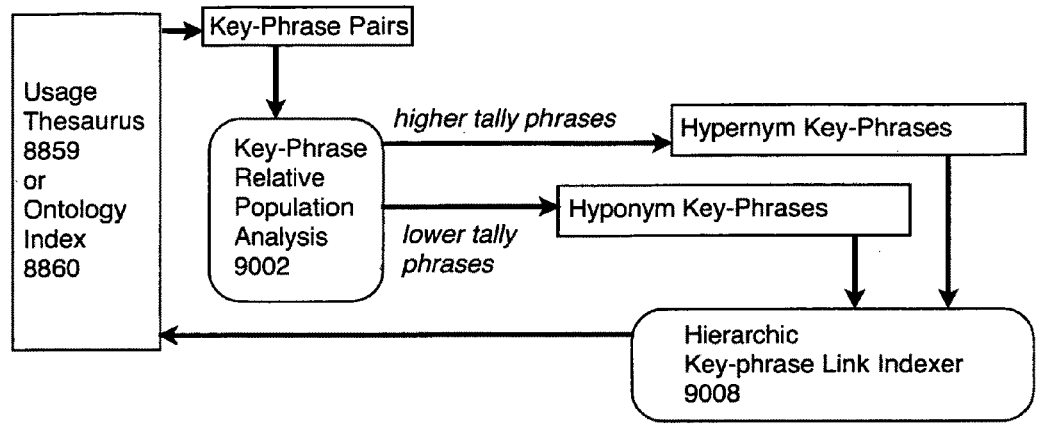
Example Of Automatically Generated Rhetorical Ontology 9050
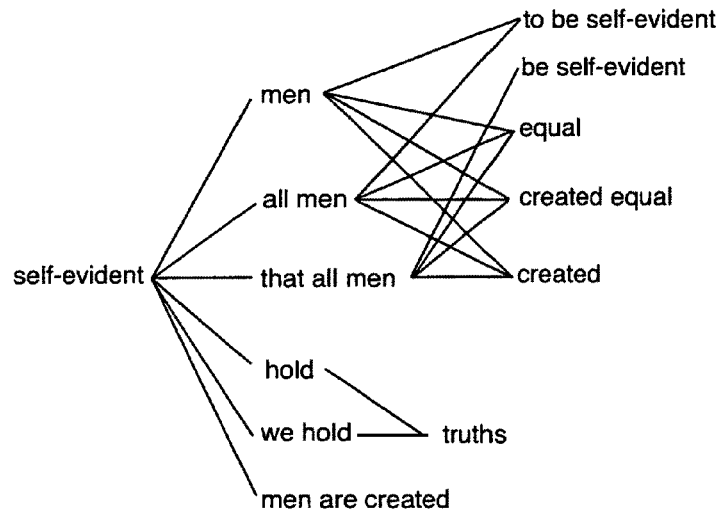
FIG. 90

Example Of Key-Phrase Relative Population Analysis 9002

| Key Phrase | Tally Of Linked Key-Phrases | Linked Key-Phrases | Hypo-Linked Key-Phrases |
|---|---|---|---|
| hold | 5 | self-evident (m)(i), to be self-evident, be self-evident, truths | |
| self-evident | 12 | we hold (c)(i), hold (m) (i), that all men (i), all men (i), men (m)(i), men are created (m), are created equal (m), created equal (m), created (m) | we hold, hold, that all men, men, men are created, are created equal, created equal, created |
| men | 10 | self-evident (m)(i), be self-evident (i), to be self-evident (i), created equal (c)(i), created (c)(i), equal (c) (i) | to be self-evident, created equal, created, equal |
| we hold | 4 | truths, to be self-evident, be self-evident, self-evident (i) | truths |
| all men | 6 | to be self-evident, be self-evident, self-evident, created equal, created, equal | created, equal, created equal, to be self-evident |
| truths | 2 | we hold, hold | |
| created equal | 5 | that all men, all men, men (c) (i), self-evident | |
| men are created | 1 | self-evident | |
| created | 5 | self-evident, that all men, all men, men (c) (i) | |
| be self-evident | 3 | that all men, all men, men | |
| to be self-evident | 2 | all men, men | |
| equal | 4 | self-evident (m), men (c) (i), all men | |
| that all men | 6 | to be self-evident, be self-evident, self-evident, created equal, created, equal | created, equal, created equal, to be self-evident |

FIG.91

Example of a web page for uploading files to a Sentiment Search Engine

Example of Display Of A Sentiment Search Engine

FIG. 95

Example of Display Of An Automatically Generated Ontology

Example of Story Scoring

Scoring and Author Advice

Scoring is based on classical emotional story arc development analyses correlated to recent book sales. Scoring measures how well each story fulfills the classic need for charismatic characters to carry readers to a satisfactory ending, resulting in a single objective satisfaction number for each story. Other story elements independent of classical story arcs will also affect book sales, particularly story topics of compelling interest, such as mysteries surrounding a death. Yet a well constructed classical story arc will generally sell strongly even without an unusually compelling topic.

Title: The Lord Of The Flies
Author: William Golding

*red is average length bar* — longer bars are stronger

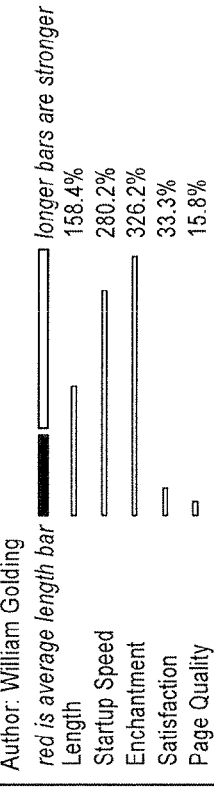

| | |
|---|---|
| Length | 158.4% |
| Startup Speed | 280.2% |
| Enchantment | 326.2% |
| Satisfaction | 33.3% |
| Page Quality | 15.8% |

Objective Mood: lost and fed up about suffering: sparsely drawn, reasonably emotional and somewhat open-ended

*Overall story satisfaction is built upon story arc strengths: Improvements to individual story arc strengths improve overall story satisfaction.* The Lord Of The Flies has a very small 34% average satisfaction rating. Getting intense near page 5 with ralph results in a moderately quick startup-speed rating 2.8 times average. The highly alluring level of enchantment is 3.3 times average. Most of this story's 1.4 times average emotionally revealing main-character emotional-depth comes from two main characters of ralph and jack. The strongest character is ralph with tepid strength 63% average, and second strongest is jack with tepid strength 13% average. The character with best dramatic resolution is bill with euphoric resolution 5.5 times average, and second strongest is roger with satisfying resolution 1.7 times average. The character with strongest charisma is bill with unforgettable charisma 8.9 times average, and second strongest is eric with riveting charisma 6.6 times average.

Character Arc: ralph has emotionally vivid emotional depth (191.5%), appealing dramatic resolution (56.6%), having a rough time finding indicators of intent(39.1%), mentally disoriented regarding clarity of situation (22.3%) and frustrated ability to find motivation (62.6%). By increasing this character's clarity of situation to 100%, via revisions to clarify this character's situation, this character's strength would go up 4.5-fold.

*red is average length bar* — longer bars are stronger

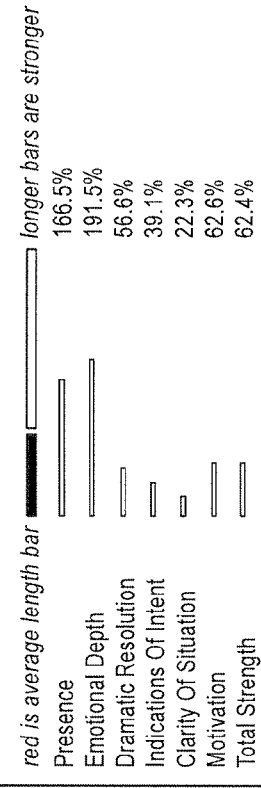

| | |
|---|---|
| Presence | 166.5% |
| Emotional Depth | 191.5% |
| Dramatic Resolution | 56.6% |
| Indications Of Intent | 39.1% |
| Clarity Of Situation | 22.3% |
| Motivation | 62.6% |
| Total Strength | 62.4% |

Example of Author Advice

Author Advice

*Advice for potential improvements to individual story arcs: improvements can come from showing more of charismatic characters, improving their emotional balance or improving dramatic resolution of their story arcs. Story topics of compelling interest to the characters may also increase story satisfaction.*

| | | |
|---|---|---|
| black is current satisfaction | aqua is potential story improvement | ralph The story gets intense page 5 with the arc of ralph. Moving that intensity up to the beginning of the story will hook more readers. Shifting intensity to the beginning may accelerate character development, usually a good thing. |
| black is current satisfaction | aqua is potential story improvement | ralph story arc potential improvement: Clarity of situation alone should equal average total charisma. This character is generally mentally disoriented. Need to show more of their thoughts. Even a delusional character thinks about something. |
| black is current satisfaction | aqua is potential story improvement | bill story arc potential improvement: Main character presence is expected to be at least average presence. This character is generally mysterious. Need to present them more fully. Even mysterious characters can be more tantalizing when more present. |
| black is current satisfaction | aqua is potential story improvement | ralph story arc potential improvement: Main character resolution is expected to be at least 1.5 average resolution. Drama for this character arc is generally scantily resolved. Need to resolve their drama more fully. Establishing average dramatic resolution may reveal more of their needs. |
| black is current satisfaction | aqua is potential story improvement | ralph story arc potential improvement: Indicators of intent alone should equal average total charisma. This character is generally having a rough time. Need to show having more indicators of intents. Every personality can be courageous about what they enjoy. |
| black is current satisfaction | aqua is potential story improvement | piggy story arc potential improvement: Main character resolution is expected to be at least 1.5 average resolution. Drama for this character arc is generally unresolved. Need to resolve their drama more fully. Even victims can be more memorable when more of their needs are met. |

Example of Correlation Chart Novels

| Satisfaction Rank | Story Title | Author | % Of Average Satisfaction | Recent Sales Dollars | Satisfaction Projected Sales | Objective Story Mood |
|---|---|---|---|---|---|---|
| 0 | One Hundred Years Of Solitude | Gabriel Marquez Garcia | 0.1% | 9,211,426 | 9,533 | lost and fed up about unhappiness: sparsely drawn, vibrantly emotional and open-ended |
| 1 | 1984 | George Orwell | 0.1% | 9,059,611 | 9,533 | lost and fed up about suffering: deeply etched, vibrantly emotional and somewhat open-ended |
| 2 | Across a Hundred Mountains | Reyna Grande | 0.4% | 65,026 | 38,132 | lost and fed up about suffering: sparsely drawn, reasonably emotional and somewhat resolved |
| 3 | The Da Vinci Code | Dan Brown | 2.1% | 157,742,229 | 200,192 | lost and fed up about suffering: sparsely drawn, vibrantly emotional and somewhat resolved |
| 4 | After All These Years | Susan Isaacs | 3.8% | 40,006 | 362,253 | touchingly dealing with unhappiness: deeply etched, vibrantly emotional and well-ended |
| 5 | The Notebook | Nicholas Sparks | 6.7% | 18,936,017 | 638,708 | lost and fed up about suffering: simply drawn, reasonably emotional and somewhat open-ended |
| 6 | THE BROKER | JOHN GRISHAM | 7.1% | 34,000,543 | 676,840 | lost and fed up about suffering: sketchy portrayals, reasonably emotional and neatly ended |
| 7 | The Last Juror | John Grisham | 10.7% | 29,647,865 | 1,020,026 | confused and bored with complacency: sketchy portrayals, emotionally focused and well-ended |
| 8 | Eclipse | Stephanie Meyer | 12.5% | 30,645,450 | 1,191,619 | knowingly fed up about suffering: sparsely drawn, vibrantly emotional and somewhat resolved |
| 9 | The Host | Stephanie Meyer | 16.7% | 14,071,317 | 1,592,003 | lost and fed up about suffering: sketchy portrayals, vibrantly emotional and well-ended |
| 10 | The Lord Of The Flies | William Golding | 33.4% | 8,292,489 | 3,184,006 | lost and fed up about suffering: sparsely drawn, reasonably emotional and somewhat open-ended |
| 11 | Alphabet Of Thorns | Patricia McKillip | 57.4 | 20,000 | 5,471,914 | lost and fed up about suffering: sketchy portrayals, emotionally focused and well-ended |
| 12 | Angels and Demons | Dan Brown | 64.5% | 91,351,416 | 6,148,753 | lost and bored with complacency: sparsely drawn, richly emotional and somewhat resolved |
| 13 | New Moon | Stephanie Meyer | 142.7% | 22,365,472 | 13,603,520 | touchingly confronting unhappiness: sketchy portrayals, richly emotional and well-ended |
| 14 | Fahrenheit 451 | Ray Bradbury | 146.4% | 5,763,716 | 13,956,239 | touchingly exploring into complacency: deeply etched, richly emotional and open-ended |
| 15 | CROSS | JAMES PATTERSON | 163.6% | 21,486,048 | 15,595,906 | confused and fed up about unhappiness: sparsely drawn, emotionally focused and neatly ended |
| 16 | The Alchemist | Paulo Coelho | 256.2% | 21,513,116 | 24,423,418 | confused and desiring of complacency: simply drawn, emotionally narrow and well-ended |
| 17 | Twilight | Stephanie Meyer | 2866.3% | 23,408,227 | 273,242,941 | brilliantly fed up about suffering: sparsely drawn, richly emotional and neatly ended |

FIG.100

Example Of Hierarchic Tree Size Index 10105
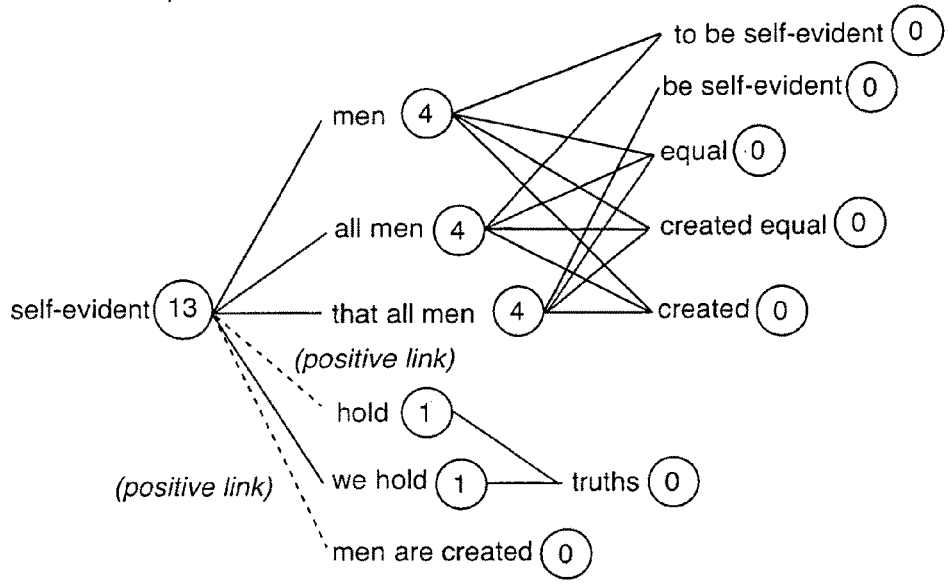
Direct Rhetorical Distance Calculation 10120
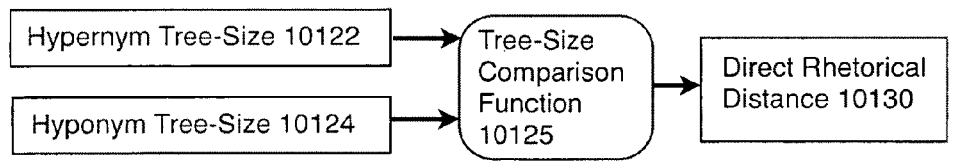
Examples Of Direct Rhetorical Distance 10150
| Hypernym | Hypernym Tree-Size | Hyponym | Hyponym Tree-Size | Distance |
|---|---|---|---|---|
| self-evident | 14 | that all men | 5 | 2.8 |
| men | 5 | created equal | 1 | 5 |
| men | 5 | hold | 2 | none |
| self-evident | 14 | men are created | 1 | 14 |
| self-evident | 14 | equal | 1 | 14 |
FIG. 101

Method Of Calculating Rhetorical Distance Via Common Hypernym 10210
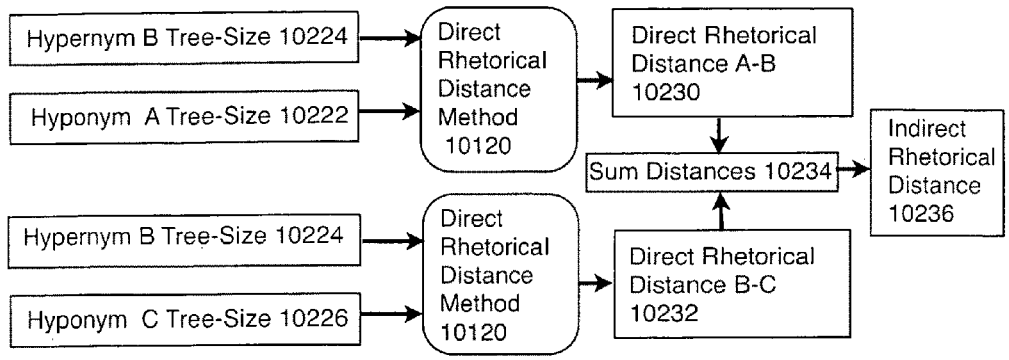
Method Of Calculating Rhetorical Distance Via Common Hyponum 10250
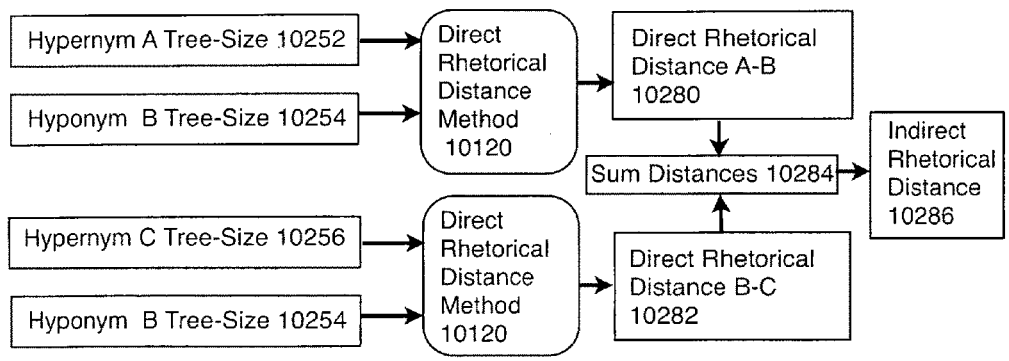
Indirect Rhetorical Distances 10290
| Key-phrase A | Tree-Size A | Key-Phrase B | Tree-Size B | Key-Phrase C | Tree-Size C | Distance A-B | Distance B-C | Total Distance |
|---|---|---|---|---|---|---|---|---|
| men | 5 | self-evident | 14 | hold | 2 | 2.8 | 10.5 | 13.3 |
| hold | 2 | truths | 1 | we hold | | 2 | 2 | 4 |
| truths | 1 | self-evident | 14 | created | 1 | 14 | 14 | 28 |
FIG. 102

SYSTEM AND METHOD FOR ANALYZING TEXT USING EMOTIONAL INTELLIGENCE FACTORS

CLAIM OF PRIORITY UNDER 35 U.S.C. Ø120

This application claims priority from U.S. provisional patent application No. 61/064,722, filed on Mar. 21, 2008, titled "ANALYSIS OF EMOTIONAL ASPECT OF TEXT," which is incorporated herein by reference in its entirety.

BACKGROUND OF THE INVENTION

1. Field of the Invention

The present invention generally relates to systems and methods for analyzing text, and more particularly to automated systems, methods and computer program products for facilitating the reading, analysis and scoring of text.

2. Related Art

In today's technological environment, many automated tools are known for analyzing text. Such tools include systems, methods and computer program products ranging from spell checkers to automated grammar checkers and readability analyzers. That is, the ability to read text in an electronic form (e.g. in one or more proprietary word processing formats, ASCII, or an operating system's generic "plain text" format), parse the inputted text—determining the syntactic structure of a sentence or other string of symbols in some language, and then compare the parsed words to a database or other data repository (e.g., a dictionary) or set of rules (e.g., English grammar rules) is known. This is true for text in different languages and regardless of whether that text is poetry or prose and, if prose, regardless of whether the prose is a novel, an essay, a textbook, a play, a movie script, a short manifesto, personal or official correspondence, a diary entry, a log entry, a blog entry, or a worded query, etc.

Some systems have gone further by attempting to develop artificial intelligence (AI) features to not only process text against databases, but to automate the "understanding" of the text itself. However, developing such natural language processing and natural language understanding systems has proven to be one of the most difficult problems within AI, due to the complexity, irregularity and diversity of human language, as well as the philosophical problems of meaning. More specifically, the difficulties arise from the following realities: text segmentation (e.g., recognizing the boundary between words or word groups in order to discern single concepts for processing); word sense disambiguation (e.g., many words have more than one meaning); syntactic ambiguity (e.g., grammar for natural languages is ambiguous, and a given sentence may be parsed in multiple ways based on context); and speech acts and plans (e.g., sentences often do not mean what they literally may imply).

In view of the above-described difficulties, there is a need for systems, methods and computer program products for facilitating the automated analysis of text. For example, publishing houses often receive large numbers of manuscripts from various authors seeking publishing contracts. The sheer volume of submissions (solicited and unsolicited) prevents publishing house personnel from physically being able to read each of the submissions. Consequently, for example, manuscripts that contain well-written stories which may be commercially successful, never make it through the review process.

Given the foregoing, what is needed is a system, method and computer program product for facilitating the automated reading, analysis and scoring of text. That is, for example, an automated tool to assist publishing house personnel to quickly "read" submitted manuscripts and score their quality would be desirable.

The need to facilitate automated reading of text goes beyond publishable manuscripts and into fragments of manuscripts and even smaller blocks of text in standard data formats, such as photograph captions and other elements of PDF format documents HTML web pages. To index and retrieve the meaning of these smaller units of text, Google and other search engine companies have devoted significant resources to creating keyword and phrase indices, with some semantic processing to group indexed text into semantically coherent ontological categories, for example. However, usable meanings of text are not confined to dry ontological semantics. Indeed, often the most useful meaning of text is a matter of emotional mood, which greatly influences textual meanings. From a human cognitive standpoint, it is well understood that children initially develop a foundation of emotional memories, concerning needs and curiosity, from which ontological memories are later developed. There is a similar need for the automated reading of text to proceed from a foundation of emotional references, in order to cohere a framework of retrievable text consistent with a human cognitive viewpoint. Building a framework of retrievable text upon dryly emotionless ontologies deviates considerably from natural human values, so much so that the resulting index may be several interfaces removed from natural human thought, requiring query and browsing interfaces to convert results into useful thoughts. An automated reading of text built upon a framework of human emotions would be more efficient, as the emotional desires of a user could be connected directly to an index of matching emotional text.

SUMMARY OF THE INVENTION

Aspects of the present invention are directed to systems, methods and computer program products for facilitating the automated reading, disambiguation, analysis, indexing, retrieval and scoring of text by utilizing emotional intelligence-based factors.

In one aspect of the present invention, an automated tool is provided to users, such as personnel of a publishing house that allows such users to quickly analyze a document. Such analysis may be used to assist in determining the potential commercial success of a submitted manuscript (solicited and unsolicited) for a fictional novel, for example. Such predicted commercial success could be based upon the quality of the writing of the document. In other aspects of the present invention, quality is based upon scores involving such factors as character development, rhythm, per-page quality, gaps, climaxes and the like, all as described in more detail below. In some aspects, the scores may be standardized (e.g., converted to a satisfaction-score), for example, by subtracting the population mean from an individual raw score and then dividing the difference by the population standard deviation, as will be appreciated by those skilled in the statistical arts.

BRIEF DESCRIPTION OF THE DRAWINGS

The features and advantages of aspects of the present invention will become more apparent from the detailed description set forth below when taken in conjunction with the drawings, in which like reference numbers indicate identical or functionally similar elements.

FIGS. 2, 5-46, 50, 52-53, 55-56, 63-64 and 80 are tables illustrating aspects of an automated reading, analysis and scoring text analysis process according to one aspect of the present invention.

FIGS. 49-50, 52-53, 58-62, 68-77 and 81-84 are exemplary windows or screen shots generated by the graphical user interface according to aspects of the present invention.

FIG. 87 shows exemplary dimensions of sentiment analysis for rhetorical test segmentation, in accordance with aspects of the present invention.

FIG. 89 show exemplary use of the method of FIG. 88 on a sentence fragment from the Declaration of Independence by Thomas Jefferson, in accordance with aspects of the present invention.

FIG. 90 shows a method of automatically generating a rhetorical ontology from the output of FIG. 88, as well as an exemplary rhetorical ontology generated from the sentence fragment of FIG. 89, in accordance with aspects of the present invention.

FIG. 91 shows exemplary intermediary key-phrase population analysis for generating the rhetorical ontology of FIG. 90, in accordance with aspects of the present invention.

FIGS. 94-96 are exemplary screen shots showing a user interface and system for uploading files and automatically generating a searchable ontology from their textual content, in accordance with aspects of the present invention.

FIGS. 97-100 are exemplary screen shots showing outputs from a story-arc, story and novel Satisfaction scoring system, as well as a correlation of automatically computed Satisfaction to actual sales, in accordance with aspects of the present invention.

FIG. 101 shows a method for calculating rhetorical distance between key phrases or terms, and exemplary calculations of rhetorical distances traversing an exemplary hierarchic tree, in accordance with aspects of the present invention.

FIG. 102 shows methods for calculating rhetorical distance between key-phrases linked by hypernym or via hyponym key-phrases, and an exemplary traversal across a set of key phrases or terms, in accordance with aspects of the present invention.

DETAILED DESCRIPTION

Aspects of the present invention will now be described in more detail herein in terms of an exemplary evaluation of a manuscript for a novel. This is for convenience only and is not intended to limit the application of aspects of the present invention. In fact, after reading the following description, it will be apparent to one skilled in the relevant art(s) how to implement variations of the present invention, such as assisting authors or customer audiences who access text for research and general reading (e.g., for evaluating texts other than novels, such as non-fiction, for evaluating portions of text, rather than an entire manuscript, for providing suggestions on how to improve the text in terms of character development and the like, and so seek unfamiliar works of text similar to familiar works of text).

The terms "user," "end user", "author", "writer," "customer," "participant," "editor," "reviewer," and/or the plural form of these terms are used interchangeably throughout this disclosure to refer to those persons or entities capable of accessing, using, being affected by and/or benefiting from, the tool that aspects of the present invention provide for facilitating the automated reading, analysis and scoring of text by utilizing emotional intelligence-based factors.

The System

Figure 85:
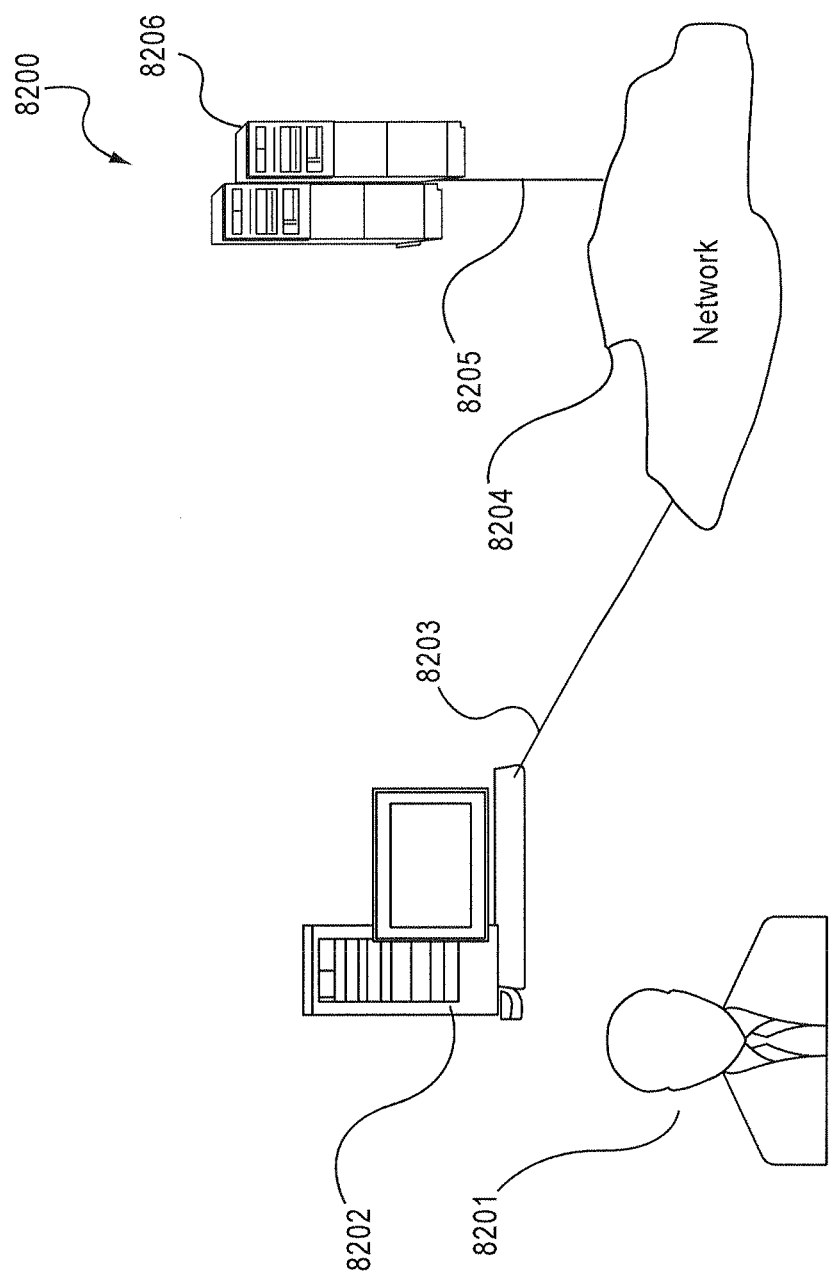
FIG. 85 is a system diagram of an exemplary environment in which the present invention, in an aspect, would be implemented.

FIG. 85 presents an exemplary system diagram 8200 of various hardware components and other features in accordance with an aspect of the present invention. As shown in FIG. 85, in an aspect of the present invention, data and other information and services for use in the system is, for example, input by a user 8201 via a terminal 8202, such as a personal computer (PC), minicomputer, laptop, palmtop, mainframe computer, microcomputer, telephone device, mobile device, personal digital assistant (PDA), or other device having a processor and input and display capability. The terminal 8202 is coupled to a server 8206, such as a PC, minicomputer, mainframe computer, microcomputer, or other device having a processor and a repository for data or connection to a repository for maintaining data, via a network 8204, such as the Internet, via couplings 8203 and 8205.

As will be appreciated by those skilled in the relevant art(s) after reading the description herein, in such an aspect, a service provider may allow access, on a free registration, paid subscriber and/or pay-per-use basis, to the tool via a World-Wide Web (WWW) site on the Internet 8204. Thus, system 8200 is scalable such that multiple publishing houses may subscribe and utilize it to allow their users (i.e., their editors, manuscript screeners, authors and/or writers within the public at large who wish to submit manuscripts for publications) to submit, review, screen, and generally manipulate various forms of text. At the same time, such a system could allow buyers and general readers to browse for publications or smaller units of text, such as salient sentences within blogs, which may be offered freely with related advertising chosen for salience.

As will also be appreciated by those skilled in the relevant art(s) after reading the description herein, alternate aspects of the present invention may include providing the tool for automated reading, analysis and scoring of text as a stand-alone system (e.g., installed on a single PC) or as an enterprise system wherein all the components of system 8200 are connected and communicate via an inter-corporate wide area network (WAN) or local area network (LAN). Further, alternate aspects relate to providing the systems a Web service as shown in FIG. 85.

Basis of Scoring

In aspects of the present invention, publishing house personnel and other users may seek to quickly analyze and determine the potential commercial success (and/or other attributes) of a textual document, such as, for illustration purposes only, a submitted manuscript for a novel. That is, for example, the reviewer seeks to determine how "good" of a story the writer has told in the manuscript. In such aspects, how good of a story the writer has told may be measured based upon the emotional response a reader has in reaction to the overall story as a function of each word (or group of words) contained within the manuscript. Thus, aspects of the present invention provide a tool for facilitating the automated reading, analysis and scoring of text utilizing emotional intelligence factors inherent to phonemic language. From a human cognitive standpoint, children may from time to time disagree with the use of a word as they learn language, but practically never dispute the meaning of a phoneme, especially as they grow to be adults. At the same time, their acquisition of language is closely tied to the momentary emotional states, which forms the basis of their language experience. Thus, on a phonemic level, language has evolved without any reason to question or change the underlying momentary emotional states that are associated with evolved patterns of phonemes. Without any impetus to change, our current languages, including modern English, have nearly entirely constant underlying mappings between momentary emotional states and patterns of phonemes.

That said, the question is how to decode and identify momentary emotional states within existing patterns of phonemes. Aspects of the present invention are related to a series of attempts made in earlier research which find consistent patterns of meaning in phonemes.

First, in the seminal paper "Letter Semantics in Arabic Morphology: A Discovery About Human Languages," presented at the Linguistics Institute at Stanford University, pp. 21-52 (July 1987), which is hereby incorporated by reference in its entirety, T. Adi and O. K. Ewell proposed that each letter acts on our mind in a way that is different from every other letter, in various ontological categories of meaning. This reflects a general notion that language evolved from some primitive categories of utterances. Thus, every word of a natural language, being a combination of alphabetic letters, would also act on our mind in a way that is different from other words. This notion applies to every language that has an alphabet, even if that alphabet is retro-actively defined around existing spoken language phonemes, such as Pinyin alphabetic writing in China. Aspects of the present invention depart from Adi and Ewell in order to build a foundation for indexing meanings around emotion rather than dry ontology. In short, it is more accurate to say that words primarily invoke emotions and only secondarily invoke ontologies.

An example of the above concept can be illustrated by the word "car." If the word is read by a reader in the context of transportation, then it may invoke a positive emotional reaction, and thus a positive emotional value (or score) would be attributed to the text. If the context of reading the word "car," however, is pollution, then it may invoke a negative emotional reaction, and thus a negative emotional score would be attributed to the text.

Second, in the book "Star Signs" by Linda Goodman, ISBN 0-312-95191-4 (St. Martin's Press, 1988), which is hereby incorporated by reference in its entirety, the numerological process of digit summing is discussed. That is, there are different methods by which a word may be reduced to a single digit or number based on the letters that comprise the word, and then conclusions may be reached based on the single digit or number that is produced by manipulating numerical values assigned to each letter comprising the word in question. In the fields of numerology and astrology, different methods of performing digit summation calculations exist, including Chaldean, Pythagorean, Hebraic, Helyn Hitchcock's method, Phonetic, Japanese and Indian. For example, in the Chaldean system of numerology, letters are assigned the numeric values shown in FIG. 2 (referred to herein as "chromo-num"). In accordance with aspects of the present invention, the concept of associating numbers with letters is a generally workable and useful technique, so the values shown in FIG. 2 could be augmented or permuted to handle punctuation and other alphabets, for covering a greater variety of text. Aspects of the present invention depart from Goodman assuming that emotions are more fundamental than traditional divination categories, such as "Star of the Magi" and "The Wheel of Fortune."

Thus, given the premise that words invoke emotions (which in some aspects may be positive or negative, depending on the context), and that words can be converted to a number based on one or more digit summation methodologies, a scoring system can be devised to analyze a manuscript based on one or more emotional intelligence factors to determine the quality of the text (e.g., the story) contained in the manuscript, with an alphabet potentially applicable to any human language.

The Gene-Num Pair Analysis Process

Figure 1:
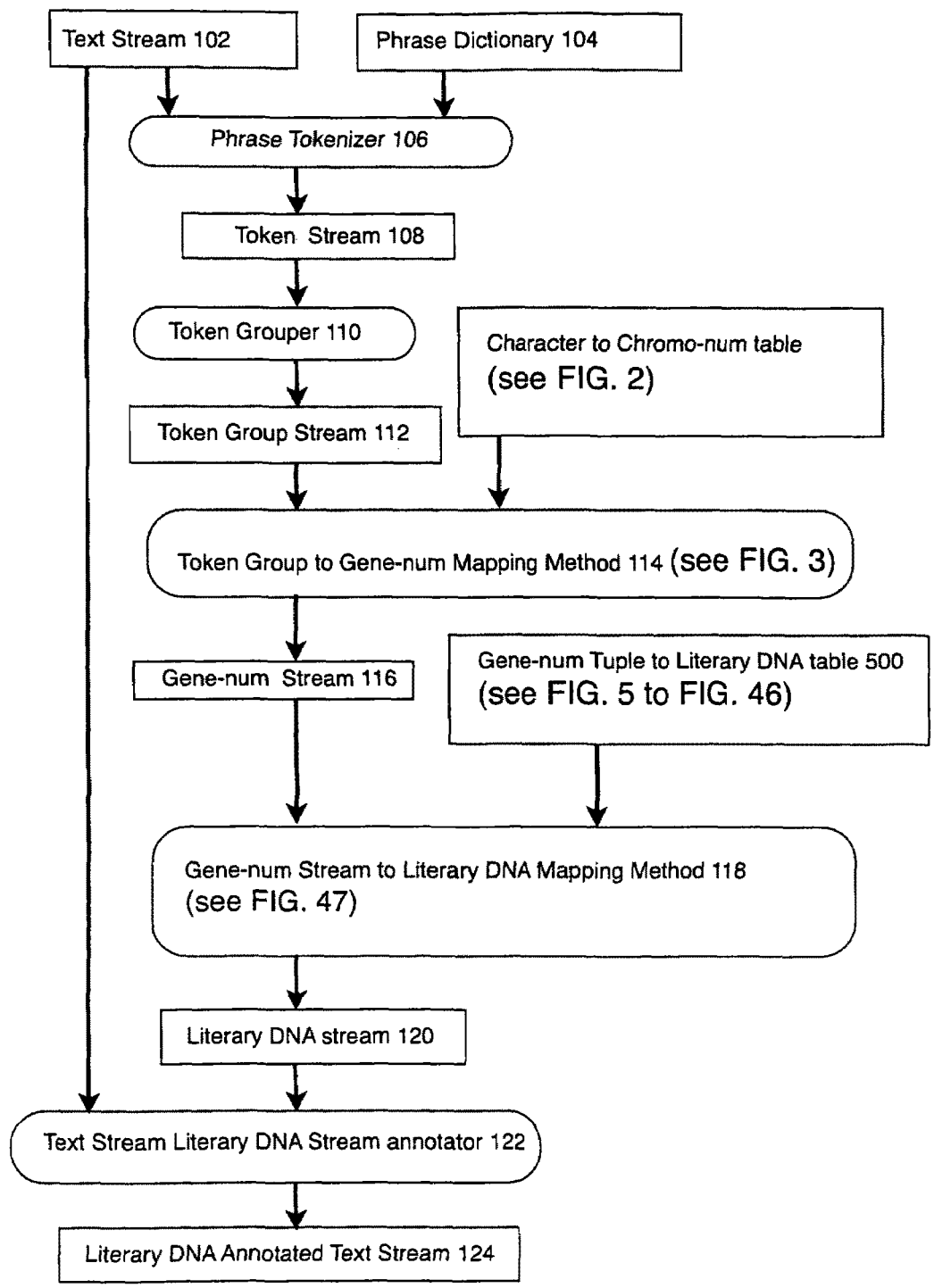
FIGS. 1, 3-4, 47-48, 51, 54-57, 65-67 and 78-79 are flowcharts illustrating an automated reading, analysis and scoring text analysis process according to one aspect of the present invention.

Referring to FIG. 1, a flowchart illustrating an automated reading, analysis and scoring text analysis process 100 is shown, according to one aspect of the present invention.

Process 100 begins at step 102 where a stored text stream to be analyzed is taken as the input of process 100. The text stream, in one illustrative example in accordance with an aspect of the present invention, is the manuscript being analyzed. As will be appreciated by those skilled in the relevant art(s), that the text stream may be in electronic form (e.g., in one or more proprietary word processing formats, ASCII or in an operating system's generic "plain text" format).

In step 104, a phrase dictionary is loaded into memory in preparation for analyzing the text stream. In one illustrative example in accordance with aspects of the present invention, the phrase dictionary loaded in step 104 is the WordNet® lexical database of English developed at Princeton University. As will be appreciated by those skilled in the relevant art(s), a "normal" dictionary typically is not useful in step 104 because, for example, the word "go" and the word "up" each have a distinct meaning that is different that the phrase "go up." Thus, The WordNet database or other similar lexical database is a useful tool for computational linguistics and natural language processing, as nouns, verbs, adjectives and adverbs are grouped into sets of cognitive synonyms, each expressing a distinct concept. WordNet® or other similar databases, which are potentially useful for use in accordance with aspects of the present invention, are now under development for multiple languages around the world beyond the English language.

In step 106, the text stream inputted in step 102 is processed through phrase tokenizer (e.g., a parser), such that the text stream may be separated into tokens (e.g., blocks of text), categorized using the phrase dictionary inputted in step 104. Step 106 produces a token stream (in step 108). In step 110, the token stream is processed, such that an n-tuple of tokens are grouped for later processing, for example. In one variation of the present invention, tokens are grouped into triplets (i.e., n=3-tuple), thereby producing a token group stream. More specifically, when n=3, step 110 groups: the $1^{st}$, $2^{nd}$ and $3^{rd}$ token from the token stream into the token group stream; then, the $2^{nd}$, $3^{rd}$ and $4^{th}$ token from the token stream are grouped into the token group stream; and so on until all n-tuples of the token stream are grouped and stored in the token group stream in step 112.

Figure 3:
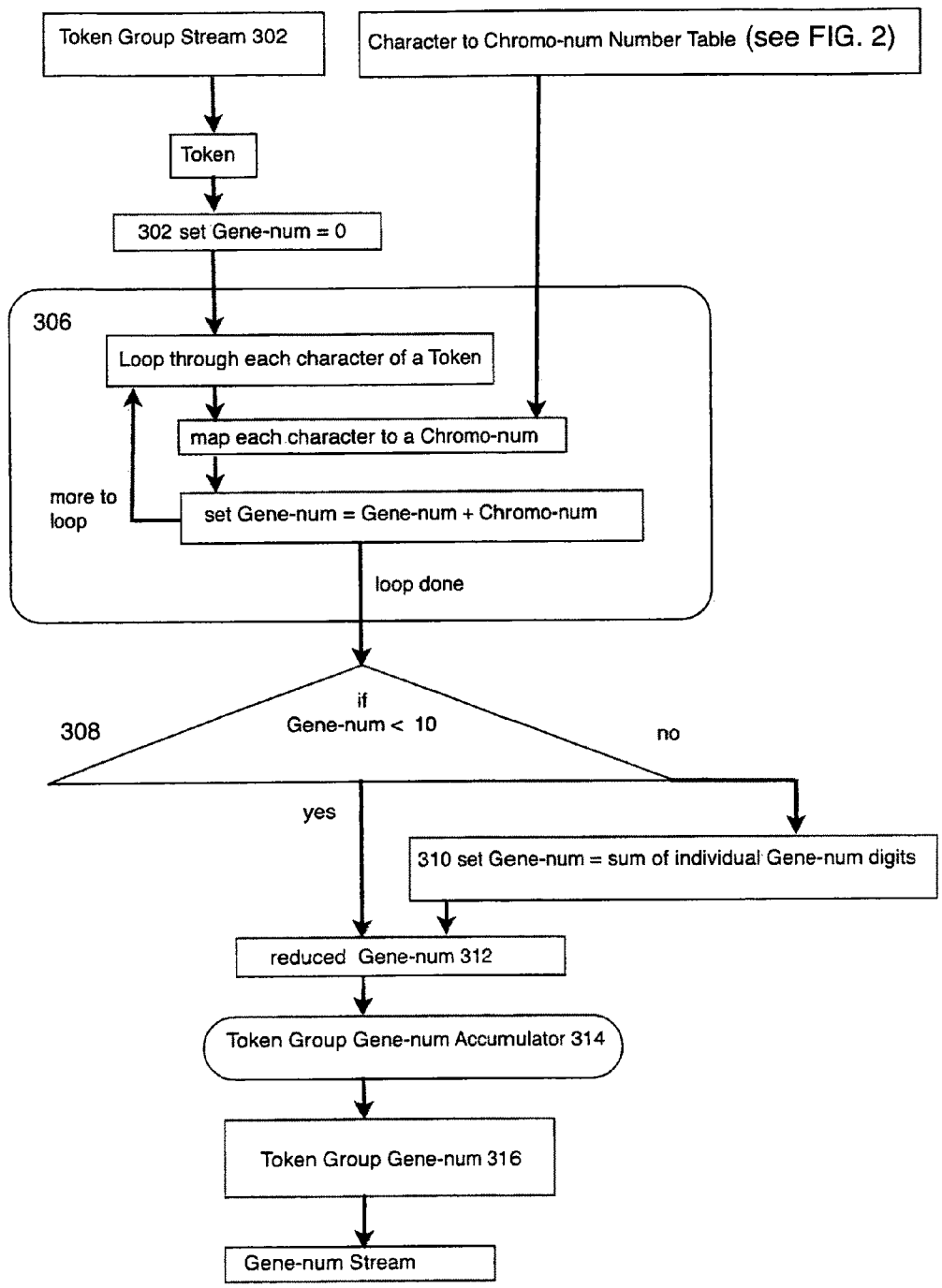

In step 114, the token group stream (e.g., the stored n-tuples of tokens) is mapped to what, in one aspect of the present invention, is referred to a "gene-num" using a digit summation process (as shown in FIG. 3, for example). Digit summation process 114 produces a gene-num stream, which can be stored in step 116. In step 118, the gene-num stream is mapped to a "literary DNA table" by a process shown in FIG. 47 resulting in the literary DNA stream stored in step 120. In step 122, the original text stream inputted in step 102 is annotated with the numerical results from the literary DNA stream stored in step 120. Then, in step 124, the text stream annotated with the literary DNA stream may be presented to the user (as shown in screen 4900 of FIG. 49, for example).

As will be appreciated by those skilled in the relevant art(s) after reading the description herein, the lexicography of aspects of the present invention mirrors (i.e., by analogy) that of the life sciences. That is, the method starts with individual tokens (e.g., chromosomes), groups the tokens to derive the "genes" of the text under analysis, and groups the "genes" to derive the literary "DNA" of the analyzed text.

Referring to FIG. 3, a digit summation process 114, according to an aspect of the present invention, is shown. That is, digit summation process 114 details how a token group stream stored in step 112 of process 100 is converted into a gene-num stream to be stored in step 116 of process 100.

In step 302, the tokens of the n-tuple in the token group stream are considered one at a time. In step 304, the gene-num count variable is set to zero. In loop step 306, each character in a token is mapped to its numeric (Chaldean system) equivalent, as shown in table 200 (FIG. 2). Loop step 306 thus produces a (digit summation) gene-num for the token. In step 308, it is determined if the gene-num is less than 10. If not, the gene-num value is set to the sum of the individual digits and stored in step 312. That is, if the gene-num is 17, it is now set to 8 (i.e., 1+7) in step 310. As will be appreciated by those skilled in the relevant art(s) after reading the description herein, if the calculated gene-num were 49, then step 310 would produce 13 (i.e., 4+9); if the calculated gene-num was 99, then step 310 would produce 18 (i.e., 9+9); if the calculated gene-num was 299, then step 310 would produce 20 (i.e., 2+9+9); and so forth.

In step 314, the gene-num number stored for each token in the n-tuple is added and stored in step 316. Thus, in one aspect of the invention when n=3, the digit summation results stored in step 312 for each of the three grouped tokens in the token group stream are added in step 316 and stored as the gene-num stream in step 116.

Figure 47:
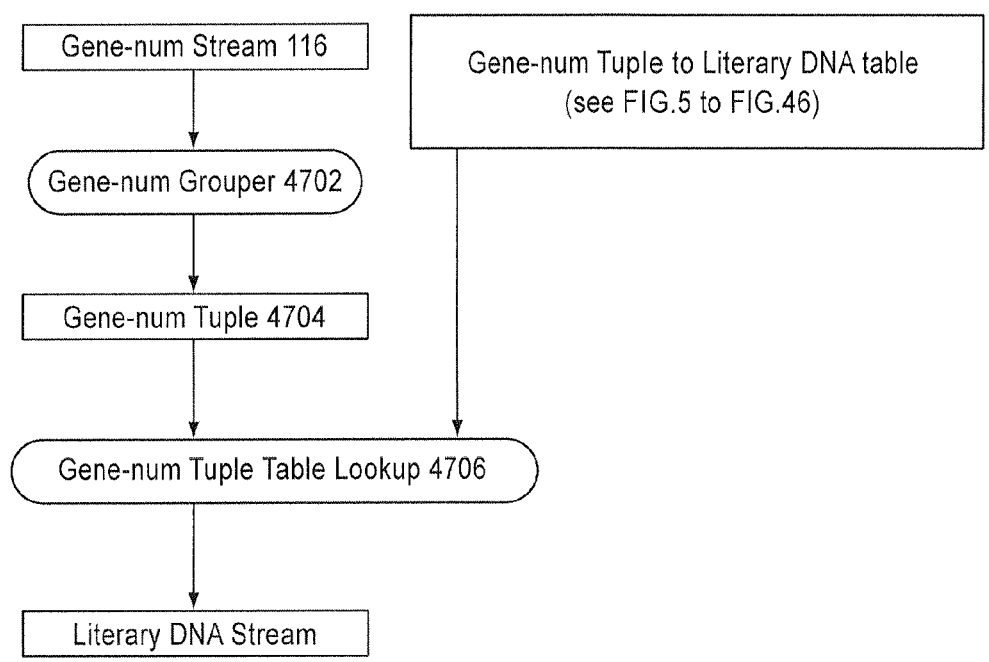

Referring to FIG. 47, a gene-num stream to a literary DNA stream process 118, according to an aspect of the present invention, is shown. That is, a gene-num stream to a literary DNA stream process 118 details how a gene-num stream stored in step 116 of process 100 is converted into a literary DNA stream to be stored in step 120 of process 100.

In step 4702, the gene-num stream stored in step 116 of process 100 is used as input into process 118. Then, in step 4702, the gene-num stream (i.e., the digit summation values) is grouped into n-tuples for further processing and stored in step 4704. According to one aspect of the present invention, the gene-num stream may be grouped into pairs (i.e., n=2). Thus, in step 4706, two gene-num pairs (i.e., a stream of [gene-num A, gene-num B] pairs) are used as lookup values into tables 500, producing a literary DNA stream, which is stored in step 120.

As will be appreciated by those skilled in the relevant art(s) after reading the description herein, when tokens of the input text stream are grouped in n=3-tuples in step 110 (FIG. 1), and when the gene-nums are grouped into n=2-tuples in step 4702 (FIG. 3), in one aspect of the present invention, the literary DNA of the text (e.g., emotional intelligence the analysis used to determine the quality of the input text is being based upon) produces groups of six tokens at a time.

Referring to FIG. 5, a lookup table 500 used to convert the gene-num stream (e.g., the stream of [gene-num A, gene-num B] pairs) to a literary DNA stream, according to one aspect of the present invention, is shown. The first column of lookup table 500 indicates the various values for gene-num A within the stream of [gene-num A, gene-num B] pairs determined in step 4702 (FIG. 47) and how these values map to an emotional category (e.g., "get it", "ah yes," hmmm," "idealism") shown in the second column of table 500. The third column of table 500 then indicates the table (e.g., figure number) where the value for gene-num B corresponding to the [gene-num A, gene-num B] pair under consideration may be found. For example, if the gene-num pair under consideration were [gene-num A=10, gene-num B=12], table 500 and FIG. 26 would indicate that [gene-num A=idea of respect, gene-num B=cautiousness] with a level=1, positive=1 and negative=1, would be the literary DNA annotation to the input text stream corresponding to the gene-num pair [10, 12].

In an aspect of the present invention, Level, Pos (positivity) and Neg (negativity) are summary attributes of each gene-num concept pair, such as idea of respect. These summary aspects are used to summarize overall emotional characteristics of units of text, so that a sentence, paragraph or page, for example, may by characterized by its overall positivity or overall negativity, by summing the positivities or negativities of its constituent tuples of text phrases. The Level is used to characterize overall emotional levels of text, where Level 1 indicates emotion about details, Level 2 indicates reactionary emotions about present events, and Level 3 indicates motivational emotions pertaining to past or future events. In some variations of the present invention, Levels are used to determine which levels of emotion are addressed by a section of text, and whether or not any levels are missing. For instance, a section of text missing level 2 may signify a hollowness of meaning, whereas missing level 1 may signify ungroundedness, and missing level 3 may signify a lack of orientation. All Level, Pos and Neg numbers are assigned as shorthand for condensing the meaning of a gene-num concept pair, along specific dimensions of emotion. As shown in FIGS. 5-46, these numbers are assigned in a conveniently small range of integers, to simplify the results of summing them in later processing. For instance, the difference between Pos and Neg for each gene-num concept pair is limited to 4, −3, −2, −1, 0, 1, 2, 3 or 4 to facilitate graphing and colorizing functions of subsequent display methods, while still providing a sufficient range to express differing intensities of emotions.

In accordance with other aspects of the present invention, dimensions of emotions may be extended beyond Pos and Neg to encompass emotional intelligence inherent to the gene-num pair concepts of FIGS. 5-46. FIG. 80 shows three additional dimensions of Fear-Comfort, Blues-Inspiration and Wisdom-Naiveté, in accordance with another exemplary implementation of the present invention. Many other such dimensions could be mapped; however, it has been found by experimentation that the three dimensions shown in FIG. 80 align well with the Chaldean system of numerology. FIG. 80 shows how the mapping table of FIG. 24 can be extended into three additional dimensions, while retaining a column L of Level, P of Pos and N of Neg characteristics. In accordance with aspects of the present invention, the tables shown in FIGS. 5-46 may be similarly reconfigured to have additional dimensions. The three additional dimensions headed by Fear, Blues and Naiveté shown in FIG. 80 are actually be more relevant to logical story-arc progressions than simple displacements between Pos and Neg. For instance, high Naiveté in the gene-num pair concept of "reckless thought" may best be resolved by low Naiveté, for instance, using the gene-num pair concept of "discerning courage." In a more simplistic Pos-Neg arc resolution system, "reckless thought" might also be resolved by "glory," although this approach may unfortunately ignore the implied residue of ignorance, for example. Nevertheless, the relative simplicity of building analysis and display tools for a simple Pos-Neg resolution system often favors its use, particularly among casual users. Aspects of the trade-off between accuracy and usability will be discussed in more detail below, after more of the user interface elements have been introduced.

The Development Process

Figure 4:
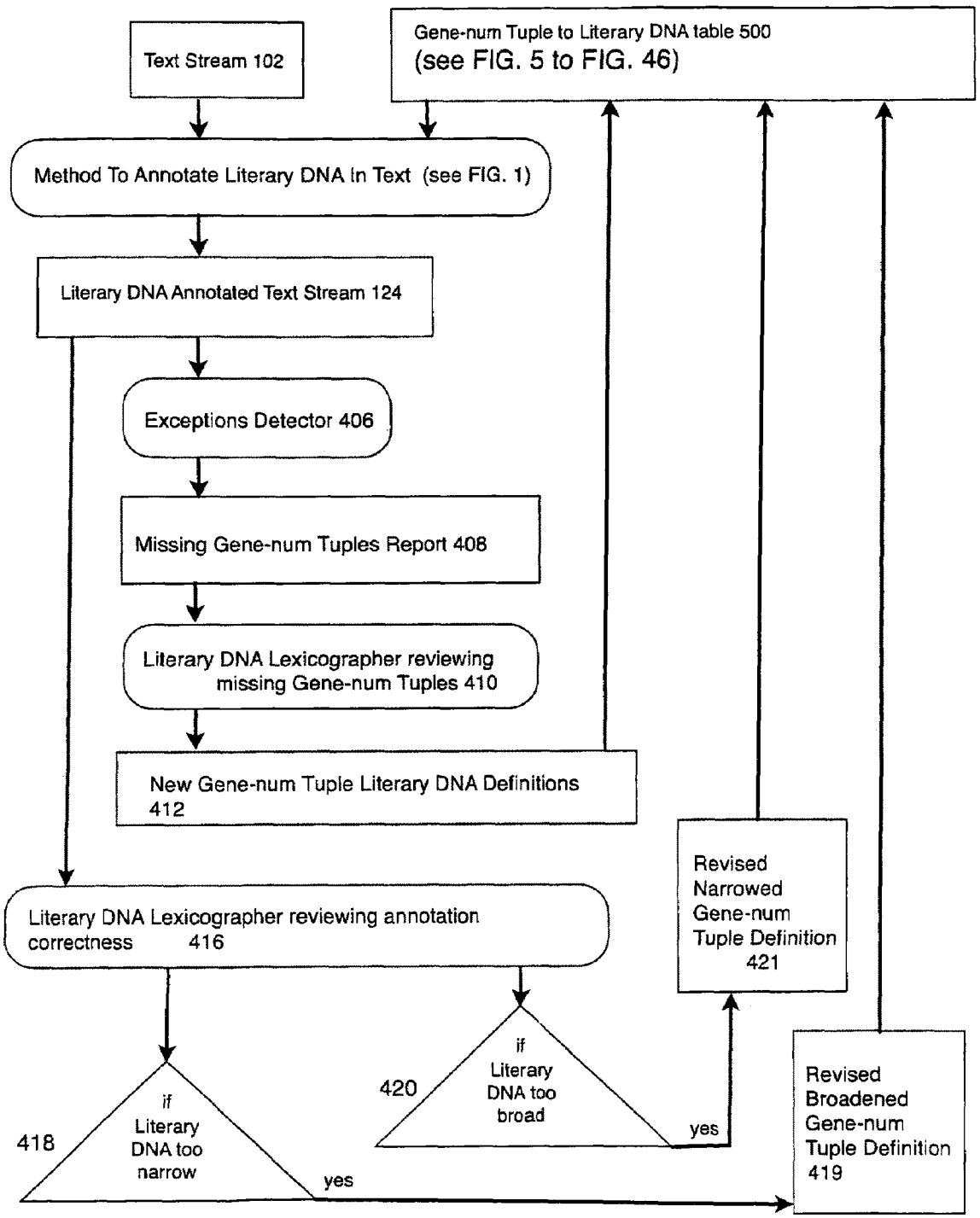
Figure 54:
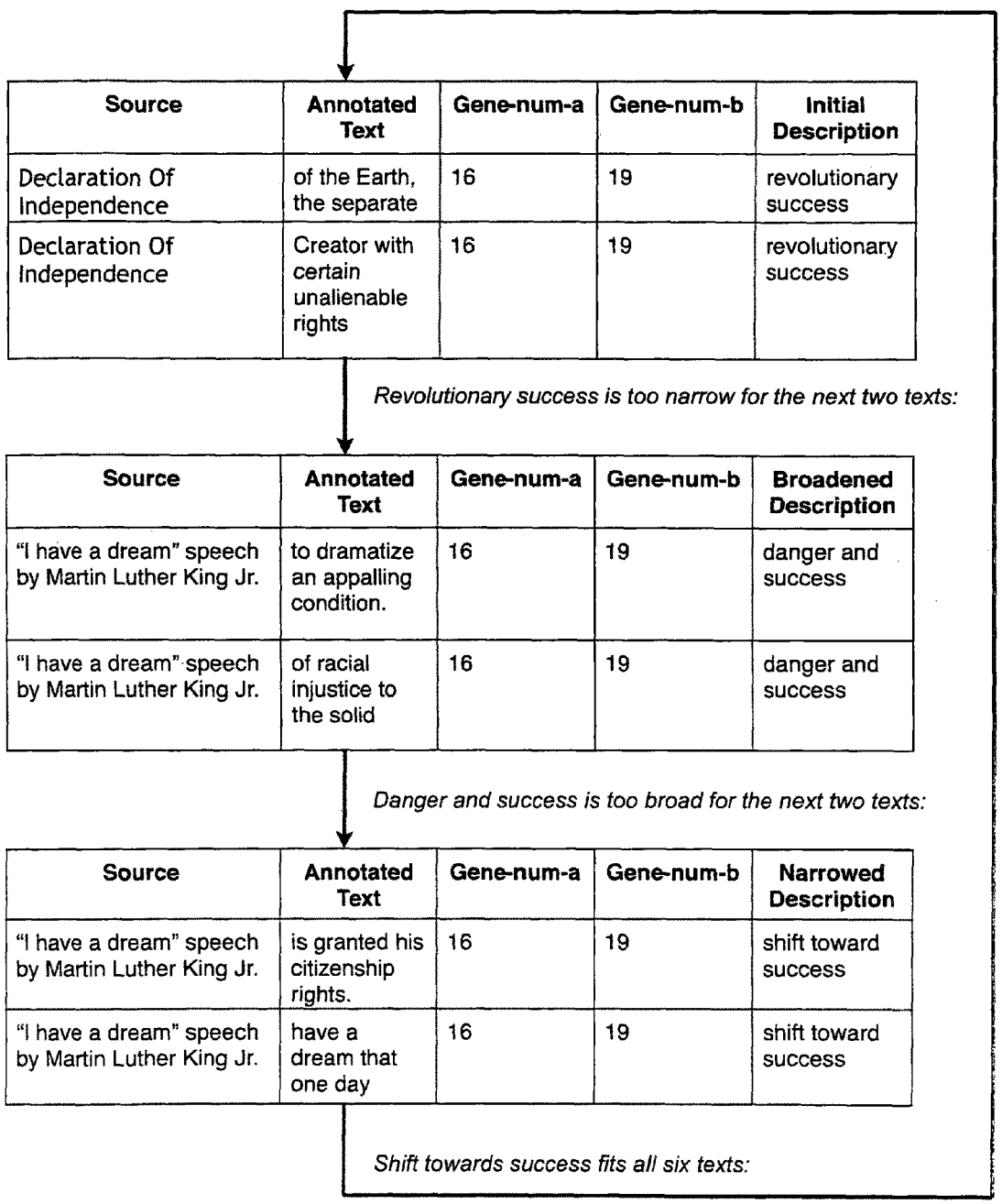

Referring to FIG. 4, a gene-num tuple to the literary DNA table development process 400, according to an aspect of the present invention, is shown. That is, development process 400 details how the literary DNA categories shown in table 500 were iteratively developed. As with most automated text analysis methods, there is a reporting mechanism for symbols lacking meanings 406, generating an exceptions report 408 of the Gene-num pairs found in step 102, which have no corresponding entries in 500. The report may contain such information as the missing gene-num pair, its constituent single-number Gene-Num-a meanings from FIG. 5, and a citation of sentences and paragraphs where the missing gene-num pairs were found. This report is then reviewed by skilled lexicographers 410, for example, to determine the likely emotions implied by the citations to add the corresponding entries 412. As with most automated text analysis methods, there also is an error rate for miscategorizations, and associated correction mechanisms. Variations of the present invention allow miscategorizations themselves to be categorized by skilled lexicographers 416 into two broad categories: 418 overly narrow concepts and 410 overly broad concepts. Narrowness and broadness are somewhat subjective, so for clarity, FIG. 54 shows an example of two iterations through the loop of process 400. While processing the "Declaration of Independence" by Thomas Jefferson, the gene-num pair 16-19 was assigned "revolutionary success" as its concept. Yet, while later processing the "I have a dream" speech by Martin Luther King, Jr., citations for the gene-num pair 16-19 went beyond the meaning of "revolutional success" into emotional meanings where neither revolution nor success were certain. Therefore, to cover all citations for the gene-num pair 16-19, "revolutionary success" was replaced by the broader concept of "danger and success." Still later, more citations from the "I have a dream" speech showed that the gene-num pair 16-19 is associated with the more specific emotional quality of a "shift," and, subsequently, the overall citations for the gene-num pair 16-19 were found by experimentation to be closer to the narrower concept of "shift towards success." One aspect of the present invention is to keep a record of all changes to concepts assigned to gene-num pairs, to give lexicographers a sense when changes are converging upon a reliable concept. It has been found by experimentation that once this convergence is established, it remains very stable; for example it has been found that the tables of FIG. 5-46 will be approximately 90% stable each time the universe of citations analyzed is increased tenfold.

Other Gene-Num Pair Aspects

Lookup table 500 shown in FIG. 5 only contains gene-num values ranging from 0-50, in accordance with one exemplary implementation of the present invention. It has been found experimentally that this range represents the gene-num values covering up to 99.9% of English text. In another variation of the present invention, the lookup tables 6-46 only account for gene-num B values in the range of A to 50, so as to conserve computing power, at a slight disadvantage to accuracy.

It has been has found experimentally that parsing text in six-word groupings and treating punctuation as words is sufficiently accurate for about 90% of citations analyzed. Furthermore, of the approximately 10% of citations which appear mismatched to gene-num-pair concepts, approximately 90% have been found to be well matched to citations within the same paragraph, indicating that underlying emotional meanings of letter combinations naturally eventually converge to the mappings of FIG. 5-46. Consequently, the approximately 10% mismatch can be viewed as a kind of emotional digression within the text, and it has been experientially found that such digressions generally weaken the text, making the results of the analysis less vibrant and more obscure.

Aspects of the present invention can utilize longer word groupings for higher accuracy; however, the size of the mapping tables increases exponentially with increasingly longer word groupings. For instance, for a nine-word mapping, FIG. 5-46 would become roughly 50 times larger in size, requiring man-years instead of man-weeks of effort to develop using the literary DNA table development process 400 of FIG. 4.

Higher Emotional Analysis

Figure 48:
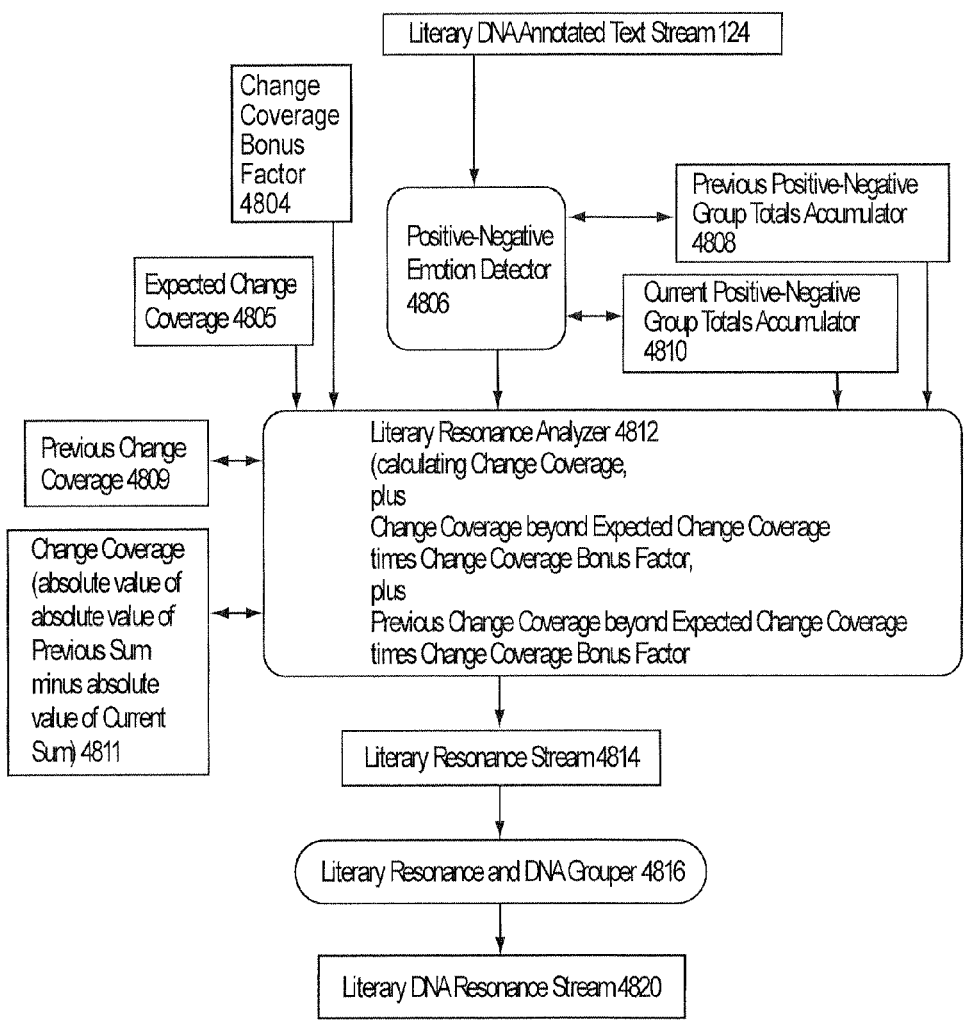

Gene-num pair concepts are fundamental to higher and more complex emotional analyses of text. As a first step, the degree to which a passage of text resonates emotionally can be easily gauged by measuring the degree to which the text efficiently combines opposing emotions. As expository writing gains strength by showing that all issues have been covered, text that threads back and forth between Positive and Negative emotions has generally been found to be more convincing than text with a monotone emotional slant. FIG. 48 is a flowchart outlining a method 4800 for measuring this effect for a curve 4802. Conceptually, method 4800 measures the area captured by curve 4802 of fluctuation between Positive and Negative emotion over a given section of text. As the curve 4802 captures a contiguous text of Negative emotion 4801, then goes on to capture a contiguous text of Positive emotion 4803, both measured by an Emotion Detector 4806, a Resonance Analyzer compares 4812 the Previous Neg Sum 4801 to the Current Pos Sum 4803 stored 4808, 4810 in two Accumulators respectively. Richly resonant text has generally greater emotional contrasts, so the Accumulators will contain larger totals. Poorly resonant text has generally less emotional contrasts, so the Accumulators will contain smaller totals. The Emotion Detector feeds 4806 the storage 4808, 4810 for the Accumulators. Whenever the sign of the curve 4802 switches from Neg to Pos or from Pos to Neg, the Emotion Detector discards 4806 the Previous sum determined in step 4808, moves the Current sum determined in step 4810 to the sum determined in step 4808, and initializes the Current sum determined in step 4810 with the absolute value of the current emotional magnitude of curve 4802. Subsequent absolute values of emotional magnitudes of curve 4802 are summed in step 4810 until 4802 again switches emotional sign. Whenever such a switch in emotional sign occurs, the Resonance Analyzer computes 4812 the difference between Accumulators stored in steps 4808 and 4810 just prior to the switch in sign calculation occurring in step 4811. Thus, this calculation 4811 describes the raw magnitude of emotional resonance at the time of the switch in emotional sign. Aspects of the present invention relate to other refinements improving upon the accuracy of the calculation of step 4811. For instance, it is well known than human readers generally ignore tiny shifts in textual emotions. As compensation, an expected minimum change coverage determination 4805 can be used to set a minimum level of shift before the credit of step 4811 is calculated. Also, it is well known that previous resonance bleeds excitement into currently read text, so a bonus factor can be applied 4808 in the Resonance Analyzer calculation of step 4812 to give extra credit to already resonating text, based upon the magnitude of resonance at the previous emotional sign switch of the curve 4802.

The output of the Resonance Analyzer 4812 goes to the Resonance Stream determined in step 4814, which is converged back into the main Literary DNA stream produced in step 4820 by a Resonance and DNA grouper operation 4816.

In FIG. 49, analysis of the pre-amble to the "Declaration of Independence" by Thomas Jefferson is shown as an example of both highly resonant and less resonant text using the process shown in FIG. 48. Resonance numbers are followed by asterisks (*). Since Accumulators determined in steps 4808 and 4810 start as undefined, the first sign change from positive to negative at "events it becomes necessary for one" in the text of FIG. 49 results in a zero coverage (step 4811) since Previous Sum is undefined. The subsequent sign change from negative to positive at "the political bands which have connected" in the text of FIG. 49 is 4.0 from absolute value of 8 minus 4, since the previous positive sum from "When in the Course of human events it becomes" in the text was absolute value 4, and the current negative sum from "necessary for one people to dissolve the political bands" in the text is absolute value 8.

A resonance of 4 is strong for such a short segment of text, but the Declaration becomes even more intense at "the separate and equal station" in FIG. 49 because of the prior resonance and greater capture areas relative to the curve 4802 shown in FIG. 48. The resonance falls back to 4 at "to which the Laws of Nature" in the text but scores hugely with 8 at "self-evident, that all men are" and "created equal, that they are endowed by their Creator with certain unalienable rights, that among these are Life, Liberty and." Such a phrase, which established, against difficult odds, the strikingly idealistic hallmark of a new country, had to convey such a strong resonance. Writers using some variations of the present invention can quickly write new strongly resonant texts by clipping out weakly resonance sections to replace them with strongly resonant sections. Furthermore using methods in accordance with aspects of the present invention as a scoring mechanism, other strongly resonant historic texts can easily be identified.

For example, FIG. 50 shows portions of the "I have a dream" speech by Martin Luther King, Jr., which is analyzed using the method 4800 of FIG. 48. By adding up the total literary resonance of all text within each paragraph (and allowing the Accumulators of steps 4808 and 4810 to carry over from paragraph to paragraph), a crescendo of resonance can be shown as building from "You have been the veterans of creative suffering . . . somehow this situation can and will be changed" with a resonance of 0 to "Let us not wallow . . . deeply rooted in the American dream," having a resonance of 4, to "I have a dream . . . a table of brotherhood" at a resonance of 5, to "I have a dream . . . not be judged by the color of their skin but the content of their character." at a peak resonance of 8. Note that in the Pos and Neg columns in the table of FIG. 50, the simple totals of Positive and Negative gene-num pairs are tallied. These results will subsequently enable story arc shifts to be calculated.

Story Arc Analysis

Using paragraph totals for Pos and Neg magnitudes on constituent gene-num-pairs, for automatically analyzing story arcs, methods in accordance with aspects of the present invention search for the presence of story characters within each paragraph. Such characters are essential to story analysis since without characters, there is no story. The detection of characters may be quite difficult, as the English language, for example has many symbols to refer to a character, such as "she," "it," "their," etc. Those skilled in the art of automated text processing are familiar with the problems surrounding mapping of anaphor references via English pronouns, for example. Fortunately, a story arc analysis need not be perfectly precise to each individual pronoun citation, but rather need only be accurate to a paragraph citation. Even if "I" and "You" are confused within a single paragraph, for example, the characters involved in that paragraph are still being accurately tracked. Consequently, proximity to literal character references and proximity to literal character attributes generally suffices to accurately track story arcs, once Neg and Pos or other dimensions of emotions have been calculated for paragraphs. Some variations of the present invention use original paragraphs as written, as the standard window or unit of text for which characters and emotions are detected, but other variations use a more consistent word or letter length limit, or word or letter length triggering a boundary at the nearest complete sentence. The former favors writers crafting effective paragraph boundaries, while the latter favors the consistency of scoring for manuscripts.

Figure 51:
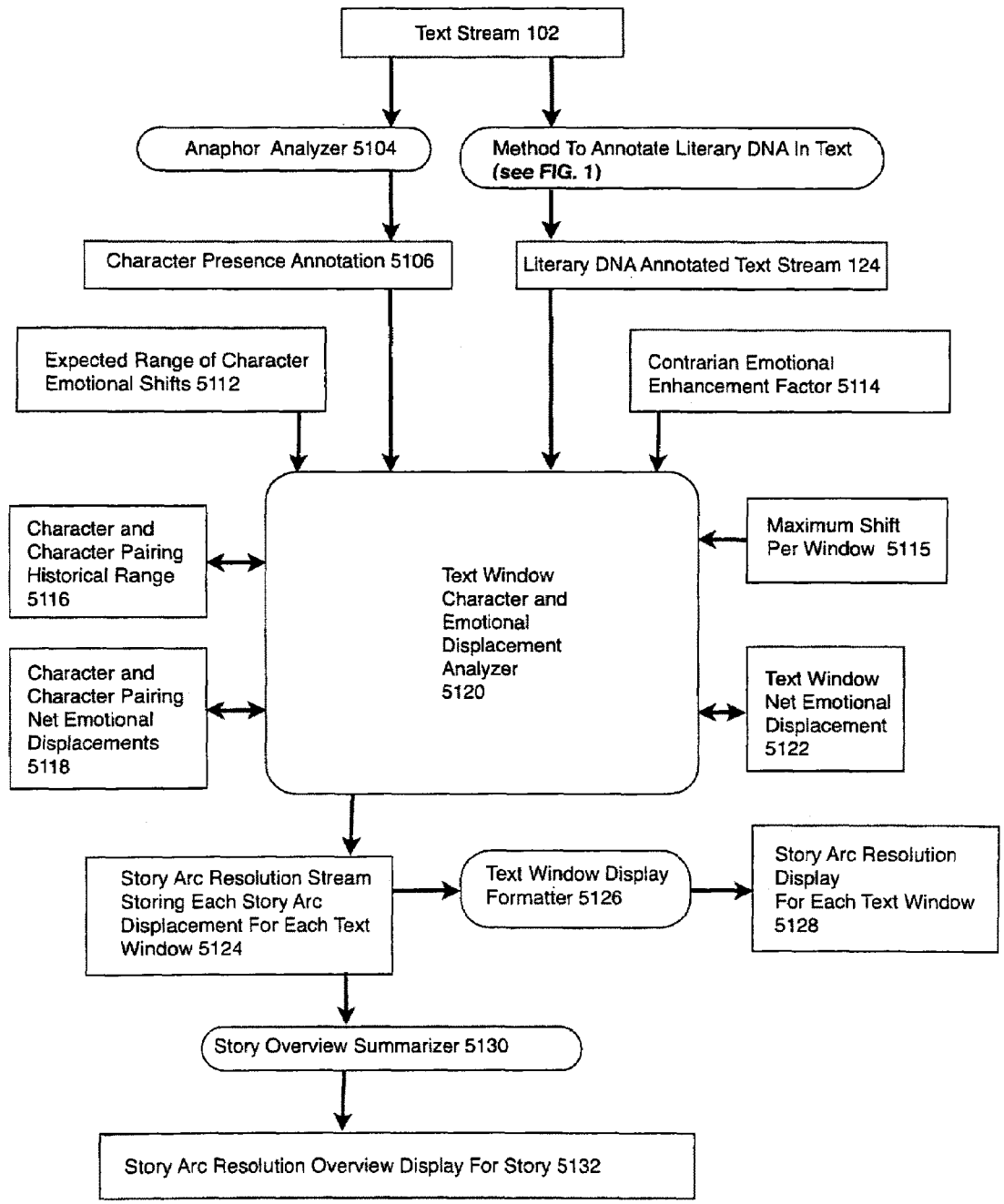

In FIG. 51, the Text Stream 102 is shown as being fed into a method 5100 for mapping tension and resolution within story arcs. As discussed above, Anaphor Analyzer results from step 5104 are used to compute Character Presence Annotation 5106 from the Text Stream 102. Joining this result is a Literary DNA Annotated Text Stream 124 at Emotional Displacement Analyzer operating at step 5120.

It has been found experimentally that useful measures of emotional displacement associated with story characters can be computed directly from multiplying emotional strength vectors in dimensions of Positive, Negative, Fear, Blues, or Naiveté feelings. However, such displacements tend to be excessively monotonic, either trending higher or lower throughout a story. Experimental analysis of a variety of different story genres, such as filmscript, mystery, romance, and fantasy, shows that important turning points in story arcs will be missed by computation of emotional displacements directly proportional to emotional strength vectors from the annotated text stream. Psychologically, there is a well-known cognitive human emotional trait aptly referred to by the saying "a little bit of delusion goes a long way." For instance, in the midst of a long negative emotional text, a character may encounter a small amount of positive text, perhaps in the form of encouragement. Human nature will focus strongly on this tidbit of positive news, and sense a hopeful positive shift all out of proportion to the actual sum amount of positivity in that text. Similarly, in the midst of a long positive text, when a small amount of negativity will appear, it is human nature when reading such text to see it as a seriously out-of-place anomaly worthy of great consternation. Consequently, aspects of the present invention provide for application of a contrarian enhancement factor 5114. When a contrarian emotion appears, such as positive emotion amid text with an overall negative displacement, or a negative emotion amid text with an overall positive displacement, the enhancement factor calculated at step 5114 boosts the weight given to the contrary emotion, thus enabling the method 5100 to emulate human emotional nature. Modeling the effects of hope and consternation can be performed in a variety of ways. In some variations of the present invention, the historic displacement range of the story arc determined at step 5116 is used as a guideline, so that peakier arcs boost contrarian emotions more than less dramatic arcs. To grant a default enhancement early in a story before story arcs have had time to grow, a small expected range is used, 5112 until a produced historic range surpasses the expected range.

Another a well-known cognitive human emotional trait is the tendency to ignore or gloss over repeating emotions. Thus, aspects of the present invention use Contrarian Emotional Enhancement determined in step 5114 in reverse, to reduce shifts that would increase the displacement of already existing displacements.

After involving the various factors discussed above, the Displacement Analyzer outputs the actual displacement of each story arc for each text window or paragraph. Although a smaller or larger unit of text could be used as a unit of arc displacement, a paragraph or grouping of two or three sentences is small enough to be quickly rewritten, when methods in accordance with aspects of the present invention are used as an authoring tool and, at the same time are small enough to accurately assess where stories are exciting, while large enough to avoid analysis of excessive details. Display of story arcs is a remarkably convenient way to see the essence of dramatic tension within a story. Writers using this display can see flat spots and tweak them for greater tension, for example. Editors using this display as a tool can see whether a story has the necessary dramatic tension to sell well. Readers using this as a tool can see, without even reading a book, where the most exciting parts are and how long they last, so as to determine the worth of continuing to read the text. Since a paragraph-by-paragraph display of major story arcs of a novel consumes two or three times the display space of the entire book's pages, it is often useful to have a condensed overview summary display, as produced at step 5132, in which sections of between about three and thirty pages in length are displayed as a single row of data, showing the most intense paragraph from that section to represent the text, and showing the net character arc positions, average Positive and Negative Emotional Shifts, and Average Resonance for that section, calculated by Overview Summarizer in step 5130. A condensed overview display of character arcs can show an entire story's ebb and flow in a single scrollable web page, so that users can click on a scroll-bar button and drag the button from start to finish, for example.

An example of a character arc display is shown in FIG. 52, which shows a table of sentences from the end of "Peter Rabbit" by Beatrix Potter. The table of FIG. 52 comes from an actual web page display generated in accordance with aspects of the present invention for the text of the "Peter Rabbit" story. For consistency, these sentences are grouped into analysis-paragraphs of roughly similar length, so that variations in magnitudes of arc-shifts can be compared over a relatively similar basis. (If analysis-paragraphs are allowed to vary two to one in length, this variation would cause magnitudes of arc-shifts to vary by the same amount, simply because longer paragraphs have more gene-num pairs and hence higher emotional totals.) Analysis-paragraph numbers are shown in the first column of the table in FIG. 52. The second column shows the actual text from the story, with the addition of resolved anaphora in brackets. For instance, "he [Peter] saw" is shown in the first line of Paragraph 18. For quality control purposes it is useful to show anaphora resolution results in this manner, to know why a character such as "Peter" would have an arc-shift in a paragraph, even if the word "Peter" did not appear in the paragraph. However, for authors using methods in accordance with aspects of the present invention as a writing tool, display of resolved anaphor in brackets is usually omitted, since it disturbs the meter of the text and obscures how the text actually sounds when read aloud. The third column, labeled Net in FIG. 52, shows the net emotional magnitude of each analysis-paragraph, calculated by subtracting the sum of Negative magnitudes of gene-num pairs from the sum of Positive magnitudes of gene-num pairs for the analysis-paragraph. As with most popular children's books, there is a distinct story-arc resolution at the end, so that children are pleased by the story. This resolution is clearly shown, with a strong and continual progression of turns towards positive emotions. For the closing paragraphs 18 to 22, the Net emotions are −11, −9, 0, 5 and 21, with negative numbers representing net negative emotions and positive numbers representing net positive emotions. This trend can be made more apparent by colorizing or graphing the numbers; such exemplary graphical techniques are discussed below in more detail in connection with FIG. 61.

The fourth column, labeled "Peter" in FIG. 52, shows the effect of the Net emotions upon the character arc for Peter (Rabbit), paragraph by paragraph. In paragraph 18, the Net of −11 has displaced Peter to −5 from the previous position (which is not shown in FIG. 52). In paragraph 19, the Net of −9 has displaced Peter from −5 to a position of −14, which is 9 more negative that the previous position in paragraph 18.

In paragraph 20, the sum of Positive emotions is cancelled by the sum of Negative emotions, so that the Net is zero, and no story arcs are shifted by Paragraph 20. In paragraph 21, the Net is 5, and Peter shifts from −14 to 5, showing the effect of Contrarian Emotional Enhancement Factor calculated at step 5114, since without enhancement, Peter would shift from −14 to −9. In Paragraph 21, the Net of 21 shifts Peter from 5 to 12, showing the effect of the reverse Contrarian Emotional Enhancement Factor determined at step 5114, since without reverse enhancement, Peter would shift from 5 to 26.

Similarly, the story arcs for Mr. McGregor, Peter & Mr. McGregor, Mother and Peter & Mother are shown in the fifth through eight columns, respectively. Since Mr. McGregor does not appear in the story after paragraph 19, the Mr. McGregor, Peter & Mr. McGregor arcs stop after paragraph 19, and are left blank in the table. Thus, at the end of the story, their displacements are −26 and −28 respectively, showing the great unresolved tension between those characters in the story. Although the story ends happily for Peter (arc displacement 12) and his mother (arc displacement 16), Mr. McGregor (arc displacement −26) and the relationship between Mr. McGregor and Peter (arc displacement −28) end unhappily. Essentially, what this variation of the present invention is reporting is the lack of positive feelings in paragraphs involving Mr. McGregor and Peter. The result is a somewhat weakened story; if the story were re-written to show positive feelings between Mr. McGregor and Peter, the two character arcs of the fifth and sixth columns would show a completely resolved story, for example. More about how completeness of story resolution affects total story satisfaction scoring will be discussed in more detail further below.

The overall story arc progressions of "Peter Rabbit" are shown in the table of FIG. 53, also as a result of an automatic analysis performed in accordance with aspects of the present invention, where contiguous groups of six paragraphs are summed from a story-arc perspective to show the same information as FIG. 52, but at higher level, so that the entire progression of story arcs from the start to the end of the story can be viewed all at once. For each group, the most emotionally intense paragraph is shown in column 2, to give a gist of what was happening in that group. The third column, Avg Net, shows the average of all Net values of paragraphs in each group. From this progression in the Avg Net column of values −3, 1, 2, and 3, this story shows an ideal classic story-telling tension-resolution curve. Tension is created in the beginning to grab the interest of the reader, and that tension is gradually resolved until the end. The first group leaves Peter with −26 and Mother with −10, but at the end of the last group, Peter has resolved to 12, and mother has resolved to 16. Along the way, of course, there are small up and down fluctuations, which are obscured by the style of overview shown in FIG. 53. A variation of the present invention uses a more sophisticated, higher resolution graphing methods where colors or line-graphs are used to summarize arc shifts, instead of printed numbers, so that each paragraph is represented by a row of pixels to indicate arc position, and an entire medium length novel thus consume only a few pages of scrollable web page to display.

Figure 62:
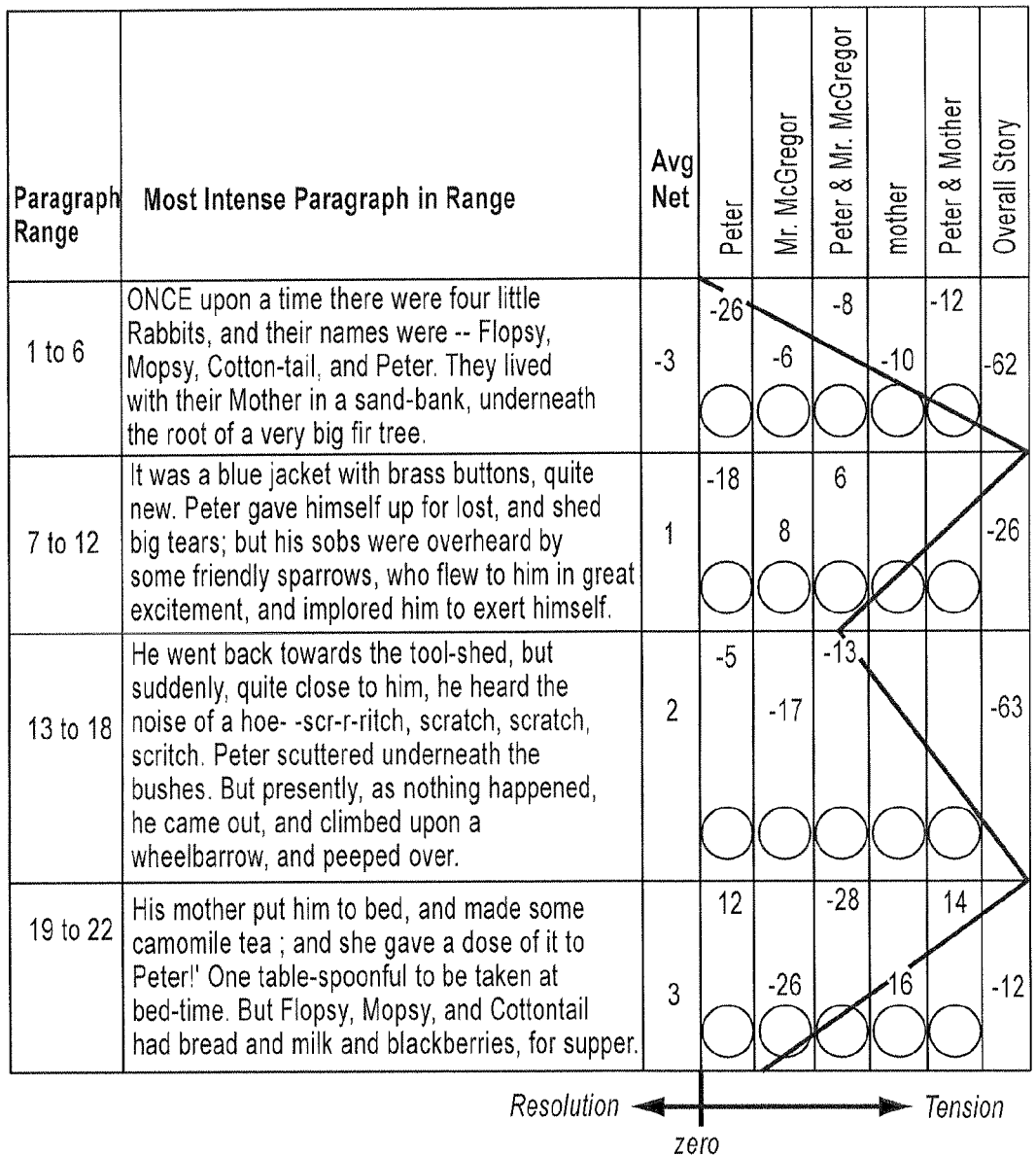

A step in this alternative variation is shown by the graphical table of FIG. 62. Displaying the same information as FIG. 53, but with added graphical display elements, FIG. 62 makes the arc shifts much easier to see. In this variation of the present invention, colors may be used to mark arc positions, for example, so that warmer colors may indicate tenser positions and cooler colors represent resolved positions. The human eye can typically detect at least 100 different colors on a warmer to cooler progression, so the use of color to represent position is much like a 100 pixel range graph plot. As a result, so the use of color, which can be shown in as little as 5 pixels wide, can produce a 20-fold reduction in display area when compared to a graph plot. In FIG. 62, gray-scale dots are used to approximate the look of colors; darker gray corresponds to warm color tension and lighter gray corresponds to cooler color resolution. The use of color makes variations in arc position clearly stand out; viewing the last group of paragraphs 19-22, the darkness of Mr. McGregor and the Peter & Mr. McGregor arcs stands out amid the lightness of Peter and Mother arcs.

As a way to highlight the average resolution of all main character story arcs, a ninth column, labeled Overall Story, shows the sum of all main story arcs. From the progression of values in this column −62, −26, −63 and −12, it is easy to see that the story is not fully resolved. An overlaid line graph with tension values plotted from left-to-right shows the dynamics of this progression with great clarity. With a higher resolution line graph, representing each paragraph with 10 vertical pixels of line graph, for example, individual shifts of story arc at the paragraph level can be viewed graphically in a single scrollable web page.

Story Arc-Theme Analysis

Another dimension of story character analysis, interchangeably referred to herein as Story Arc-Theme Analysis, in accordance with aspects of the present invention, which improves upon traditional story theme analysis by accurately tracking the development of themes from character-arc emotional viewpoints. Traditionally, related art automated story-theme analysis has been performed by scanning text to tally the number of occurrences of suggestive phrases and words, and summing from a pre-determined subset of these tallies to quantify the existence of particular themes. More sophisticated automated analysis also tallies the co-location of pre-determined sets of suggestive phrases and words, to better contextualize the meaning of those phrases. For instance, the co-location of the words "electronic" and "pump" could tally under the context of "physics," whereas co-location of "blood" and "pump" could tally under the context of "medicine." However, the large-scale flexibility of language is the pitfall of these sophisticated techniques. On a small scale, over a small set of documents, a pre-determined set of contexts can be defined accurately by hand-selected ontologically mutually suggestive phrases. Nevertheless, the real value of human language is the ability over time to combine terms from any existing contexts. For instance, the development of electronic artificial hearts moved "electronic" and "pump" into the context of "medicine." For large-scale automated story-theme analysis, interesting contextual cross-fertilizations fall beyond pre-determined hand-selected mutually suggestive phrases. Variations of the present invention provide emotional methods to identify mutually suggestive phrases without limitation to ontology. By measuring emotional impact of specific words and phrases (e.g., automatically), these methods identify which words and phrases are most suggestive. As long as these words/phrases are co-located with a story-character presence, an assumption is made that there must be a character viewpoint which binds them together. This assumption is true for both for fiction and non-fiction; in non-fiction the character presences are typically expressed slightly differently than in fiction, but the same anaphoric rules for mapping pronouns apply.

Figure 55:
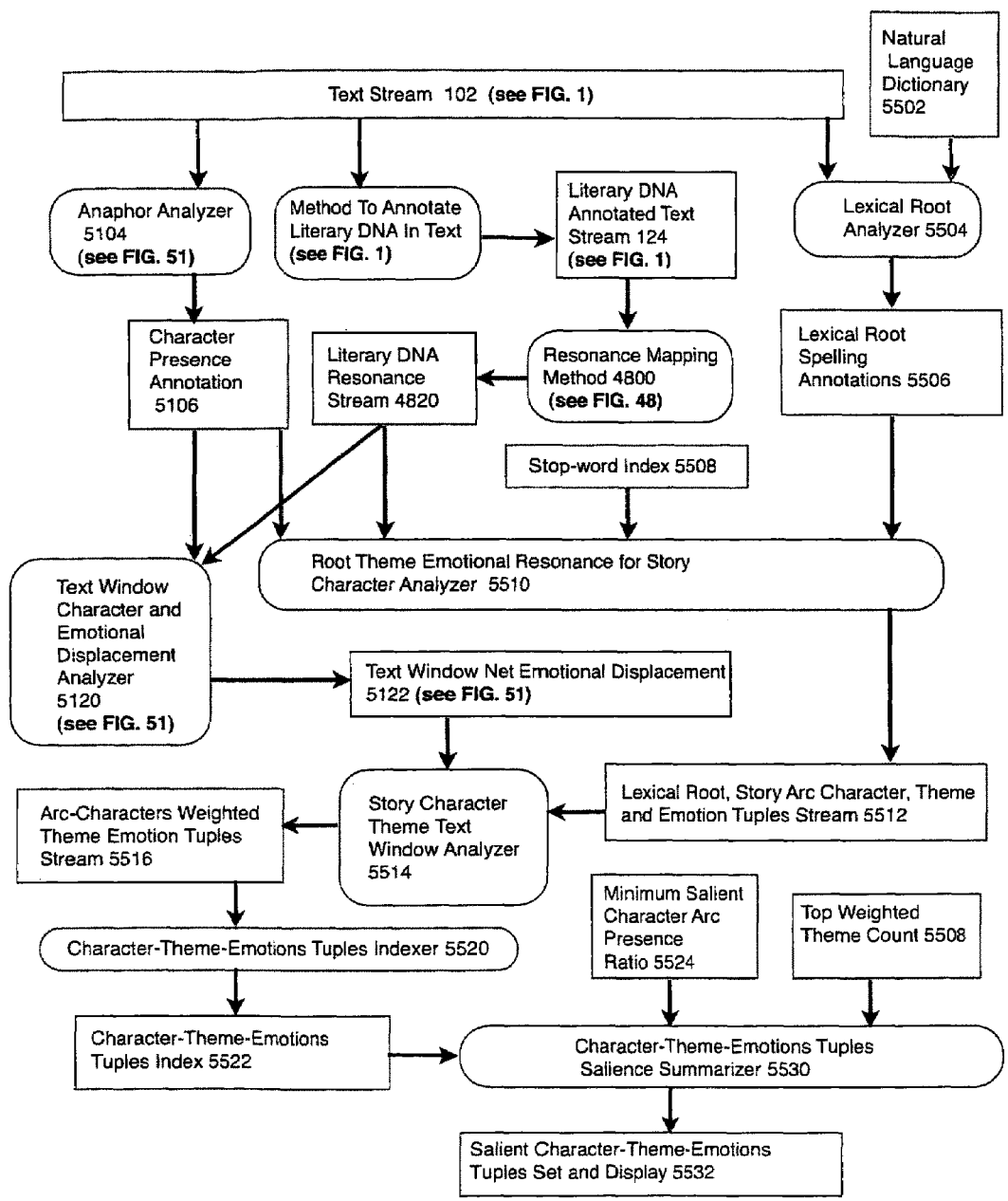

In FIG. 55, a Story Character-Theme Mapping Method 5500 is shown in a flowchart for implementation of the above description, a method of which integrates several of the above described features. The method of FIG. 55 begins with a Text Stream 102 (received from e.g., FIG. 1), which feeds an Anaphor Analyzer produced in 5104 (from e.g., FIG. 51) to produce a character Presence Annotation per step 5106. Also, the method of FIG. 1 produces a Literary DNA Annotated text stream 124, which, in turn, feeds the Resonance Mapping method 4800 of FIG. 48 as described above, which produces the Literary DNA Resonance Stream per step 4820, as above. And per FIG. 51, the Character Presence Annotation produced in step 5106 and Literary DNA Resonance Stream produced in step 4820 feed the Emotional Displacement Analyzer function of step 5120 to produce Net Emotional Displacement, per step 5122. Thus, character presence produced in step 5106, resonance per step 4820 and emotions resulting from step 5122 in the method of FIGS. 51, 48 and 1 converge in the method 5500 of FIG. 55 to map story characters to themes that affect them, weighted by the resonance calculated in step 4820 as a result of co-locations. Since the meaning of a single theme may have many spellings, for efficiency, some variations of the present invention may utilize a dictionary to collapse many spellings referring to the same meaning into a root spelling, using, for example, a natural language dictionary.

Similar to the Phrase Dictionary 104 in FIG. 1, in FIG. 55, Method 5500 uses operation of a natural language dictionary 5502, inclusive of lexical roots and associated spellings for different tenses and genders, with results produced using a Lexical root analyzer 5504 to summarize words sharing the same root meaning as the same theme. For instance "came" and "will come" have the same root as "coming," and aspects of the present invention group themes together for clarity, to reduced the number of themes that are tracked. In one variation of the present invention, the natural language dictionary loaded/used in step 5502 includes the WordNet® lexical database of English developed at Princeton University or other lexical database having similar features. Other aspects of the present invention may use ontological covering terms to group themes together for clarity. For instance, "motor car," "passenger car" and "automobile" are synonyms for which occurrences could be grouped under "automobile." WordNet® also supplies such synonym mappings. The text stream produced in step 102 that is passed to the Lexical Root Analyzer 5504 may become a stream of text annotated by corresponding Lexical Root Spelling Annotations that function on step 5506, for example. These Root Spellings in turn are mapped to story arc-characters (which can be pairs of story characters, for example), the presence of which is annotated in step 5106, for emotions calculated in step 124 with weighting calculated in step 4820. Mapping the resonance of a theme to a character using resonance 4820 can distinguish casual use of term from its more significant use, thus weeding out terms that would otherwise clutter up a theme analysis.

Theme analysis can also be cluttered by words that are too vague. For instance, words such as "a," "or," and "is" do not generally illuminate enough of a character viewpoint to justify tracking in a character-theme index. When automatically mapping movie scripts, for example, the common directives such as POV (point-of-view) are usually too general to be illuminating. Therefore, some aspects of the present invention use a stop-word index 5508 operation for spellings of words or phrases having meanings to be ignored by analyzer produced in step 5510.

Together with character presence annotated by the function of step 5106, for emotions calculated in step 124 with weighting determined in step 4820, and lexical roots identified in step 5506 and allowed past the stop-word index function performed in step 5508, character analyzer 5510 produces a stream 5512 of weighted tuples of lexical roots, character-arcs and emotions. This stream is input to for operation by the analyzer 5514, which converges the weighted tuples with Net Emotional Displacement results from step 5122 on a text window basis, text windows typically being groups of sentences or paragraphs or pages of text. The Net Emotional Displacement provides addition accuracy to the weightings, by increasing the weightings within strongly emotional text windows, and decreasing weightings for weakly emotional text windows. Additional weighting factors may also increase the accuracy at the text window level; some, like resonance calculated in step 4820, have already been discussed above, while others, such as Rhythm and Confidence will be discussed in more detail further below. Any other suitable measure of emotional intensity, whether Resonance or Emotional Displacement or some other measure, may also be integrated, e.g., by use of adjusting factors, such as at the step of the text window analyzer function of step 5514, earlier, at the step of the character analyzer calculation of step 5510, or later, such as in another step prior to final output.

The output of the text window analyzer function of step 5514 may be a stream of weighted theme emotion tuples assigned to specific arc-characters. These tuples are stored, for example, in a general index for later retrieval, in some variations of the present invention, to satisfy search-engine style queries, and for method 5500 to summarize the main themes within a novel or other text. That summarization method 5530 concentrates on the most salient characters arcs. Typically, long stories have many salient characters, and shorter stories fewer such characters. However, character development sometimes thins out dramatically beyond the first two or three character arcs, even in longer stories, so aspects of the present invention use a more accurate cut-off for which character arcs are salient; for example, the character arc with the highest presence may be used to set at the level of a benchmark presence, and other character arcs are considered salient as long as they have a minimum fraction of that benchmark presence corresponding to the presence of the character arc with the highest presence. Thus, stories with deep character development across many characters will typically have theme-emotion tuples associated with those many characters in their summaries; stories with deep character development in fewer characters will have theme-emotion tuples associated only with those fewer characters. Similarly, the number of themes that are summarized per character arc may also be limited, to prevent summarization of themes with negligible impact within each story. Another filter, which aspects of the present invention use is a filter function 5530 for themes that, in fact, are character names or aliases of characters names, since certain character names, such as Joan or John, are themselves often placeholders for character development having negligible meaning in them. The output of step 5530 is the salient character theme emotions tuples, which may be displayed to summarize an entire story. Variations of the present invention may use these summaries as a basis for detecting story genre and story similarity, for example.

An example of salient character theme emotions tuples appears in FIG. 58 and FIG. 59. This example shows automated output, in accordance with aspects of the present invention, generated after analysis of the romance-detective novel "Stars Of Mithra" by Nora Roberts. FIG. 58 shows the top two character arcs ranked by presence, and the top five weighted themes for each of those two characters. Since the vast majority of the character development of "Stars Of Mithra" occurs within the male and female lead characters, the display of FIG. 58 covers the majority of themes developed to significant depth within the novel. Themes that are aliases for characters have been excluded, such as Fontaine (alias for Grace Fontaine or Grace). Each of the top themes for each character is ranked by weighting, with the variety of emotions associated with each theme indicated. At top rank for each character is the theme "eyes," showing that both characters spend a significant amount of story time eyeing each other. The impulsive female lead character, "Grace," eyes, wonders, smiles, feels and then thinks, in that order, where as the male lead, who is more logical, eyes, thinks, wonders, smiles, and then feels, in that order. The number of emotions paired with each theme provide a valuable picture of how many ways the character feels about the theme. As suggested by the famous saying, "How do I love you . . . let me count the ways," aspects of the present invention count the number of ways that a character feels about a theme. For instance, the flamboyant female lead character Grace wonders about her reckless thought, her risks, her feeling of upheaval and her zeal. The more methodical male lead character, "Seth," wonders only about his risk and "aw-oh" (the pseudonym used in this exemplary variation of the present invention to represent the feeling of crisis). The fewer emotions Seth wonders about show his relative stodginess compared to the flighty and glamorous Grace. By first detailing what themes characterize main characters, aspects of the present invention analyze (e.g., selectively or automatically) both the genre of a story and a highly specific characterization of the story's literary DNA, which can be used to measure story-to-story similarity with great accuracy.

For instance, as a contrast, FIG. 59 shows the two main characters and their themes from the mystery-thriller "Rising Sun" by Michael Crichton. There is no significant romance in this story, which is a "who-done-it," built on a cultural divide involving American detectives investigating a murder committed within a Japanese cultural context. Here the romantic themes of "eyes" and "smile" been replaced by the more urgent need to "know," which characterizes thrillers, and the question "how," which characterizes mysteries, along with the sense of "okay," which characterizes books about fashion. There are also themes of "American" and "Japanese" which show up strongly. This result shows that "Rising Sun" is definitely within the mystery and thriller genres, but also that "Rising Sun" steps into issues of what is fashionable (okay) in America culture versus what is fashionable (okay) in Japanese culture. The displays of FIGS. 58 and 59 thus provide some indication at a deep level of what the stories are about, and can serve as a foundation for searching for similar stories. A flowchart for story similarity analysis method 6600, shown in FIG. 66 will be discussed in more detail further below. However, since method 6600 uses metrics from FIG. 79, relating to story satisfaction method and page quality analysis, this method needs to be discussed first, along with other methods, such as an exemplary story gap analysis method 5600, shown in FIG. 56, and an exemplary rhythm assessment method 5700, shown in FIG. 57.

There a numerous ways that the resonance mapping method 4800 of FIG. 48 can be applied to larger sets of text than that encompassing emotions of phrases within an Annotated Text Stream produced in step 124. Aspects of the present invention can be applied using similar mapping methods at the broader level of text windows, such as those consisting of sentence grouping or paragraph. On this broader level, human readers may encounter a sense of emotional rhythm whereby the narrative switches between positive and negative text windows, thus drawing the reader into the interplay between light and dark, metaphorically speaking, which is cast into sharp relief to the feelings of characters and their themes within the story. Just as method 4800 as described above can measure the allure of sequences of phrases by using almost identical calculations on a broader sample size, method 5700 can measure the allure of sequences of paragraphs or pages. As expository art, text that accrues greater negative and positive sums within the curve 5702 are more alluringly rhythmic than stories that accrue less. At an even broader level, such as text portions making up pages consisting of 10 to 100 sentences, the interplay between light and dark becomes more a plot device analysis reflection for tension and resolution. The greater the area captured in curve 5702 on this broader level, the more confidence the reader has in the story-teller's narrative, because the story-teller has successfully introduced tension and then resolved it. That is to say, within the even broader context of overall story tension and resolution, the successful story-teller in this analysis method typically will have demonstrated sensitivity to the reader's need to experience a sample of tension resolution. Extremely consistent tension-resolution styles give authors a reputation for high-quality writing, such as the Harry Potter books by J. K. Rowling, or the poem "Rime Of the Ancient Mariner" by Samuel Coleridge, which score extremely high in both the rhythm and confidence metrics. Using rhythm and confidence metrics displayed as annotations for text, in accordance with aspects of the present invention, authors can quickly tweak their prose, trimming or boosting emotional negativity and positivity to conform text to guideline annotations that indicate how to increase rhythm and confidence. For instance, a long spell of negativity may be annotated to say "some positivity needed right here." By using rhythm and confidence metrics to characterize stories, such metrics can help in identifying stories of similar writing style, in addition to allowing computation of overall story satisfaction and page quality metrics, such as simply for evaluation or computation purposes.

Figure 56:
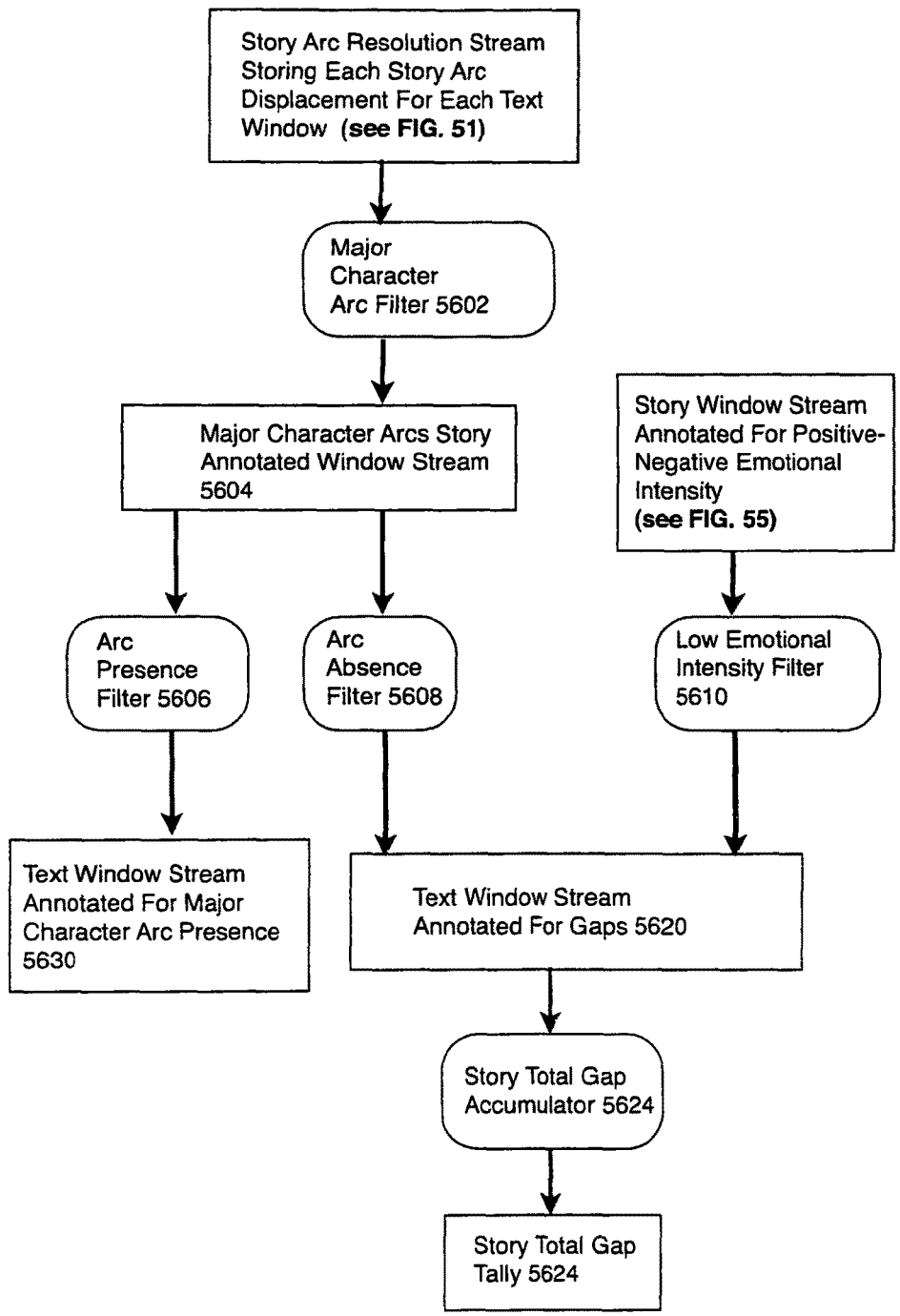
Figure 57:
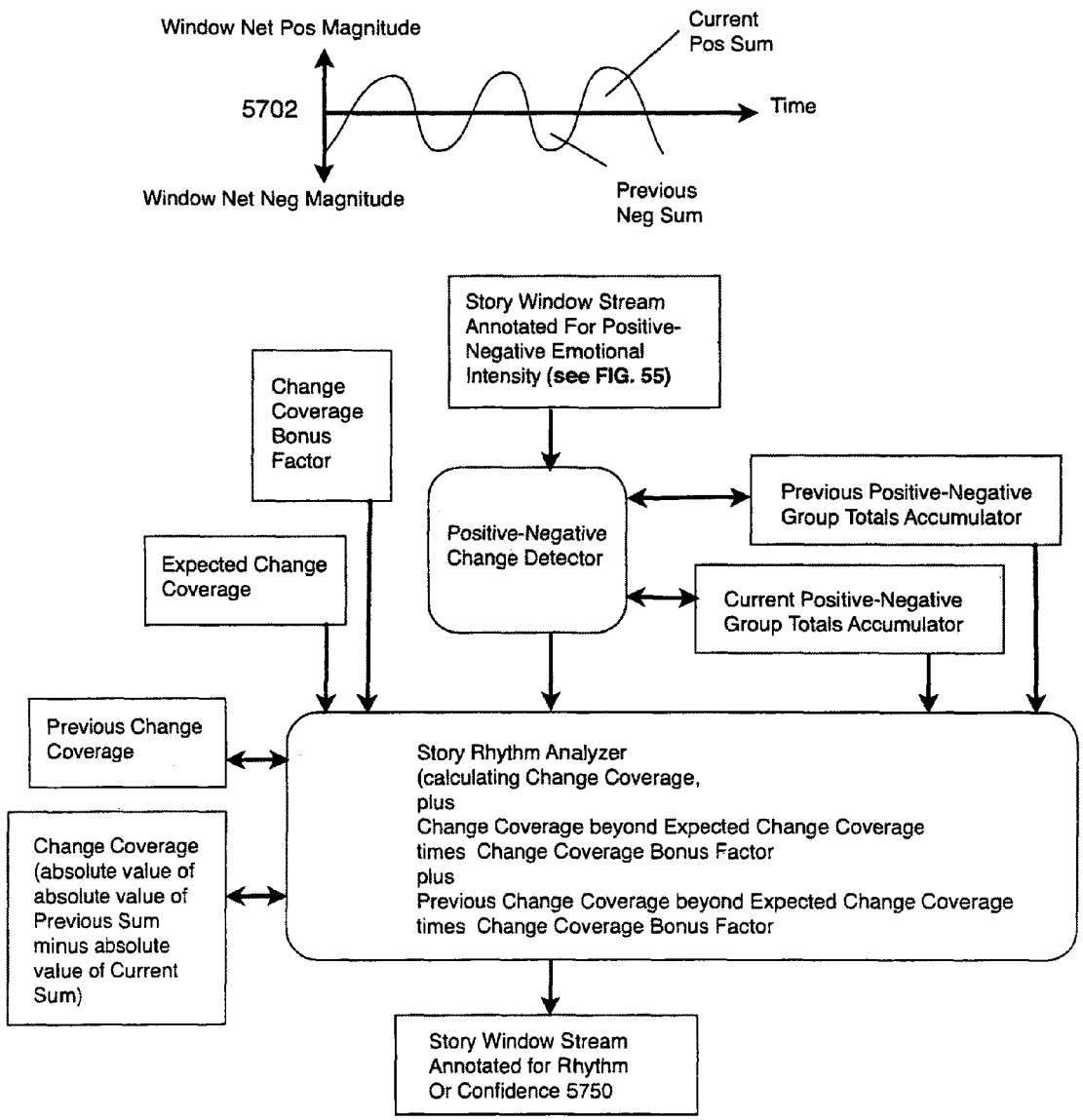

Gap analysis is yet another method in accordance with aspects of the present invention that may be used to compute overall story satisfaction and page quality metrics. There is a well-known problem in writing, commonly referred to as "digression," wherein authors may include text that does not relate to any major characters, typically resulting in poorer quality writing, as it is generally recognized. Digressions can occur when text is devoid of emotional magnitude, such as when reciting a long list of details that are emotionally flat. Digressions can also occur when sections of text longer than a paragraph contain emotion, but no major characters are present to relate to that emotion, thus annoying the reader with detail about minor characters. In FIG. 56, an exemplary Story Gap Analysis Method 5600 is illustrated via a flowchart for measuring digressions. Starting with Story Arc displacement for each text window, where text windows are often paragraphs or groups of sentences, the method 5600 filters out minor characters in step 5602. In some aspects of the present invention, a story is allowed a maximum number of major characters, when ranked by presence, which can include the number of places the character occurs, weighted by the emotional intensity of those places, for example. This approach corresponds to a broad set of major characters. A narrower set, sometimes used for consistency with the theme-emotion tuple tracking methods in accordance with some aspects of the present invention, may use the same set of characters as allowed when tracking emotion-themes as is shown in FIG. 5500. Filter step 5602 produces a story window stream annotated for the presence of Major character arcs determined in step 5604. This operation, in turn, can be filtered by operation of the arc presence filter in step 5606, to produce a text window stream annotated for character arc presence, and filtered by arc absence filter per step 5608, to produce a text window stream annotated for gaps per step 5620. Another source of gaps comes from the Low Emotional Intensity Filter operation of step 5610, which uses input from the Story Window Stream Annotated for Positive-Negative Emotional Intensity (as in FIG. 55). The filter operation of step 5610 detects additional text windows, such as paragraphs, where the emotional intensity is insufficient to hold a reader's interest. The Text Window Stream annotated for Gaps result produced on step 5620 that is fed to the accumulator operation of step 5624 produces the Story Total Gap Tally of step 5624, which can then be used as a part measure of story satisfaction, for example.

Story Satisfaction and Page Quality

Figure 79:
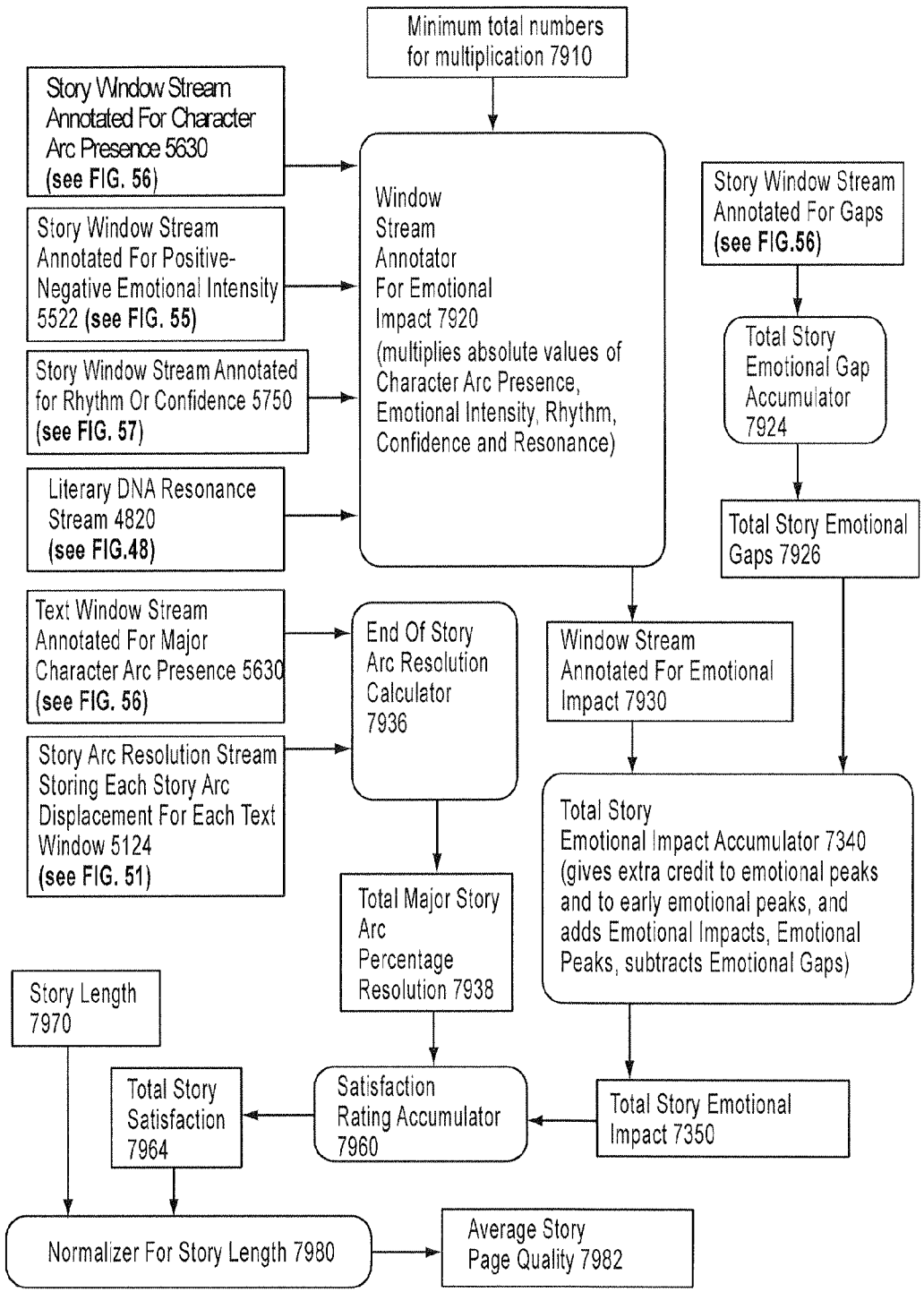

In the related art, designers of automated satisfaction and similarity rating systems for text have relied on summarization of second-hand information, such as reviews and commentaries about text. Major search engines in related art for the Web have also relied upon second hand information, such as manually placed hypertext links to estimate the degree of similarity between text objects. As a significant departure from the related art, aspects of the present invention estimate story satisfaction and page-quality, as well as story similarity, from first-hand information in the form of metrics outlined in the story satisfaction and page quality rating method 7900, as shown in FIG. 79. Converging metrics of Character Arc Presence performed in step 5630, Emotional Intensity functions of step 5522, Rhythm Or Confidence operations of step 5750, and Resonance Stream results from step 4820, one exemplary variation of the present invention takes advantage of the similarly desirable nature of all five. Totaling each of these outputs over an entire story supports a simple method, wherein the greater each total is, the more satisfying the story, and the less each total is, the less satisfying the story. For instance, greater total character arc presence in the story generally signifies more engaging character development. A greater total Rhythm generally signifies a more seductive paragraph-to-paragraph narrative style. A greater total Confidence generally signifies a smoother chapter-by-chapter storytelling style. Thus, directly multiplying all five totals together elegantly in Emotional Impact operation of step 7920 produces a single large metric describing the satisfaction a reader experiences by reading a story. For practical reasons, a few small adjustments may be applied to this result in step 7920. For example, to prevent a single zero total from causing the operation of step 7920 from producing a zero Emotional Impact, a set of minimum total number for multiplication are provided, so that even if a story has no characters, for example, some operations in step 7920 will use a very small number, such as 1/10$^{th}$, for calculations in place of zero character presence. The use of a minimum total numbers for multiplication in step 7910 is mainly to allow other, non-zero numbers to continue to remain through the method of 7900 in some form, so that satisfaction numbers are still affected by the non-zero numbers, thus leading to useful comparisons between satisfaction numbers, even for extremely defective stories. The output of step 7920 produces the Window Stream annotated for Emotional Impact.

It is noted that the linearity of the five metrics that are totaled in step 7900 allows these metrics them to be useful when totaled over a subset of a story text, whether for a text window consisting of a paragraph, a page, a chapter, an entire story or any other subset of consistent size. Thus, the operation in step 7920 could effectively produce a useful annotation at the paragraph, page, chapter or story levels, for example.

Aspects of the present invention may utilize other perspectives in natural reading habits to make further adjustments to the metrics calculated in step 7930, and to take advantage of the stability of story-to-story consistency in the significance of absolute levels of those metrics. For instance, windows exceeding a specific threshold of emotional impact can be assigned extra credit for Emotional Peaks, and Emotion Peaks early in a story can be given even greater credit for grabbing the curiosity of a reader, so as to entice a reader to continue reading the story to find out what happens to its characters. These extra credits are granted by the Total Story Emotional Impact Accumulator determined at step 7340. At the same time, the occurrence of gaps in a story, as described above with regard to FIG. 56, can be totaled by Total Story Emotional Gap Accumulator 7924 to produce Total Story Emotional Gaps 7926, which are subtracted from the Total Story Emotional Impact in step 7350 produced by Total Story Emotional Inpact Accumulator calculation of step 7340.

Another observation regarding reading habits is that a story is more satisfying when the tension generated for its characters is resolved at the end of the story. The End Of Story Arc Resolution Calculator, which operates at step 7936, takes as input Text Window Stream Annotated for Major Character Arc Presence produced in step 5630 in FIG. 56 and Story Arc Resolution Stream Storing Each Story Arc Displacement For Each Text Window produced in step 5124 to assess the percentage resolution of each Major Story arc at the end of story. The percentage resolution calculation of step 7938 can, in some aspects of the present invention, include simply the absolute value of (max-negative-displacement minus final-displacement) over absolute value of (max-negative-displacement). For example, in FIG. 62, the end of "Peter Rabbit" shows the arc for Peter as having a displacement of 12, over a maximum negative displacement of −26, so abs(−26−12) over abs(−26) which equals 38 over 26, or about 146 percent. In contrast, the arc for Mr. McGregor has a percentage of resolution of abs(−26−−26) over abs(−26) which equals 0 over 26, which is zero percent. As easily seen from FIG. 62, this means that the total major story character arc resolution calculated in step 7938 for "Peter Rabbit" is less than 100% because of the unresolved tension of the arc of Mr. McGregor and the arc of Peter and Mr. McGregor.

The Satisfaction Rating Accumulator determined in step 7960 takes the Total Major Story Arc Percentage Resolution calculated in step 7938 and Total Story Emotional Impact produced in step 7350 and multiplies these values to produce the Total Story Satisfaction in step 7964. Similarly to the Emotional Impact calculation step 7920, small minimum total numbers may be applied in place of zeros, in order to permit the non-zero numbers to continue to have effect on the final outputs of method 7900. Total Story Satisfaction numbers have been calculated for a wide range of literature, and these numbers have been found experientially to be highly accurate. However, no matter how well written, very short text does not have an opportunity to develop the significant characters and impact of long text, so the method 1900 also provides a second metric for page quality. Taking into account Story Length determined in step 7970, which may be a word count, sentence count or any other consistent length metric, as well as the Total Story Satisfaction determined in step 7964, the normalizer for Story Length calculated at step 7980 produces Average Story Page Quality at step 7982. Although a very simple linear version of the normalizer could simply divide Satisfaction by Length, it has been found experientially that length has non-linear advantages, with longer text being able to compound more characters with more themes, so it is more accurate to divide Satisfaction by Length squared.

Story Genre and Similarity

Publishers typically specialize in the marketing of particular genres of stories, or even of particular author writing styles. Before negotiating to acquire publication rights for a work, and even before taking the time to read a new work, publishers may need to know genre and writing style, before investing the time to read an entire work. Currently, publishers typically rely upon word-of-mouth and author reputation to filter out which new works to read. Unfortunately, since writers outnumber publishers by five or more orders of magnitudes, reputation and word-of-mouth can be a severe bottleneck in the publishing industry, and an insignificant fraction of new authors generally become published. Aspects of the present invention address this problem by assessing the quality of the work, from first-hand evidence, by automatically "reading" works (not human reviews), so that new authors of better or equal satisfaction works can be quickly identified by publishers in the very same genres and writing styles in which those publishers are accustomed to marketing.

Figure 65:
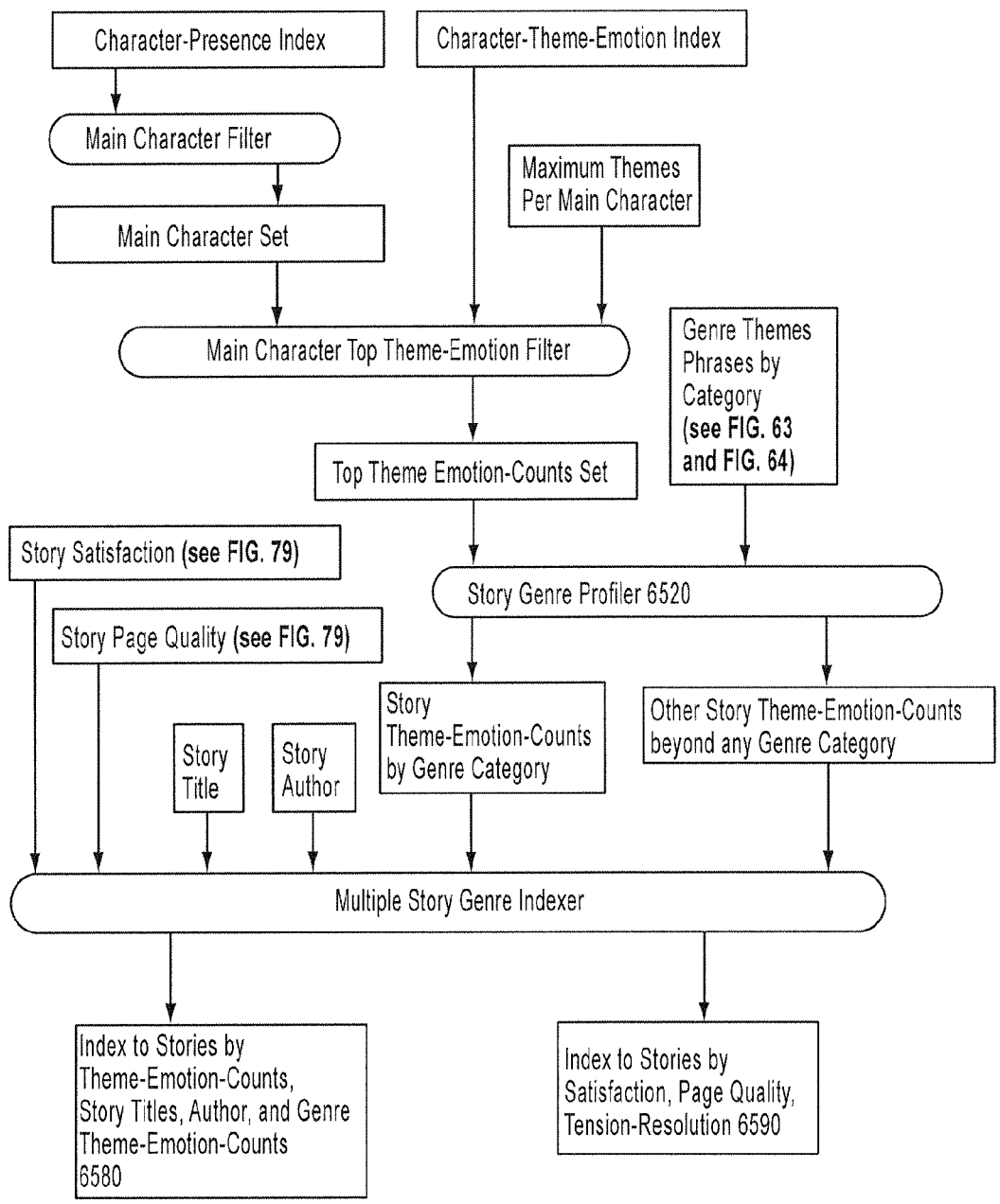

One valuable factor for this advance is the character theme mapping method 5500 of FIG. 55. As noted with regard to FIG. 58 above, the themes of "eyes" and "smile" may signify the romance genre. And, as noted with respect to FIG. 59 above, the theme of "know" may signify the thriller genre, while the theme of "how" may signify the mystery genre. After experimentally processing many works of literature in various genres, and noting which themes method 5500 produces for each, a general-purpose index of themes has been compiled for each of eight genres. The contents of these indices is shown in FIGS. 63 and 64. By simply tallying the emotional variations a story produces from method 5500, in FIG. 65, the Genre indexing method 6500 produces a genre intensity profile for each story from a genre profiler 6520, and generates a general profile, satisfaction and page quality indices, in steps 6580 and 6590, respectively.

FIG. 68 shows genre profile tallies for eight works of literature, of varying lengths and average page quality. Due to constraints on width, the table of FIG. 68 only shows Romance, Thriller, Fashion and Spiritual genre tallies. Variations of the present invention may also display theme-emotion tallies for Mystery, Fantasy, Science, and Erotica genres, for example, but FIG. 68 omits these columns to save space. To tally significant themes that do not belong to any genre, the "Other" column shows aspects of each literary work that fall outside the box most publishers have in mind; the "Other" column thereby performs the function of showing the work extends beyond common themes. From this perspective, it's easy to see that "The Stars Of Mithra" and "Led Astray" have very few uncommon themes; these two works are largely formulaic in content. On the other extreme, "The Sound and the Fury" has a large number of sensual, uncommon themes, and the "Gospel Of Mary Magdalene" has a large number of scholarly themes from academic comments inserted by its translator Karen King. FIG. 68 also shows that "The Stars of Mithra" and "Led Astray" excel in Romance themes, (really theme-emotions), and that the "Gospel Of Mary Magdalene" and the "Declaration of Independence" excel in Spiritual themes. Aspects of the present invention support selectable column headers, so that selecting the header of the Romance column, for example, arranges the rows in descending sorted order of Romance theme intensity, as shown in the exemplary table of FIG. 69. Similarly, selecting the Spiritual column header arranges the rows in descending sorted order of Spiritual theme intensity, as shown in FIG. 70. As with many typical sorting user interfaces, selecting the column header a second time, for example, reverses the sort order from ascending to descending.

To calculate story similarity so that the table of FIG. 70 can sort stories in order of similarity, aspects of the present invention provide a Story Similarity Analysis method 6600. Using a concept referred to herein as "mashup," aspects of the present invention combine and direct the compilation of method 6500 averages and total from a selected set of stories evaluated in step 6630, either one, two or many stories, which are combined to create a mashup profile. Averages calculated in step 6650 and Counts determined in step 6660 are produced, based on which all evaluated and stored stories can be compared for similarity by ranking method 6670. Typically, totals are divided by the number of stories in the mashup set 6630, so that they are normalized to a reasonable size before comparison the stories in the indexes 6580 and 6590.

To handle really large indices containing metrics on millions of literary works, a user query performed in step 6610 and query retrieval method conducted in step 6620 may be used to winnow down the index contents to a reasonable and salient display produced in step 6622. For purposes of illustration, FIGS. 69 and 70 show examples of possible such displays.

Figure 66:
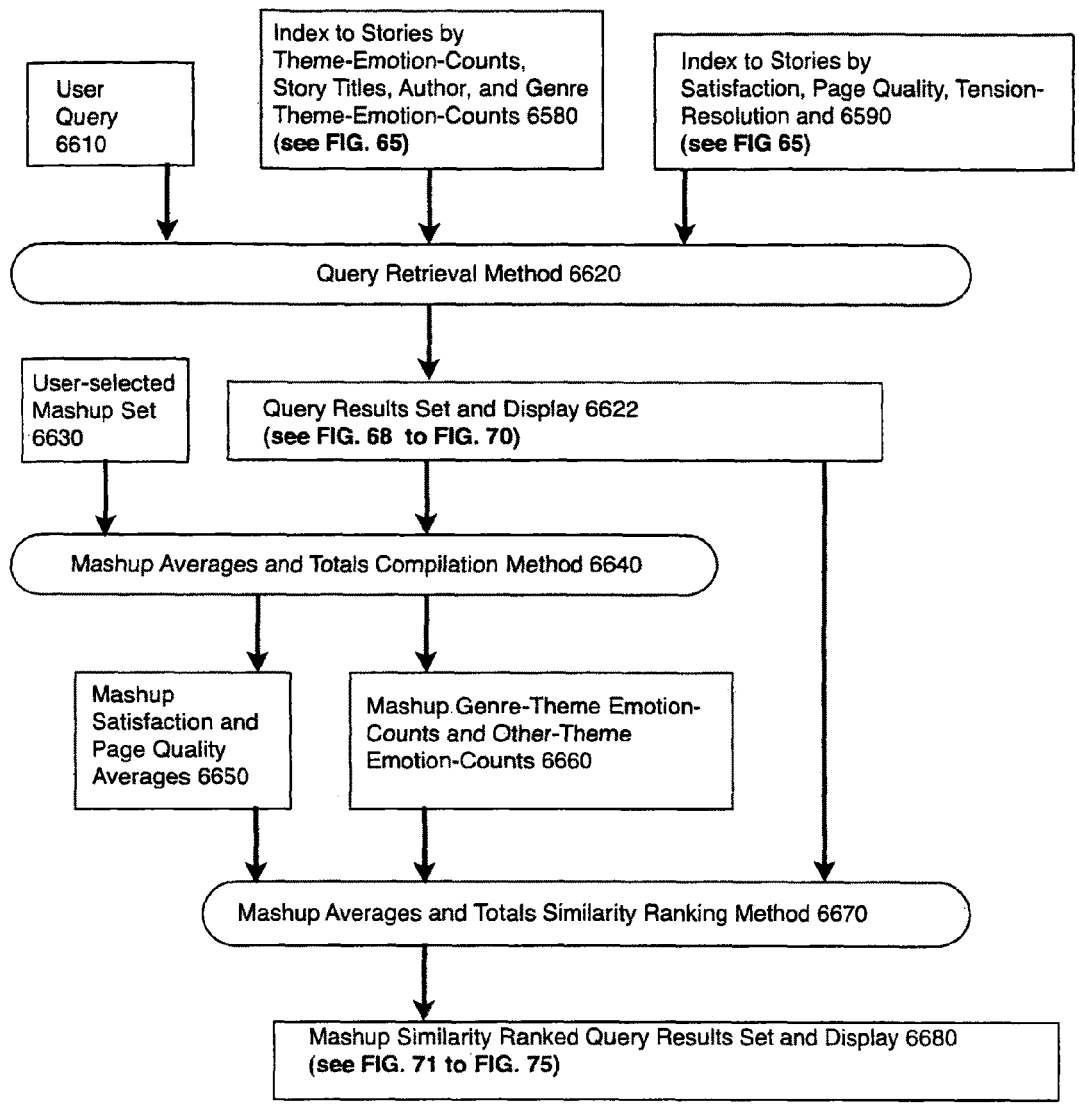

The method 6600 shown in FIG. 66 includes satisfaction and page quality averages determined in step 6650, which can provide equally significant criteria, together with theme-emotion counts. This functionality enables method 6600 to rate stories with similar satisfaction or page quality to be similar, for example. In FIG. 71, a single literary work, the "Declaration Of Independence," has been selected for the mashup stories 6630. Since this work alone defines the ideal in this analysis, the ranking method 6670 expectedly rates this work as 100% of ideal, which is shown in the left hand % Mashup column of FIG. 71. There are no truly similar works in the results set produced in step 6622, but the closest is "The Sound and the Fury" at 2%, because it has similar Page Quality and Satisfaction (not shown), and one of the theme-emotion counts "light: 3" matches the ideal. A helpful pop-up hover-text showing matching mashup themes is shown hovering over the 2% mashup similarity in FIG. 71, to show the "light: 3" was the intersecting theme-emotion count.

Mashups consisting of more than one literary work can either blend seamlessly, or blend poorly, thereby leaving a gap with possible matching works. Variations of the present invention detect both of these kinds of mashups. FIG. 72 shows a mashup between the "Declaration Of Independence" (also interchangeably referred to herein as "Declaration") and the "I have a dream" speech by Martin Luther King, Jr. Despite the reference in "I have a dream" to beliefs in the "Declaration," the majority of themes of the "Declaration," which have to do with the justification for acts of Revolution, are not emphasized in the "I have a dream" speech. Likewise many of the themes concerning segregation from "I have a dream" are missing from the "Declaration." Thus, the "Declaration," for which page quality is higher, has only 29% similarity to the mashup, and the "I have a dream" speech, which as a lower page quality, has only 6% similarity to the mashup. Some aspects of the present invention consider the border of seamless mashup to be a two-to-one drop ratio in similarity percentage. Thus, the "Declaration" at 29% would need the "I have a dream" to be at least 14.5% to be seamless, but "I have a dream" falls short by 8.5%. However, "The Sound and the Fury" has 4% similarity to the mashup, and this is more than half that of "I have a dream" at 6%. Hence "The Sound and Fury" is seamless with "I have a dream" within the context of the mashup. In other words, looking for works like "I have a dream" with shades of similarity to the "Declaration," this variation of the present invention finds that "The Sound and the Fury" is seamless to "I have a dream," This result is not to say that "The Sound and the Fury" is seamless in similarity to "I have a dream," but with the "Declaration" as a bridging mashup ideal, the themes of "light," "hand," "time" and "dark," as shown by the grey box of hovering help-text in FIG. 72) from "The Sound the Fury" bring it closer to "I have a dream."

Figure 67:
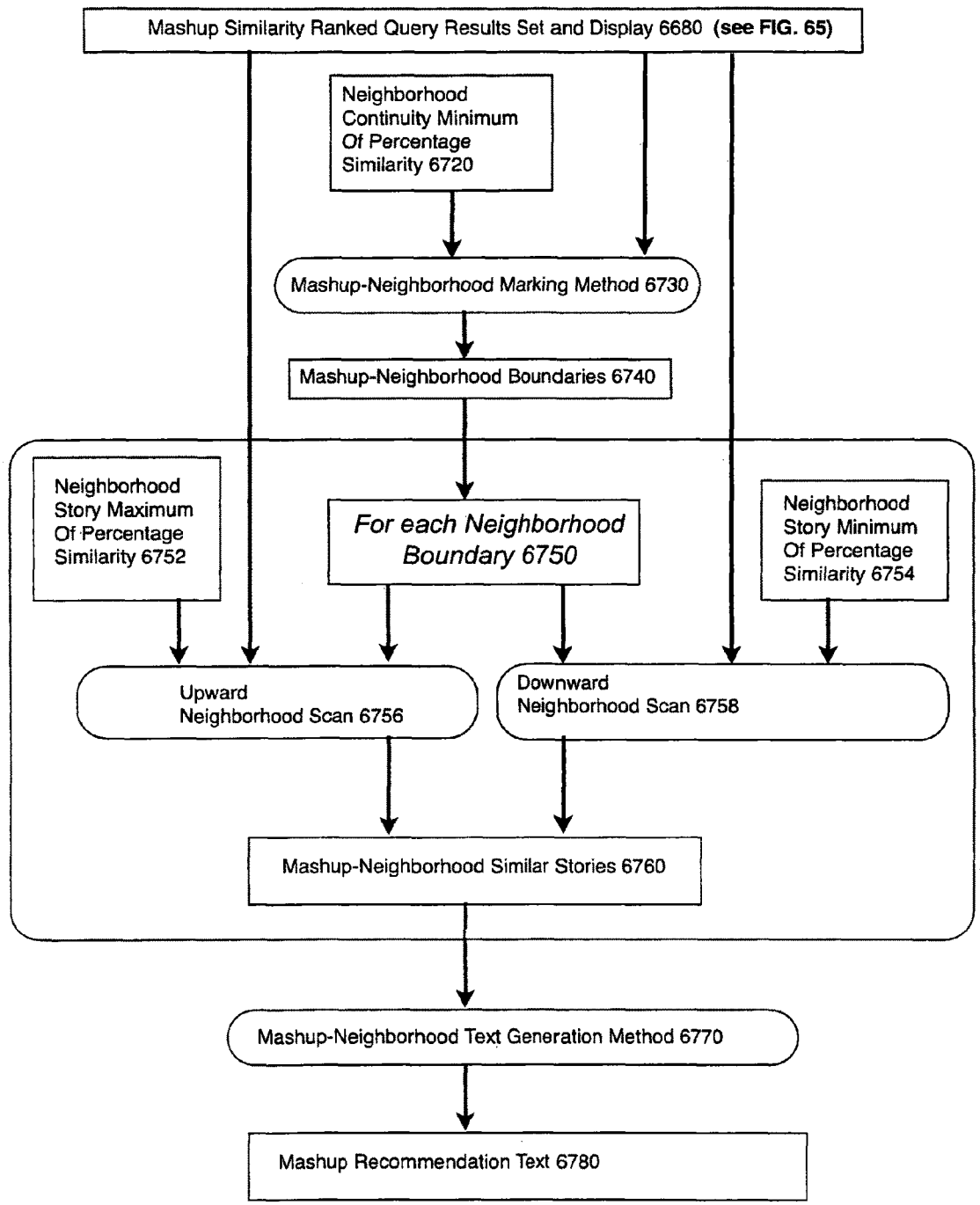

This method of finding literary similarities within the special contexts of mashup ideals is outlined in the flowchart shown in FIG. 67. Using the results set and display produced in step 6680 of FIG. 65, that set is first scanned to find seamlessly blending mashup stories from mashup set identified in step 6630. To qualify as seamless, pairs of mashup set stories assessed in step 6630 must have no more than percentage similarity determined in step 6720, for example, of 50% for a two-to-one ratio. Once seamlessly blending mashup stories have been grouped into discrete neighborhoods by marking method performed in step 6730 to produce neighborhood boundaries in step 6740. Each neighborhood boundary is scanned to identify similar stories to the neighborhood itself. Scanning both upward in similarity in step 6756 and downward from the neighborhood in step 6758, the adjacent stories are compared to determine if any fall within the maximum similarity in step 6752 on the upward scan of step 6758 or within the minimum similarity determined in step 6754 from the downward scan of step 6758. Qualifying similar stories from both upward and downward scan are merged to produce the Neighborhood similar stories in step 6760. These results are in turn reported by a text generation method in step 6670 to generate a Mashup recommendation text in step 6780. In the second box of FIG. 76, the recommendation text for the mashup of the "Declaration of Independence" and "I have a dream" is shown. Since the "Declaration of Independence" and "I have a dream" differ by more than two-to one in similarity percentage, the recommendation notes that they cannot fully combine in a mashup. However, since, within the context of the mashup ideal, "The Sound and Fury" is similar to the "I have a dream speech," this similarity is reported by the recommendation text.

FIG. 75 shows results from a seamless mashup between "Full Speed" and "The Stars Of Mithra." Since these are both similar from a mystery and thriller themes perspective, they are 30% and 29% of the ideal mashup profile respectively. Interestingly, the greater theme-emotion counts of "The Sound and the Fury" cover more of the mashup ideal than either of the mashup set stories, so "The Sound and the Fury" has 33% similarity to the ideal. The mashup recommendation text in the third box of FIG. 77 reports the seamlessness of all three of these stories plus "Led Astray," which is also close to the similarity percentage of "The Stars Of Mithra."

Allegorical Indexing

Referring to FIGS. 74 through 77, the concept of mashup ideals is demonstrated to be a powerful catalyst for a new way to look at the juxtaposition of theme-emotions. Since theme-emotions are often central to the meaning of stories, the use of theme-emotions extends beyond mere classification of genre and story similarities. Theme-emotions as calculated by methods in accordance with aspects of the present invention are accurate and powerful enough in some cases to be a basis for recording the juxtaposed meaning of words, by recording and indexing the juxtaposed theme-emotions of stories within subsets of those stories. Using subsets of sentence, paragraph or page size, for example, the indexed juxtaposition of theme-emotions can be used to describe the weighted significance of meaning generated by a neighborhood of theme-emotions.

Figure 78:
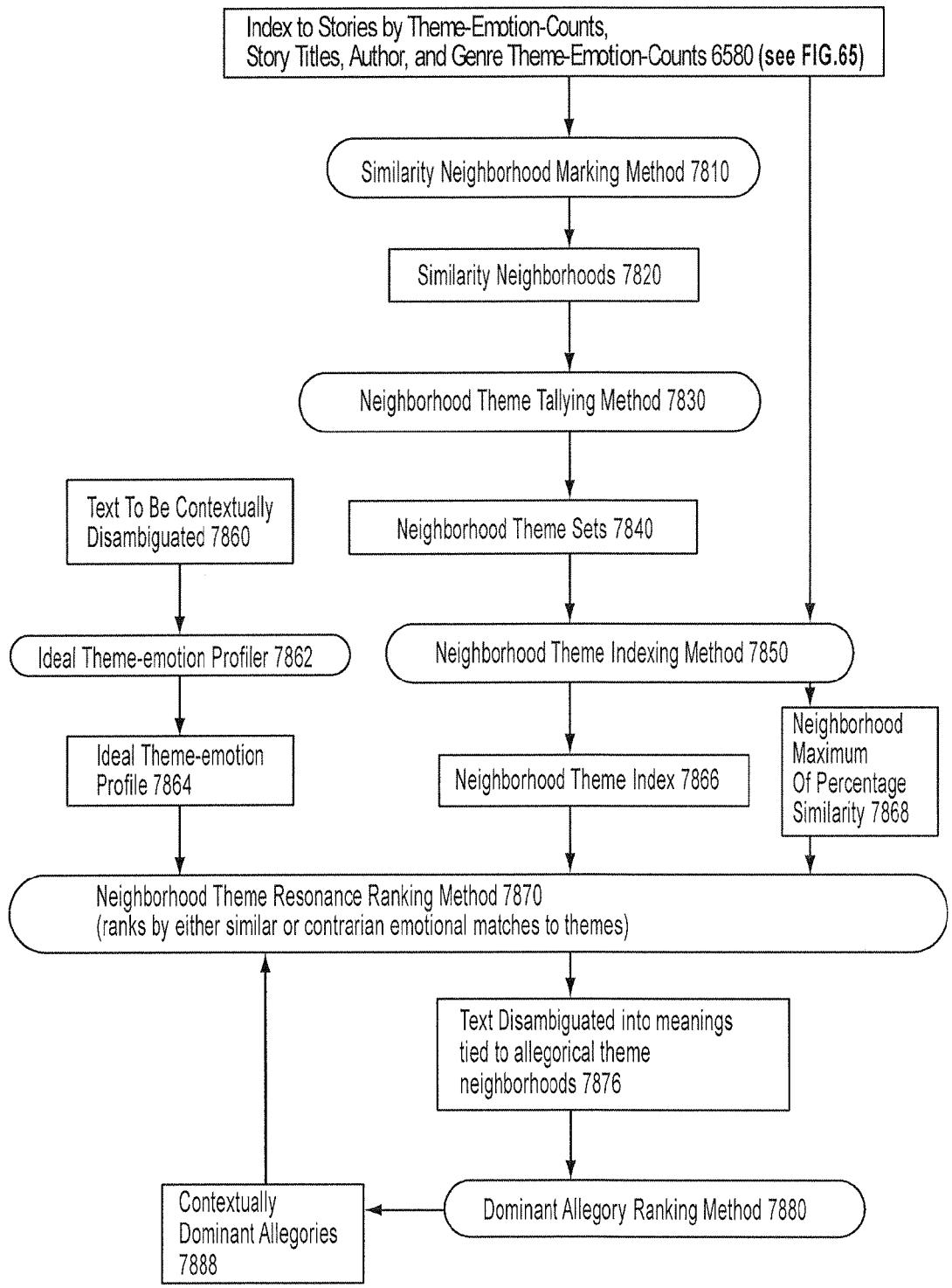

Such a method is outlined by the flowchart of FIG. 78. Taking index to Stories by Theme-emotion-counts, Story titles, Author, and Genre Theme-emotions-cnts defined in step 6580 from FIG. 65, a similarity neighborhood marking method is performed in step 7810 to mark neighborhoods of similar juxtapositions of themes determined in step 7820, tallying in step 7830 a profile of neighborhood emotion-theme counts within each neighborhood of themes identified in step 7840, and then indexing in step 7850 is performed for each of the profiled neighborhoods to update an neighborhood theme index in step 7866. Since the index produced in step 7866 accurately describes the meaning of each set of similar theme-emotions combinations, the index 7866 can thus take the place of ordinary static dictionaries for purposes of disambiguation the meaning of natural language text, as used in actual stories. Unlike unemotional statistical summaries of co-located terms, the method of 7800 is built upon the same "emotional glue" that binds terms together for human cognition, and hence accurately identifies when, for instance "eyes" and "smile" theme-emotions are juxtaposed for romantic meanings, or "human" and "alive" are juxtaposed for spiritual, as opposed to scientific, meanings.

Text to be contextually disambiguated as identified in step 7860 is fed into the resonance ranking method operation of step 7870 to produce text disambiguated into meanings tied to allegorical theme neighborhoods in step 7876, similarly to how stories sorted by similarity are sorted into mashup neighborhoods by recommendation method 6700 in FIG. 67. A similar type of maximum percentage similarity that delineates boundaries in method 6700 in the percentage similarity determination of step 6752 delineates boundaries between synonyms with percentage similarity identified in step 7868 of method 7800. As a feedback mechanism for subsequent contextual disambiguation, a dominant allegory ranking method operation performed in step 7880 selects the major allegory neighborhoods by theme-emotion prevalence from neighborhoods in step 7876 to produce contextually dominant allegories in step 7888. These contextually dominant allegories identified from step 7888 are then used to assign greater weight to neighborhood themes corresponding to the dominant allegory themes in the ranking method produced in step 7870. As text or conversation can narrow in on a particular set of themes, the method 7800 can track such narrowing through application of dominant allegories in step 7888 to shift weights of themes ranked in the ranking method operation performed in step 7870.

Compared to a dry dictionary ontology, or even a dynamic but emotionless statistical approach, the allegorical indexing and retrieval method 7800 has been found experimentally to yield more salient and usable results. Compared to semantic distance-based indexing and retrieval methods, method 7800 disambiguates at greater vocabulary sizes because emotional theme resonance similarity provides a more succinct summary of neighborhoods of meaning than manual or even automatically generated semantic distance topologies. As vocabulary sizes increase, semantic distance combinations increase exponentially in number, since all semantic nodes tend to be at least indirectly connected to all other semantic distance nodes, and nearly all of these transitive distances are considered valid candidates for shortest paths. Rather than seeking a shortest path from a vast "traveling-salesman" style network of choices for each disambiguation of such related art approaches, the method of 7800 applies a "tuning" approach, which tunes in the most resonant neighborhoods of meaning by directly comparing theme-emotion profiles of the text to be disambiguated in step 7860 to profiles in the neighborhood theme index produced in step 7866. Text to be contextually disambiguated in step 7860 is input to the Ideal Theme-emotion Profiler function performed in step 7862, which uses methods similar to method 5500 of FIG. 55 to annotate in step 7860 with a profile of theme-emotion counts weighted by emotional resonances, similarly to as in FIG. 48. The profiler output of step 7862 produces the Ideal Theme-emotion Profile in step 7864, which is then used by the Ranking Method performed in step 7870 to search for the most similar neighborhoods of themes from Index 7866.

In ranking method 7870, a tuning-resonant approach to selecting most resonant neighborhoods can traverse a Knuth-style TRIE index tree, or Radix index tree in Neighborhood Index calculated in step 7886 to quickly sift for neighborhoods having the most theme-emotions in common with the Ideal Profile of step 7864. Looking for themes in descending order of dominance, the ranking method operation of step 7870 can successively intersect results from each theme to efficiently find the closest neighborhood in a processing time proportional to the number of themes in the Profile determined in step 7864 and proportional to the number of themes in the average neighborhood indexed by the Index produced in step 7866. Limiting text to be disambiguated to the size of average neighborhood size, both typically being around one to three sentences in average size, has the advantage of supporting fast response times, similar to efficient search engine keyword probes. Neighborhood size limits of one to three sentences also allow some grammar constructions of conjunctions to be mapped within the Index produced in step 7866, so that logical conjunctions of And, Or and Not can be tracked and disambiguated logically for consistency with logical conjunctions of And, Or and Not found by the Profiler function performed in step 7662 in text to be disambiguated in step 7860. This operation enables emotions to be disambiguated with logical consistency, thus increasing the accuracy of ranking for disambiguation in the ranking method performed in step 7870. Other grammar constructions can also be tracked to appropriately rank neighborhoods from the Index produced in step 7866. For instance "what is" could be a trigger to look for what follows "what is" in a declarative statement. For example, "what is a car" would trigger a search for the theme "a car is" in the ranking method performed in step 7870.

Displaying Higher Dimensions of Emotions

As noted above, FIG. 80 shows three additional dimensions of Fear-Comfort, Blues-Inspiration and Wisdom-Naiveté. These higher dimensions are more accurate than a simple negative-positive axis of tension resolution within a story, since, as noted above, a lack of wisdom (naiveté) cannot precisely resolve with comfort or inspiration, but must actually miss true closure in an precise emotional sense until an actual feeling of wisdom occurs. Similarly, lack of inspiration must be overcome with inspiration, and not just the "band-aid" of comfort or wisdom. The lack of comfort cannot truly be overcome by inspiration and wisdom, which can help provide hope for comfort, but within a story, only the arrival of actual comfort can meet this need. The main reasons for using a simpler, less accurate negative-positive resolution-tension model is that most users are more familiar with a simple bad versus good storyline, and also most users are more familiar with interpreting red-green or hot-cool colors as a continuum of color, than interpreting a full-color continuum of shifts in all possible colors to reflect a three-way shift from tension (white) towards resolution (black). Another wrinkle with a more complex analysis approach is that, to show the absence of character arc presence, white must be reserved, and, as a result, the band of colors near white have to be avoided in the color table. Nevertheless, the analysis and display of Fear-Comfort, Blues-Inspiration and Wisdom-Naiveté dimensions of tension-resolution may ultimately be more useful to experienced users, because that approach provides higher accuracy and more insight to professional writers and publishers than a simpler negative-positive analysis and display.

One aspect of the present invention is devoted to these higher dimensional, more accurate methods of calculating story satisfaction and page quality. FIG. 81 shows a representative gray-scale approximation of a full-color display of analysis information, in accordance with aspects of the present invention. Similarly to FIG. 62, which graphed a single resolution-tension line across the story arc character columns, FIG. 81 graphically depicts three differently colored lines, one each for overall Fear, Blues, and Naiveté tension-resolution displacements. And, similarly to FIG. 62, FIG. 81 shows variably tinted dots to indicate individual resolution-tension progressions character-arc by character-arc. FIG. 81 further presents variably tinted dots to representatively indicate individual resolution-tension progressions across a full-color spectrum, in which black represents resolution with a kind of zen-like stillness, and Fear, Blues, and Naiveté are represented by intensities of primary colors red, blue and green, respectively. Together with augmented versions of all gene-num pair tables, not shown but suggested by FIG. 80, some methods in accordance with aspects of the present invention can be recast to track tension-resolution in three dimensions, rather than one dimension, where appropriate.

Contrarian Higher Level Emotion Resolution with Allegorical Indexing

The Allegorical indexing and retrieval method 7800, combined with Higher Dimension Emotional Analysis Methods, provides search-engine retrieval speeds with the ability to retrieve text with emotion-themes, which, in turn, resolve the emotional tension detected in a query text by the Theme-emotion profiler operation of step 7862 in FIG. 78. For instance, a query that expresses naiveté about a technology can be best met by searching for a complementary emotion-theme have abundant wisdom about that technology as determined in the ranking method of step 7870. By categorizing queries within the three main Fear, Blues and Naiveté emotional dimensions of FIG. 80, seeking contrarian instead of matching emotions in the results produced by the ranking method of step 7870 for the same themes as these produced by the Profile operation of step 7864 can lead directly to solutions to subtle problems implied by the results of the Profile function of step 7864. As the basis for a discussion type interface between users and computers, such a response to emotional needs can guide computer generated responses to be more sympathetic and even empathic in style, making computers more useful for hot-line help lines and customer service portals. Other needs that can be fruitfully fulfilled by method 7800 and higher dimensional emotional analysis may include: 1) automatically sifting customer service records for past resolution patterns and outstanding unresolved issues; 2) automatically crafting responses to political constituency correspondence; 3) automatically creating news feeds by sampling internet blogs for resolutions to currently dramatic issues; or 4) matching snippets of web content to co-located displays of web advertising which resolve at least some emotional issues arising in the snippets of web content. In short, any situation where there is either: A) a need to know the emotional bias of belief holders as expressed in text; or B) the need to supply textual information to resolve emotional tensions of literate belief holders, becomes a excellent opportunity for application of method 7800 to automatically service user needs. And, unlike simple rule-based approaches to providing chat-bot and other interactive services, the range of expression and theme vocabulary that can be handled by method 7800 is practically unlimited and almost free of manual labor. Further, increasing the thematic coverage of neighborhood theme index 7866 to cover new use cases may be accomplished by simply automatically analyzing greater varieties of text using methods similar to method 5500 shown in FIG. 55.

GUI

Referring to FIGS. 49-50, 52-53, 58-62, 68-77 and 81-84, these Figures show exemplary windows or screen shots generated by an exemplary graphical user interface (GUI), in accordance with aspects of the present invention. Some variations of exemplary screen shots may be generated by a server 8206 in response to input from user 8201 over network 8204, such as the Internet, as shown in FIG. 85. That is, in such an aspect, server 8206 is a typical Web server running a server application at a Web site which sends out Web pages in response to Hypertext Transfer Protocol (HTTP) or Hypertext Transfer Protocol Secured (HTTPS) requests from remote browsers being used by users 8201. Thus, server 8206 is able to provide a GUI to users 8201 of system 8200 in the form of Web pages. These Web pages may be sent to the user's personal computer (PC), laptop, mobile device, personal data assistant (PDA), or like device 8202, and result in the GUI screens of FIGS. 49-50, 52-53, 58-62, 68-77 and 81-84, being displayed.

Rhetoric and Sentiment Indexing

The class of methods similar to the Literary DNA to Literary Resonance Mapping Method FIG. 48 provide a useful foundation of text segmentation for mapping higher level intrinsic and extrinsic meanings of text. Whether mapping boundaries of sentiment fluctuations in sign over a single dimension, such as in FIG. 48, or over multiple dimensions simultaneously, the boundaries associated with changes in sign of emotional or sentiment vector sums are useful boundaries for grouping rhetorically significant related regions of text. Rhetoric involves traversing sentiments on both positive and negative sides to an argument, to convince readers or listeners that a writer or speaker is fully describing a situation. When a writer or speaker stays too long on a positive side or negative side, the reader or listener will find bias and sense weak rhetoric.

The present invention associates regions of text "A" marked as positive within dimensions of sentiment with col-located regions of text "B" also marked as positive within the same dimension. Key-phrases found within text "A" are linked to key-phrases within text "B" to form key-phrase pairings which are precursors to automated ontology construction.

Similarly, the present invention associates regions of text "C" marked as negative within dimensions of sentiment with collocated regions of text "D" also marked as negative within the same dimension. Key-phrases found within text "C" are linked to key-phrases within text "D" to form key-phrase pairings which are precursors to automated ontology construction.

For the purpose of accurately mapping these rhetorical boundaries, the present invention uses a variation of Method 100 of FIG. 1 to map three dimensions of sentiment chosen for rhetoric mapping as shown in FIG. 87 Rhetorical Sentiment Dimensions 8700.

The first dimension has positive values representing the intrinsic sentiment of Motivation, and negative values representing the intrinsic sentiment of Frustration. The values of this dimension quantify sentiments which lead to actions in the case of positive values, and sentiments which prevent actions in the case of negative values. The second dimension has positive value representing the intrinsic sentiment of Indicator-Of-Intent, and negative values representing the intrinsic sentiment of Discontent. The positive values stand for generally desirable sentiments and the negative values stand for generally undesirable sentiments of this dimension. The third dimension has positive values representing the intrinsic dimension of Clarity, and negative values representing the intrinsic dimension of Confusion. The values of this dimension quantify general feelings of Clarity or Confusion associated with text, not logical or grammatical aspects of text. It has been found through experimentation that the above dimensions align better with rhetorical structures than the Fear/Comfort, Blues/Inspiration and Wisdom/Naiveté dimensions shown in FIG. 80.

The present invention generally maps three dimensions of sentiment, since assigning a primary color to each dimension to colorize text is a convenient method for displaying dimensional analysis within a red-green-blue color palette. Higher dimensional analysis can be performed for greater accuracy mapping, but four and five dimension results are difficult for quality control workers to interpret. For checking the quality of analysis over megabytes of text, visual inspection must be efficient enough to instantly reveal all significant sentiment vectors for every word of text at a glance.

For instance, the Motivation/Frustration dimension can be displayed with blue color values ranging from dark to light as sentiments range from negative to positive. Similarly, the Indicator-of-Intent/Discontent dimension can be displayed with red color values ranging from dark to light as sentiments range from negative to positive. And the Clarity/Confusion dimension can be displayed with green color values ranging from dark to light as sentiments range from negative to positive.

Alternatively, the present invention can use a tempered color display capable showing at a glance any zero or null sentiments. Using the intensity of red for Discontent, Frustration and Confusion, intensities of blue for Motivation, intensities of green for Clarity and intensities of aqua for Indicator-of-Intent, the present invention can distinguish hundreds of sentiments by mixing various red, blue, green and aqua colors, while reserving the absence of intensity (black) to show where all three dimensions are zero and grayish colors tinted to show where the three dimensions are near zero and rhetorical sentiments are mild.

For accuracy in the case of mild rhetorical sentiments, absolute values in the three sentiment dimensions can be fractions as small as one-eight ($1/8$), one-quarter ($1/4$) and one-half ($1/2$) or even zero. For good dynamic range, sentiments can go as high as 1, 2 or 3 in value. By quantizing around positive and negative values of $1/8$, $1/4$, $1/2$, 1, 2, 3 the present invention reduces the number of possible distinct display colors. Yet it may be preferable in other variations of the present invention to compute or display a much wider dynamic range of sentiments, by increasing the time for using the development method of FIG. 4 to allow longer word groupings in the method of FIG. 1 with a corresponding greater number of Literary DNA table entries for FIG. 5-46.

Examples of sentiment mappings for rhetorical boundaries are shown in mapping table 8750. Similar to FIG. 80, but recast into dimensions of Motivation/Frustration, Clarity/Confusion and Indicator-of-Intent/Discontent, the mapping table of 8750 is a fragment of a fully developed mapping table of over 540 rows from the present invention using the development method of FIG. 4. Zero sentiments are shown as blanks in the table.

Figure 88:
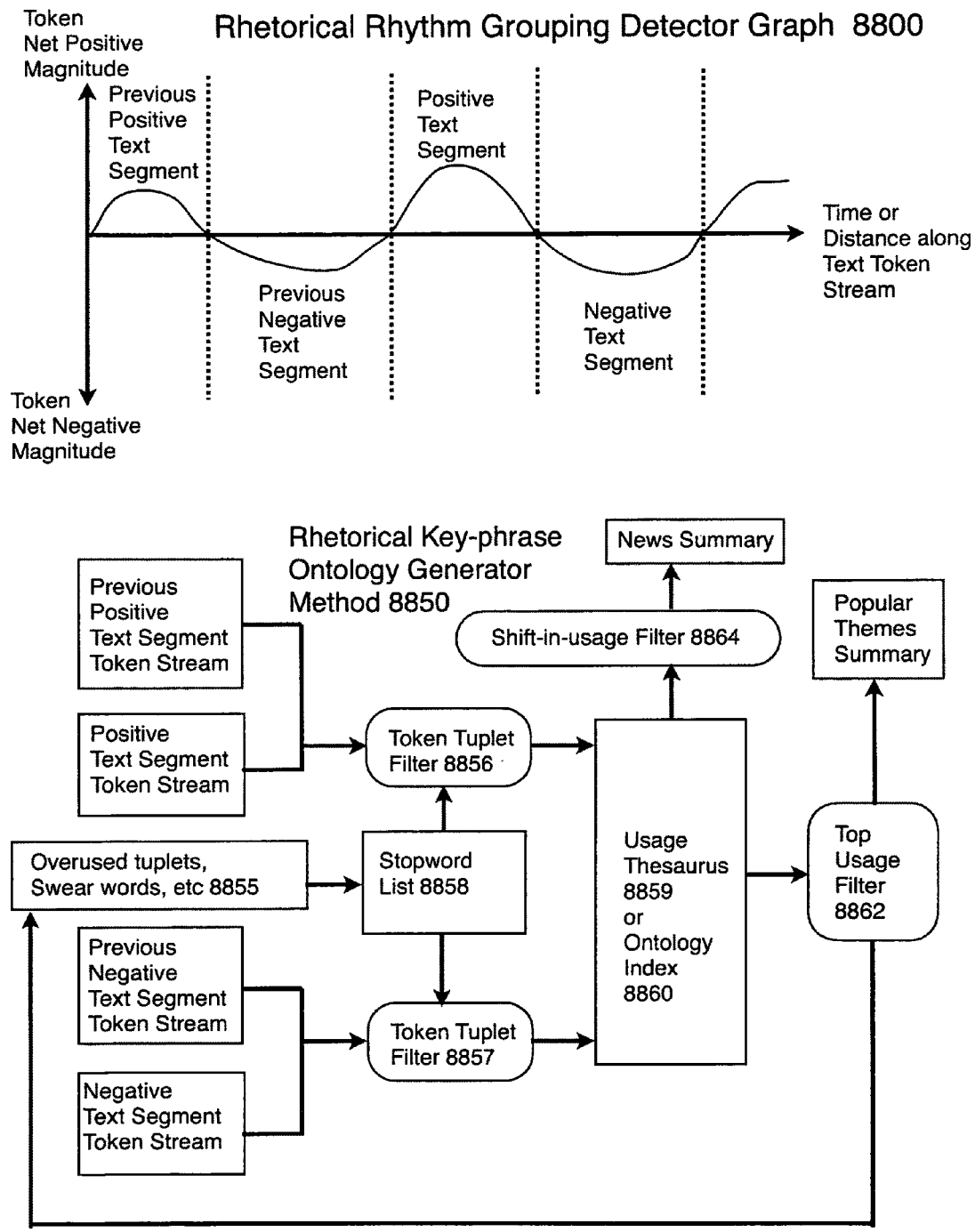
FIG. 88 graphs rhetorical rhythm groups for text segmentation, and shows a method for generating key-phrase listings from text, in accordance with aspects of the present invention.

Independently treating each of the three dimensions, the Rhetorical Rhythm Grouping Detector Graph 8800 of FIG. 88 shows how text is analyzes in the method of FIG. 48, using the method of FIG. 48 on each dimension of the mapping table whose fragment 8750 is shown in FIG. 87.

In the method of FIG. 48, for each token of text, there is a Literary Resonance Stream 4814 value, which can be negative, positive or zero. By plotting text stream sentiment value fluctuations token by token, the Graph 8800 shows where token-by-token sentiments belong to positive or negative segments. These text segments contain key-phrases which are intrinsically emotionally significant to other prior text segments of the same sentiment sign. Each text segment can then be analyzed into significant key-phrase token tuplets using Token Tuplet Filter 8856 and 8857. This filters out overly vague tuplets consisting only of punctuation or overly general words such as "a" or "any" or prepositions. Filters 8856 and 8857 can be sophisticated, working with a Stopword List 8858 of words indicating a set of words whose complement set must be within an allowable tuplets. Rules of grammar may be applied, such as preventing allowable tuplets from ending in a dangling preposition or dangling transitive verb. The tuples themselves can be any size. They can range from a single token to a sequence of 2, 3, 4 or even 5 tokens. However, sequences of 1, 2 and 3 tokens capture most ontologically significant phrases and 5 token sequences resemble quotations more than ontological terms, so tuples of 1, 2 and 3 or even 4 tokens are sufficient for automatically constructing useful ontologies.

Filters 8856 and 8857 store their key-phrase output in Usage Thesaurus 8859 or Ontology Index 8860. Each key-phrase can be stored individually if just tracking prevalence of key-phrases. More usefully, the present invention may also generate pairs of key-phrases, pairing key-phrases from each text segment with key-phrases from the previous text segment of the same sentiment sign. By storing these pairs of key-phrases as in Thesaurus 8859 or Index 8860, the most rhetorically significant and most meaningful combinations of key-phrases can be tracked. In contrast to prior grammar-driven or emotionally-dry semantic automatic ontology constructors, the present invention indexes key-phrases that people most care about, phrases that have the greatest emotional significance and greatest sentimental investment.

Consequently, the automatically generated Thesaurus 8859 or Ontology 8860 can reveal the most popular themes from a large corpus of text used as input to the method 8850, simply by filtering out a set of key-phrase pairings having greatest occurrences or frequency of appearance. If frequency of appearance is too high however, for instance if swear words are used frequently, these Overused tuplets 8855 can be automatically added to the Stopword List 8858 so that subsequent uses of method 8850 do not allow them as key-phrases.

Similarly, if changes in the frequency of key-phrase pairings are detected by Shift-in-usage Filter 8864, these shifts, particularly upswings, can be reported as a News Summary with related quotations. For retrieval of these quotations, the present invention may store quotations of the sentences or paragraphs enclosing key-phrase pair occurrences, indexing them under key-phrase pairings in Thesaurus 8859 or Ontology 8860.

An example of the use of the method 8850 on a sentence fragment from the Declaration Of Independence by Thomas Jefferson is shown in FIG. 89. The words "We hold these truths to be self-evident, that all men are create equal," is analyzed by method 8850 in the three dimensions of Motivation/Frustration 8910, Clarity/Confusion 8920 and Indicator-of-Intent/Discomfort 8930. Since each dimension is orthogonal, token-by-token fluctuations in sentiment vary across the three dimensions. For instance, the first positive sentiment occurs at the word "hold" for Graph 8910, but not until the word "these" for Graph 8920, and still later at the word "truths" for Graph 8930. This is due to the method of FIG. 1 determining that within the context of the Declaration of Independence, the word "hold" is a motivational, the word "these" is clarifying and the word "truths" is a positive indicator-of-intent.

The vertical dotted lines in FIG. 89 show the boundaries of text segments where sentiments swing between positive and negative values across the vertical centerline of zero sentiment. Graph 8910 shows the words "hold" and "self-evident" are motivational and the motivationally bound the other segments. Similarly, "these," "be self-evident," "all" and "are" clarify and bound the segments of Graph 8920. Scanning the bounded text segments for 1, 2 and 3-tuple sequences and applying the Filters 8856 and 8857 to compute key-phrases, the Graph 8910 produces key-phrase pairs from two pairs of positive text segments: "hold" and "self-evident" plus "self-evident" and "men are created equal." Similarly, Graph 8920 produces key-phrase pairs from two pairs of negative text segments: "We hold" and "truths to" plus "men" and "created equal." Other text segments cannot contribute key-phrases because their 1, 2 and 3-tuple sequences do not pass through Filters 8856 and 8857.

It is important to note that text segments as shown in FIG. 89 may provide clues to disambiguate the use of anaphor. For instance the word "We" falls in like-sign segments with "men" in clarity Graph 8920 and indicator-of-intent Graph 8930. This would enable anaphor resolution based upon like-noun candidates falling into prevalent like-sign text segments.

In FIG. 90, the Rhetorical Automatic Ontology Generator 9000 takes all key phrase pairings from Method 8850, whether directly from Filters 8856 and 8857 or indirectly from Thesaurus 8859 or Index 8860, and tallies their relative populations of associated key-phrases in Population Analysis 9002. Examples of these tallies are given in the table of FIG. 91 showing relative population analysis for the examples of text segments of FIG. 89.

The most prevalent key-phrase is "self-evident" and the second most prevalent is "men." Each occurrence of a key-phrase across all dimensions of sentiment are counted, so that the most rhetorically and emotionally significant key-phrases have the highest tallies. These prevalent key-phrases become hyper-links above their associated linked key-phrase pairing partners in the other alternate text segment of FIG. 89. Higher tally phrases such as "self-evident" and "men" will head hierarchies above lower tally phrases such as "truths" and "created equal."

To compute hierarchic order, a rule may be applied where key-phrases having lower tallies of linked key-phrases become hyponyms and the higher tally linked phrases become hyponyms. Where ties occur, a tie-breaker can be computed by a variety of methods such as tallying the overall indirect number of linked key-phrases of each of the linked key-phrases and making the key-phrase with highest overall indirect number the hypernym key-phrase.

In Hierarchic Key-phrase Link Indexer 9008, to keep redundant links from cluttering the ontology index, direct links can be omitted if indirect links suffice to connect key-phrases. For instance, "self-evident" has the hyponym "created" but also links to the hyponym "created" via the direct hyponym "all men" which in turn has the direct hyponym "created". Omitting the direct hyponym link between "self-evident" and "created" make the ontology clearer.

For the example of Population Analysis table in FIG. 91, the output of Indexer 9008 to be stored in Thesaurus 8859 or Ontology 8860 is shown in example of Ontology 9050 of FIG. 90. The top of the hierarchy is "self-evident" and the "men" and "all men" head the major subtrees under the top. As obvious from this example, the method 9000 generates a significant ontology for very modest amount of text. Indeed the depth and complexity of the rhetorical ontology generated for a typical sentence is on the same order as prior grammar and emotionally-dry semantic analyzers. Yet an advantage of method 9000 is that the rhetorical ontology puts the most rhetorically significant key-phrases at the top and central nodes of the ontology tree. In contrast, automated grammar and emotionally-dry semantic analyzers put key grammatical elements or vague ontology headers in the central nodes of their output trees, regardless of whether the input text is grammatically correct or ontologically similar to a dry semantic ontology. For instance, a text may discuss the "nuclear option" for ending filibusters in the U.S. Senate. A standard ontology would choose ontology headers from biology or physics, such as cell-structure or nuclei, none of which would be appropriate, to disambiguate the meaning of "nuclear." The present invention is can track the florid metaphoric use of "nuclear" beyond dry ontological meanings, to index the true meaning of metaphors.

Natural Language Search

Searching the universe of natural language text by grammar or by ontological standards pre-supposes a orderliness to natural language that generally does not and will not exist. Consequently, the method 9000 generates a rhetorical ontology more generally useful to people, bypassing the extraneous results returned by grammar or standardized ontology, and allowing people to find text via rhetorical metaphors which cannot be standardized.

Figure 92:
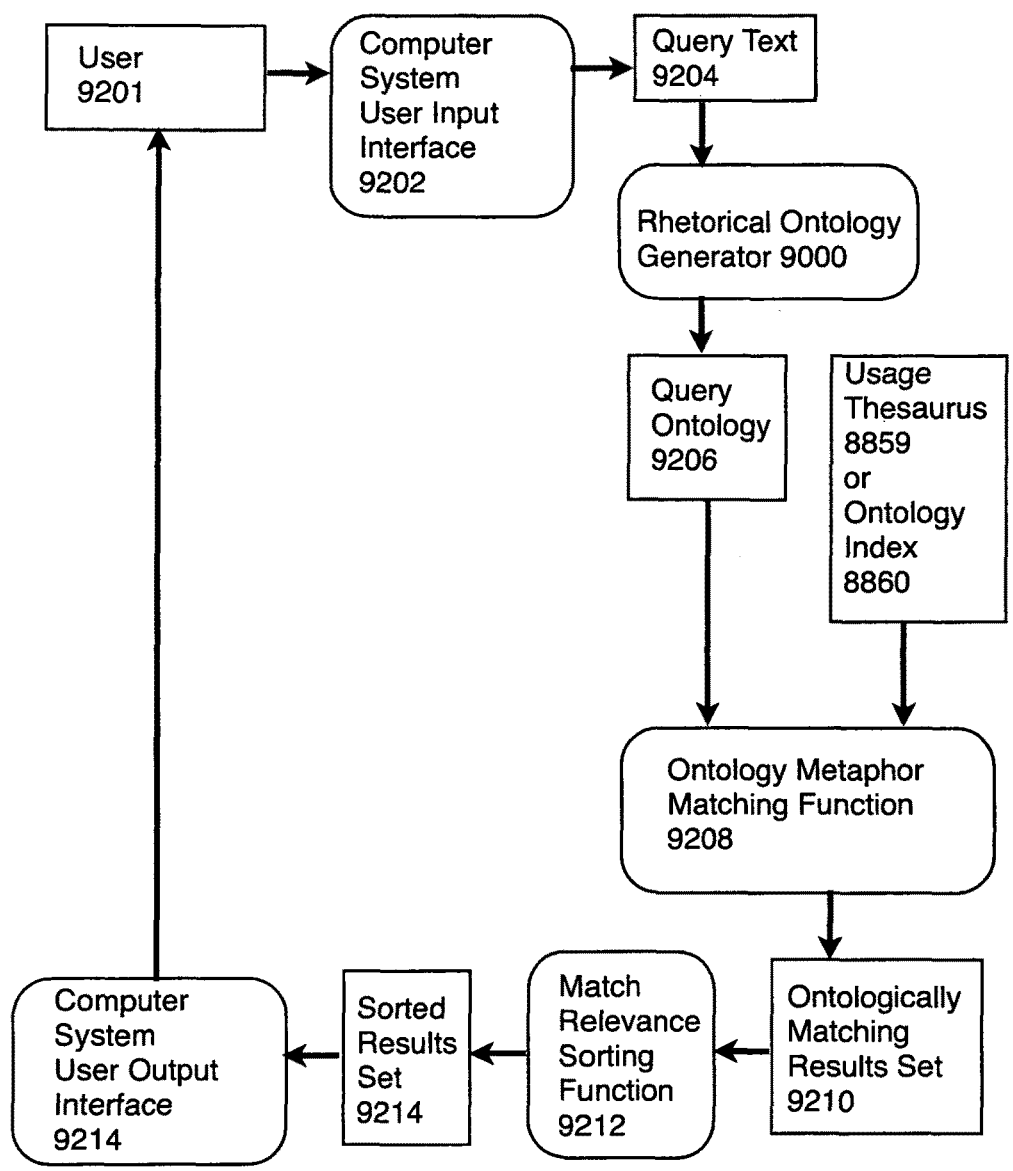
FIG. 92 shows a method for a natural language query system using the advantages of an automatically generated rhetorical ontology as shown in FIG. 90, in accordance with aspects of the present invention.

A method for such a natural language query system in shown in FIG. 92. As shown by the example ontology 9050 generated by method 9000 from "We hold these truths to be self-evident, that all men are created equal," as short sentence or sentence fragment query text 9204 suffices to generate an Ontology 9206 large enough to drive a search for a similar ontological topology within a large search space within Index 8860. The Ontological Metaphor Matching function 9208 can search for central key-phrases in Ontology 9206 within Index 8860. Subsequently, the Match Relevance Sorting Function 9212 can weight and sort subtree results returned by the 9208. These weightings can be based on measures of topological similarity between Ontology 9206 and each subtree returned by 9208. For instance, a resulting subtree having a short ontological distance between the two top terms "self-evident" and "men" of example ontology 9050 would show a high degree of similarity. Those skilled in computational ontological arts will recognize that most methods for computing similarity between subtrees would work in matching Function 9208: comparing similarity of distance between nodes of the same names, comparing similarity overall sentiment values for occurrences node by node, comparing similarities node-by-node weighted by number of inherited hyponyms of each node, etc.

Figure 94:
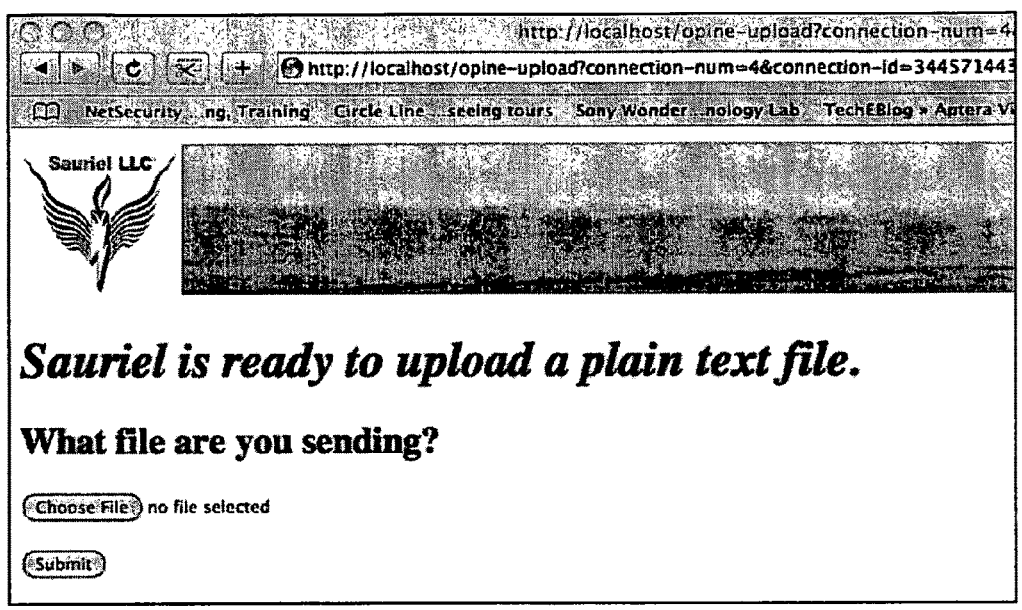
Figure 95:
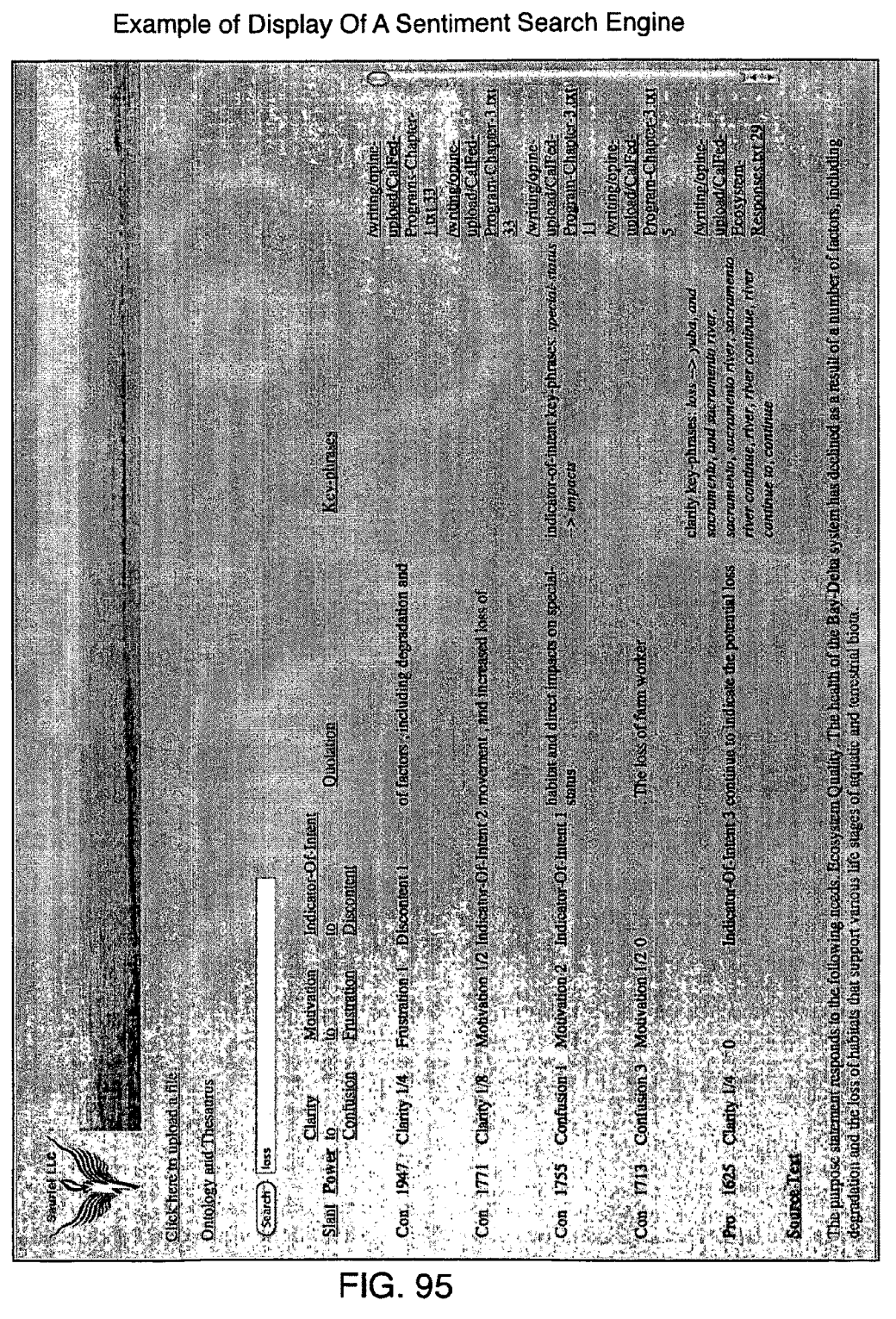
Figure 96:
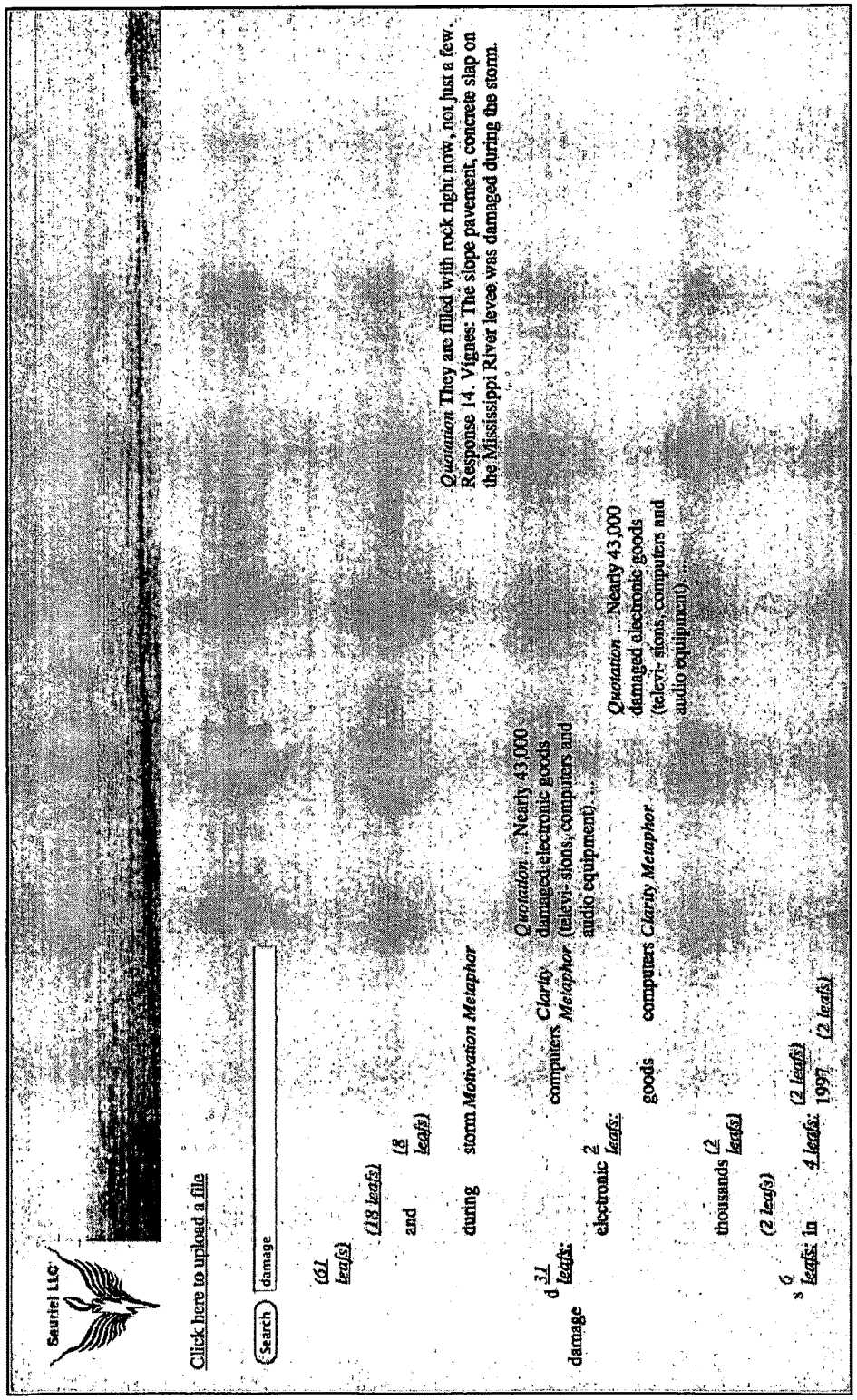

The output of Results set 9214 can be displayed to a user 9201 on computer system interface 9214, so that the user 9201 can re-query as needed, as with traditional search engines. The results may be displayed as an ontology as in the screen shot FIG. 96 or as a sorted list of results as in the screen-shot FIG. 95. Both FIGS. 96 and 95 are examples from a web-based search engine system where large scale content can be uploaded via an upload web page shown as an example in FIG. 94. Uploaded content is automatically ingested to a search engine index which is queryable in FIG. 95 and FIG. 96. The web page of FIG. 95 allows users to click on header columns to change sorting orders. For instance, when performing legal discovery looking for "smoking gun" emails, queries can be made for prima facie evidence such a "loss" or "damage" within emails. By sorting on Power, the quotations with the most rhetorical power and strongest emotions sort to the top. These results can then drive queries looking for Clarification of those kinds of losses or damages, sorting by Clarification. These results in turn can drive queries looking for underlying intentions which may have caused those losses or damages, sorting by Indicator-of-intent. The user interface page of FIG. 95 has similar uses in searching for quotable constituent emails for political campaigns, or searching for quotable blogs when composing marketing campaigns.

Figure 93:
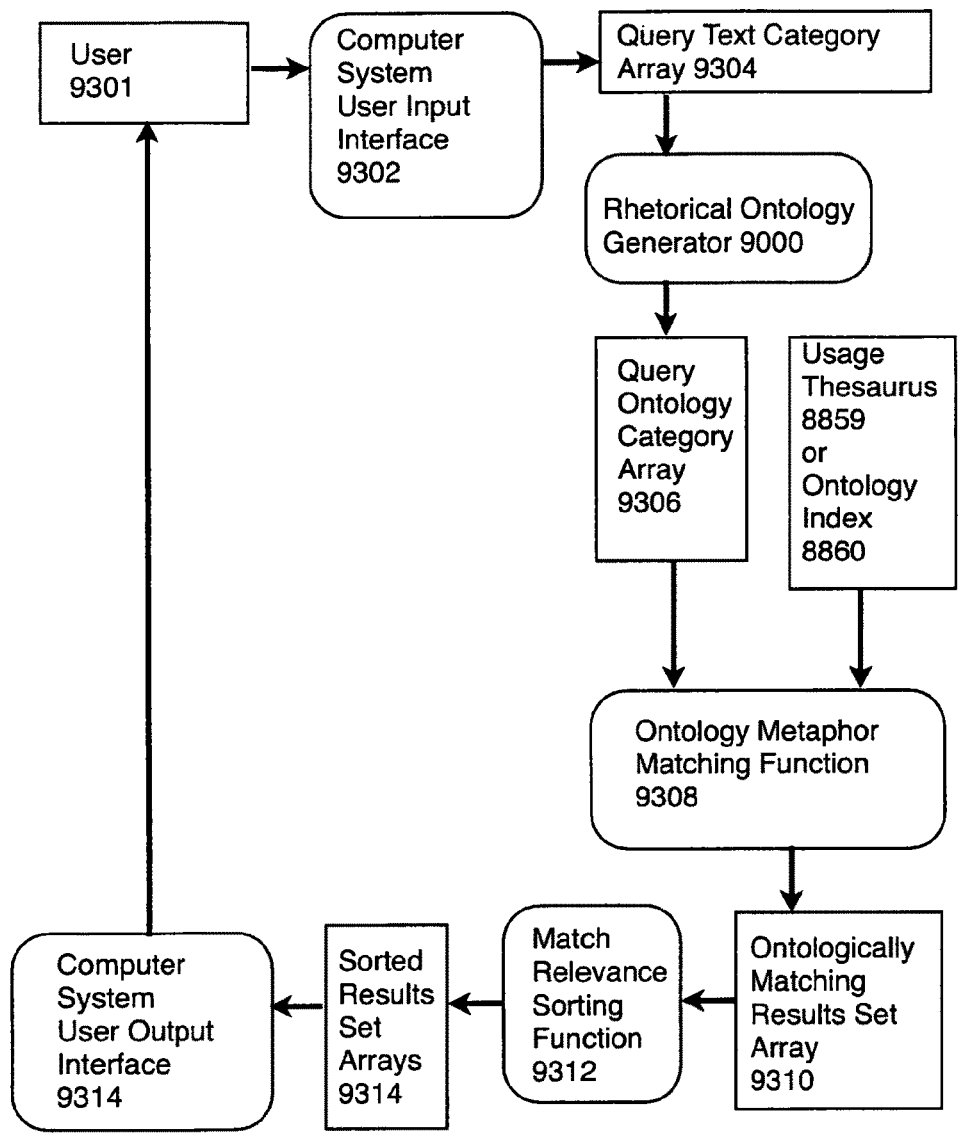
FIG. 93 shows a method for a natural language classification system using the advantages of an automatically generated ontology from FIG. 90, in accordance with aspects of the present invention.

Often, a large body of text must be processed into classifications. For instance, customer service emails must be classified into groups for tracking customer satisfaction and to relay emails to specialized staff areas. For the benefit of the legal community, in the field of citation tracking within court cases, citations need to be sorted into citations which affirm cited court decisions and citations which have issues or problems with court decisions. In this way, lawyers are informed as to which court decisions are considered non-controversial good law overall and which decisions are problematic, controversial law. To address these and similar needs to classify text on a large scale, FIG. 93 shows a variation of the method of FIG. 92 to classify large amounts of text around an ontology query array.

Querying for an ontology query array has the additional of advantage of returning multiple result sets, one for each query ontology. Each result set can then populate a category, perhaps further qualified by workflow dates or workflow locations to automatically supply relevant results to specialized staff areas or to update court decisions data bases. Beyond simple categorization, ontology query arrays may be used for conversational computing interfaces, where possible conversational focuses are each represented by a query ontology, and the conversation is steered in the direction of whichever Result Set 9314 has the highest relevance returned by Sorting function 9312. Thus chat-bot style conversations can be computed fluidly, given a sufficiently large Ontology Index 8860 from which to choose responses.

Natural Language Disambiguation

Whether for automating natural language translation or simply clarifying the meaning of text, the average polysemy of a word links to an average of three distinct meanings in a traditional semantic ontology such as WordNet. In an automatically generated ontology, the polysemy of a word can link to many more distinct shades of meaning. Thus, the meaning of even a short five word phrase would, in a WordNet ontology, have an average of 3 raised to the fifth power: 243 combinations of meanings which should be disambiguated to a single most relevant meaning. For automatically generated ontologies, the greater polysemy makes the need for disambiguation even more significant.

By mapping the rhetorical relationships between keyphrases, the present invention automatically generates a hierarchy of linked key-phrases. As with any linked hierarchy of terms, the relationships expressed by that hierarchy can be traversed to compute a relative distance or mutual relevance or disambiguation distance between terms. Experimentation has shown that even simple distance functions applied to hierarchies such as shown in FIG. 90 can usefully disambiguate between choices of polysemic meanings. For instance, one such function in the present invention can be as simple as the ratio of hyponym node counts between any two nodes of the hierarchy linked by hyponym links. For example, the hierarchy of FIG. 90 can be stored in tree-structure annotated with hyponym tallies at each node. The Tree Size Index 10105 in FIG. 101 shows these hyponym tallies as encircled numbers directly to the right of each node. For instance, the node "men are created" has no hyponyms, so the encircled number is zero. The highest node in the hierarchy "self-evident" has the most hyponyms, showing an encircled number of thirteen, which tallies all hyponym nodes linked under it. A simple version of the present invention would compute a tree-size by adding one to each of these tallies, signifying the node itself and setting a floor of one to facilitate division operations, for tree comparison operations. As shown in Direct Rhetorical Distance Calculation 10120, when calculating the distance between two nodes of the same hierarchy, both the tree-size of the higher hypernym node and the tree-size of the lower hyponym node are input to the Tree-Size Comparison Function 10125. This function may be as simple as dividing the tree-size of the higher hypernym node by the tree-size of the hyponym node. The table 10150 shows a few examples from the tree 10105 using this simple function. The first row of the table shows that hypernym "self-evident" has a distance of 2.8 from "that all men," showing a closer rhetorical distance than "self-evident" to "equal" of 14. Using the simple Distance Calculation 10120, nodes without a hyponym relationship have no Direct Rhetorical Distance 10130. For instance, in table 10150, "men" and "hold" do not inherited directly from each other, so they have no Direct Rhetorical Distance 10130. However, those skilled in the art of traversing ontologies will recognize that distances between sibling nodes such as "men" and "hold" are often calculated in the context of a parent node such as "self-evident" in Index 10105. The Method of Calculating Rhetorical Distance Via a Common Hypernym 10210 in FIG. 102 shows a simple way to sum the distances between parent and sibling nodes. Similarly, distances between parent hypernym nodes can be calculated by summing distances between each hypernym and a common child hyponym node, as shown in the Method of Calculating Rhetorical Distance Via a Common Hyponym 10250. Examples of results from these methods are shown in the table of Indirect Rhetorical Distances 10290. For nodes of Index 10105, the distance between "men" and "hold" is 13.3 via common hypernym "self-evident." Similarly, the distance between "hold" and "we hold" is 4 via common hyponym "truths," reflecting the greater similarity of tree sizes of these three nodes, compared to the previous example. Experimentation has found that a greater similarity of tree sizes reflects a greater closeness in level of meaning, and hence a greater closeness in rhetorical meaning. For instance, the table of Indirect Rhetorical Distances 10290 shows that "truths" and "created" are at a relatively long distance of 28, because their common hypernym "self-evident" has much greater tree size than "truths" and "created" trees.

Those skilled in the art of traversing ontologies will recognize that the present invention may include many variations in computing distances, adjusting for clustering and classification features, using techniques from topology, statistics and computational linguistics. For instance, as shown in Tree Size Index 10105, the nodes "men," "all men" and "that all men" are closely cross-linked with nodes "equal" "created equal" and "created." Distances between "men," "all men" and "that all men" could be reduced by the number of Common Hyponym 10250 paths between them; for instance the distance between "men" and "all men" could be reduced by dividing by the four Common Hyponym paths, from reducing the distance of 5 along any one of these paths down to 1.25.

The present invention includes other variations in computing distance from its rich emotion and sentiment detection capabilities. For instance, FIG. 89 shows two Positive Sign text segments to be linked in Graph 8910, and the rest of the text segments to be linked are Negative Sign in Graph 8920 and Graph 8930. The corresponding Positive Sign links in Tree Size Index 10105 are between "self-evident" and "hold" and between "self-evident" and "men are created." These links are shown as dotted lines. The other, Negative Sign links of Tree Size Index 10105 are shown as solid lines. When traversing such a hierarchy, such Signs may be taken in to account, to segregate negative from positive traversals to separately calculate Negative Distances as opposed to Positive Distances. This is useful when seeking a more precise comparison of fit between a Query Ontology 9206 and Ontology Index 8860 subtree as in FIG. 92 or between a Query Ontology Category Array 9306 and Ontology Index 8860 subtree as in FIG. 93. Furthermore, a segregation of Positive and Negative may be expanded to segregate links from Graph 8910, 8920 and 8930 in FIG. 89, so that each of the three dimensions of Sentiment processes separately in separate Negative and Positive aspects, enabling Rhetorical Distances to be considered in six different dimensions. By representing distances in more dimensions the present invention gains more criteria for discerning between large numbers of polygamous meanings. At the same time, by representing queries as exemplary ontologies for comparison to stored dictionary or thesaurus ontology subtrees, each aspect of an exemplary ontology, such as sentiment of links or topology of key-phrases, defines and zeros-in on specific loci for topologically measuring best fit to ontology subtrees candidates, thus sharpening the precision of natural language disambiguation using rhetorical distance functions of the present invention.

Figure 103:
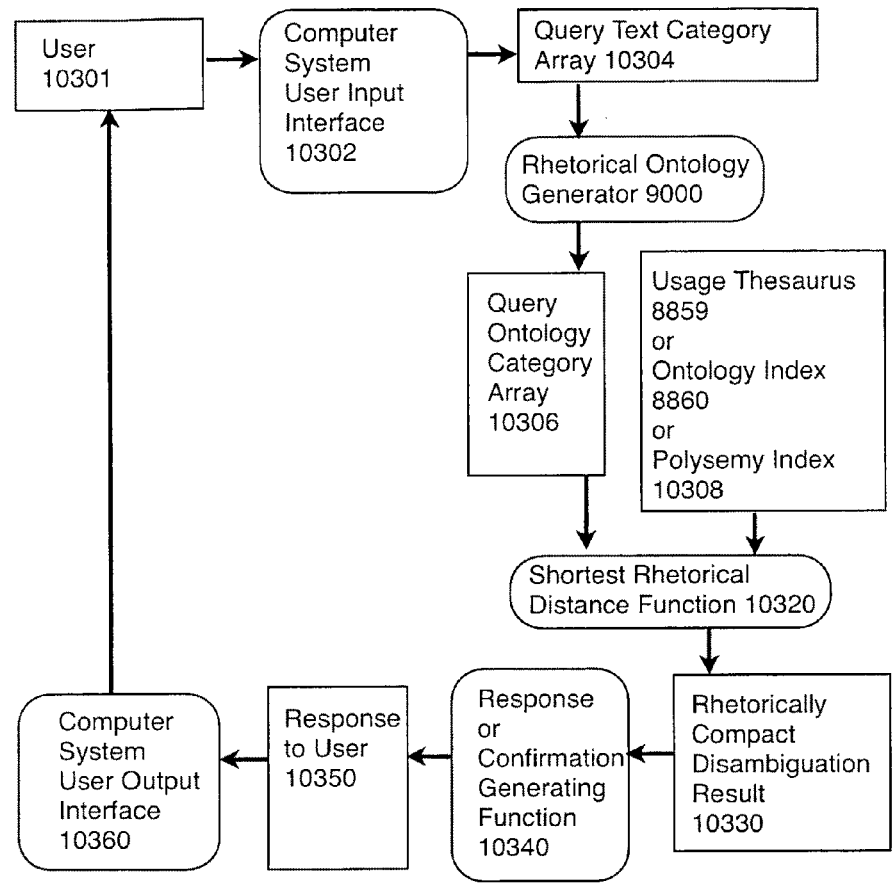
FIG. 103 shows a method for disambiguating the polysemy of a natural language phrase, and an exemplary traversal across a polysemy index to disambiguate the phrase "men are created equal," in accordance with aspects of the present invention.

The present invention refers to methods of applying such "best fit" calculations to candidate ontology subtrees as a Shortest Rhetorical Distance Function 10320 which produces a Rhetorically Compact Disambiguation Result 10330 in FIG. 103. As part of the present invention's Natural Language Disambiguation Method 10300, this function for computing a "most compact" or "best fit" topology enables a User 10301 to zero-in on specific shades of meaning by simply asking for things in natural language, input via a Query Text Category array 10304, which is translated by a Rhetorical Ontology Generator 9000 as in FIG. 90, to produce an Ontology Query Array 10306. The "best fit" is calculated by Distance Function 10320 between Array 10306 and Polysemy Index 10308 as discussed above or Ontology Index 8860 as in FIG. 88. The best fit subtrees of Index 10308 or 8860 are output as Rhetorically Compact Disambiguation Result 10330, which is then flattened into a natural language response to the user, which can serve as confirmation paraphrase or search engine response to the User Output Interface 10360.

The table 10380 shows an example of how the short input phrase "men are created equal" can be disambiguated relative to an ontology hierarchy Index 10105 as in FIG. 101. The input "men are created equal" is so short, that rather than generate a full Ontology Query Array 10306, and then deal with each topological aspect of 10306, the table 10380 only examines a single aspect of "best fit" for two possible polygamous parses of "men are created equal" relative to the subtrees of Index 10105. In the first row of table 10380, the node "men are created" and the node "equal" are a first candidate for resolving the meaning of the input phrase. The best fit distance is calculated by the Distance Calculation 10120 from FIG. 101, resulting in a Rhetorical Distance of 21. The second row of table 10380 shows the node "men," skipping the Stopword "are" and showing the node "equal" as a second candidate for resolving the meaning of the input phrase. The best fit distance is calculated by the Common Hypernym 10210 method in FIG. 102, resulting in a Rhetorical Distance of 6. Since the second row has a shorter Rhetorical Distance, the parse results represented by the second row is chosen as best fit over the first row. The parse of the first row returns the node "men are created" and the node "equal" as the set of nodes disambiguated from the natural language input of "men are created equal."

Those skilled in the art of natural language disambiguation will recognize that a "best fit" technique as shown in table 10380 can be easily applied to fitting topological aspects of an exemplary ontology to subtrees connected to candidate node results from a Dictionary or Polysemy Index 10308, as described by Natural Language Disambiguation Method 10300.

In other aspects of the present invention, further improvements in the accuracy of detection of sentiments or emotions in text can be made by performing an analysis of sentiment or emotion based in part upon a measure of contextual sentiment and a contextual emotion similarity between rhetorically or ontologically similar texts. As an example, the FIG. 103 method 10300 may be used to detect emotions or sentiments of phrases as used in texts having similar ontologically meanings. For instance, the word "explosion" may often occur in texts conveying a sentiment of rapid change. When the method of FIG. 3 maps a Token Group contains the word "explosion" mapped to a placid Gene-num 316, the present invention may allow prevalent Gene-num 316 mappings for Token Groups containing the token "explosion" to contribute an weighted average sentiment to all Token Groups containing the token "explosion", thus increasing the accuracy of the analysis of method of FIG. 3. While the above is a very simple method for sharing sentiments, the above can also be further refined by aspects of the present invention by a weighted sharing of sentiment by the degree of rhetorical distance between their dictionary subtree ontologies as calculated by Shortest Rhetorical Distance Function 10320 in FIG. 103. This enables disambiguation results of FIG. 103 to improve Gene-num mappings of FIG. 3, similar to the way people reflect upon contextual allegorical meanings of words when sensing the sentiments imputed to them via dialog or discourse.

Story Quality Scoring

Figure 99:
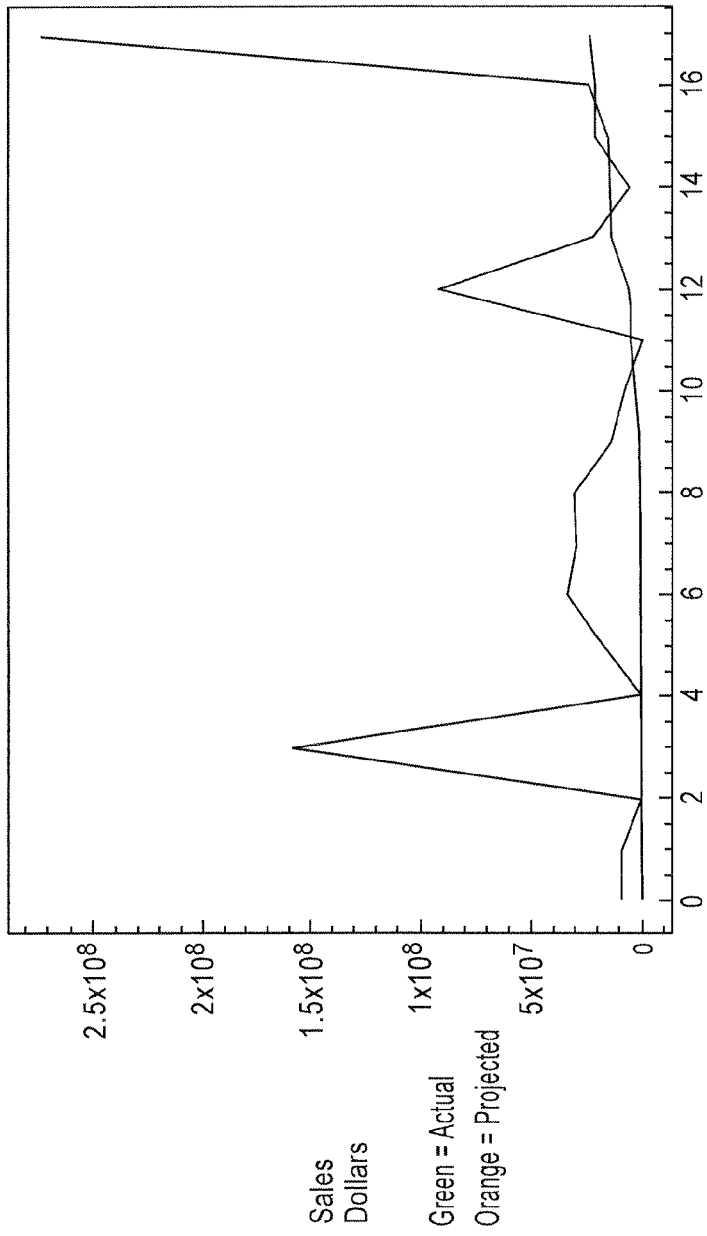

Returning to the method of story quality scoring of FIG. 79, FIG. 97 shows automatically generated scoring for the novel "Lord Of The Flies" by William Golding. Not only overall satisfaction score, but also dramatic startup speed and an overall objective characterization of the novel's mood are automatically calculated, using methods similar to the method shown in FIG. 79. The main characters are automatically assessed using the method of FIG. 79, and FIG. 97 shows a summary of the character development quality of the character of Ralph from the novel. Using the sentiment dimensions 8700 of FIG. 87, imbalances in the sentiment affect character development are reported in FIG. 97 and also in Author Advice in FIG. 98 which discusses all character in the novel automatically determined to need better character development. An example of the correlation between actual sales and automatically computed story satisfaction numbers is shown in the screen shot of FIG. 99. The Sales Dollars are shown in the exponential notation axis, whereas the integer number axis shows ordinal number of individual novels (sorted by increasing Satisfaction), which are listed by ordinal number in the screen-shot of FIG. 100. For instance, Lord of The Flies is novel number 10 on the ordinal axis of FIG. 99. Actual Sales are plotted by the jagged green-grey line, and automatically projected sales by Satisfaction model are plotted by the smoother brown-grey line. By plotting automatically computed satisfaction against actual sales, the graph of FIG. 99 shows that higher levels of Satisfaction correspond to higher minimum sales, so that novels above 100% Satisfaction have minimum sales in the millions. By publishing only novels with above 100% Satisfaction, the publishing industry stands to greatly increase their profitability, by concentrating on stories with more satisfyingly developed and resolved characters-arcs.

An advantage of the present invention over labor-intensive panels of human readers scoring novels and comparing them to book sales is the ability of the present invention to be precisely calibrated by varying the coefficients of the scoring components which contribute to overall score, as in FIG. 79 Impact Accumulator 7340. By precisely and automatically re-calibrating the method of FIG. 79 to actual book sales as in FIG. 100, sales projections can be made more accurately than in the prior art. In addition, the editorial advice, as shown in FIGS. 97 and 98 can be used by writers to improve existing works to commercial levels, offering writers with great concepts but scanty story telling skills an otherwise unavailable avenue to market.

Moreover, the rise in self-published but unreviewed works on web sites has created a need to automatically score works for satisfaction or readability, so that buyers can know in advance which books are worth purchasing.

Example Implementations

Aspects of the present invention (i.e., process 100, system 8200 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein that form part of the present invention. Rather, the operations are machine operations. Useful machines for performing the operation of the present invention include general purpose digital computers or similar devices.

Figure 86:
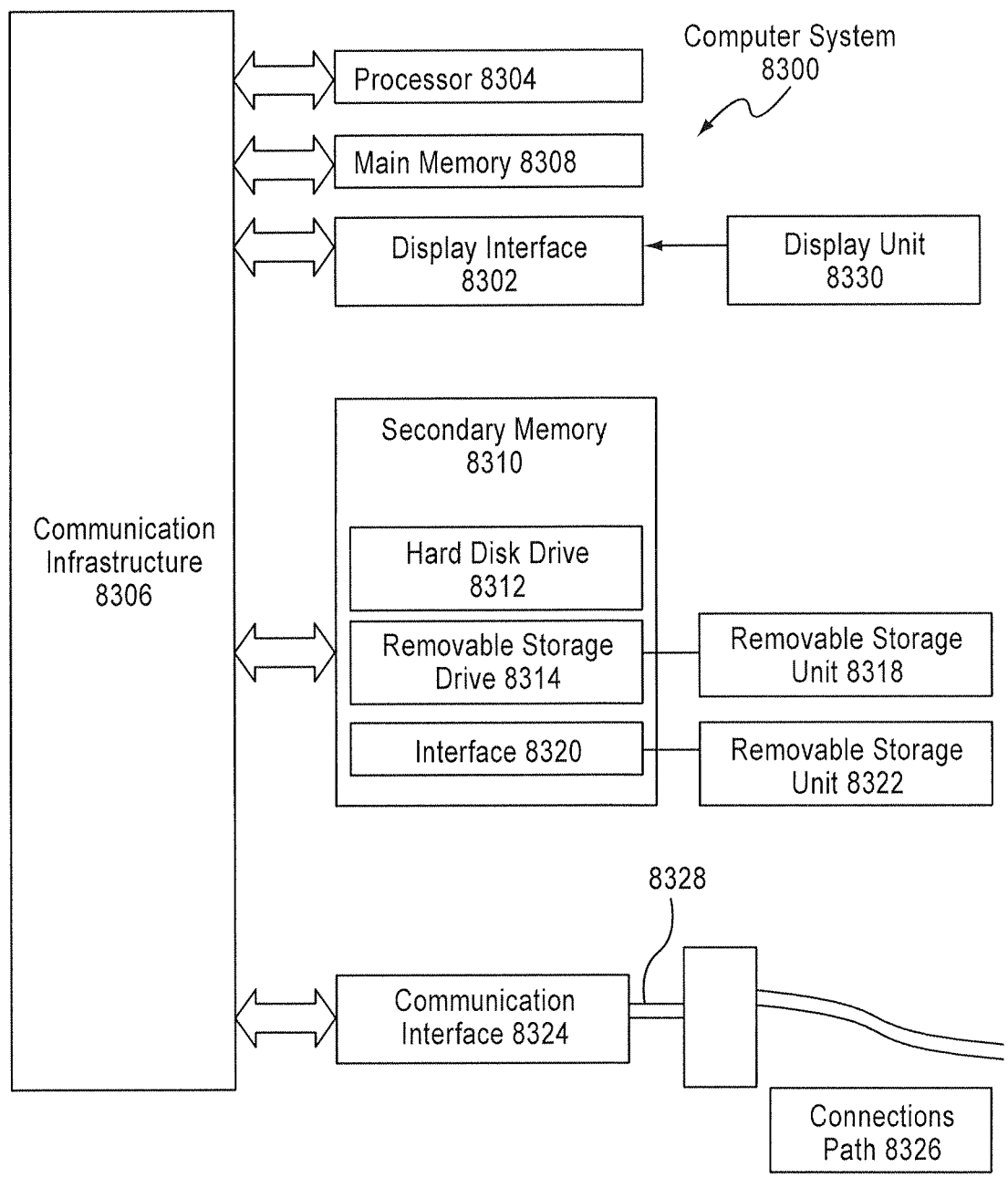
FIG. 86 is a block diagram of an exemplary computer system useful for implementing aspects of the present invention.

In fact, in one aspect, the invention is directed toward one or more computer systems capable of carrying out the functionality described herein. An example of a computer system 8300 is shown in FIG. 86.

The computer system 8300 includes one or more processors, such as processor 8304. The processor 8304 is connected to a communication infrastructure 8306 (e.g., a communications bus, cross-over bar, or network). Various software aspects are described in terms of this exemplary computer system. After reading this description, it will become apparent to a person skilled in the relevant art(s) how to implement aspects of the present invention using other computer systems and/or architectures.

Computer system 8300 can include a display interface 8302 that forwards graphics, text, and other data from the communication infrastructure 8306 (or from a frame buffer not shown) for display on the display unit 8330.

Computer system 8300 also includes a main memory 8308, preferably random access memory (RAM), and may also include a secondary memory 8310. The secondary memory 8310 may include, for example, a hard disk drive 8312 and/or a removable storage drive 8314, representing a floppy disk drive, a magnetic tape drive, an optical disk drive, etc. The removable storage drive 8314 reads from and/or writes to a removable storage unit 8318 in a well known manner. Removable storage unit 8318 represents a floppy disk, magnetic tape, optical disk, etc. which is read by and written to by removable storage drive 8314. As will be appreciated, the removable storage unit 8318 includes a computer usable storage medium having stored therein computer software and/or data.

In alternative aspects, secondary memory 8310 may include other similar devices for allowing computer programs or other instructions to be loaded into computer system 8300. Such devices may include, for example, a removable storage unit 8322 and an interface 8320. Examples of such may include a program cartridge and cartridge interface (such as that found in video game devices), a removable memory chip (such as an erasable programmable read only memory (EPROM), or programmable read only memory (PROM)) and associated socket, and other removable storage units 8322 and interfaces 8320, which allow software and data to be transferred from the removable storage unit 8322 to computer system 8300.

Computer system 8300 may also include a communications interface 8324. Communications interface 8324 allows software and data to be transferred between computer system 8300 and external devices. Examples of communications interface 8324 may include a modem, a network interface (such as an Ethernet card), a communications port, a Personal Computer Memory Card International Association (PCM-CIA) slot and card, etc. Software and data transferred via communications interface 8324 are in the form of signals 8328 which may be electronic, electromagnetic, optical or other signals capable of being received by communications interface 8324. These signals 8328 are provided to communications interface 8324 via a communications path (e.g., channel) 8326. This channel 8326 carries signals 8328 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 8314, a hard disk installed in hard disk drive 8312, and signals 8328. These computer program products provide software to computer system 8300. The invention is directed to such computer program products.

Computer programs (also referred to as computer control logic) are stored in main memory 8308 and/or secondary memory 8310. Computer programs may also be received via communications interface 8324. Such computer programs, when executed, enable the computer system 8300 to perform the features of the present invention, as discussed herein. In particular, the computer programs, when executed, enable the processor 8304 to perform the features of the present invention. Accordingly, such computer programs represent controllers of the computer system 8300.

In a variation implemented using software, the software may be stored in a computer program product and loaded into computer system 8300 using removable storage drive 8314, hard drive 8312 or communications interface 8324. The control logic (software), when executed by the processor 8304, causes the processor 8304 to perform the functions of the invention as described herein.

In another variation, aspects of the present invention are implemented primarily in hardware using, for example, hardware components such as application specific integrated circuits (ASICs). Implementation of the hardware state machine so as to perform the functions described herein will be apparent to persons skilled in the relevant art(s).

In yet another variation, aspects of the present invention are implemented using a combination of both hardware and software.

CONCLUSION

While various aspects of the present invention have been described above, it should be understood that they have been presented by way of example, and not limitation. It will be apparent to persons skilled in the relevant art(s) that various changes in form and detail can be made therein without departing from the spirit and scope illustrated herein. Thus, aspects of the present invention should not be limited by any of the above described exemplary aspects.

In addition, it should be understood that the figures and screen shots illustrated in the attachments, which highlight the functionality and advantages in accordance with aspects of the present invention, are presented for example purposes only. The architecture illustrated herein is sufficiently flexible and configurable, such that it may be utilized (and navigated) in ways other than that shown in the accompanying figures.

I claim:

1. A computer implemented method for automatically generating a computer analysis of a text comprising a plurality of words, the computer comprising a processor and a user interface, the method comprising:
    receiving the text;
    performing, via the processor, token-by-token analysis by tagging tokens of the text, based on mappings of literary DNA, with one of a contextual sentiment and a contextual emotion, wherein each of the tokens comprises letters or phonemes mapped to numbers, used to map literary DNA;
    performing, via the processor, a segmentation analysis of the text using one of a dimension of sentiment and an emotional analysis and a rhetorical structure analysis; and
    outputting, via the user interface, the computer analysis of the text;
    wherein the computer analysis includes a classification, a categorization or a sorting of the text according to one of a sentiment, an emotion, a rhetorical structure and an ontological similarity.

2. The computer implemented method according to claim 1, wherein the dimension of sentiment is one of single-dimensional and multi-dimensional.

3. The computer implemented method according to claim 1, the text comprising a character, the method further comprising:
    performing, via the processor, character-arc development; and
    performing, via the processor, character resolution;
    wherein the character-arc development and the character resolution are tracked along co-occurrences of the character with single- or multi-dimensional shifts in a sentiment or emotions in the text.

4. The computer implemented method according to claim 1, the text comprising a character, the method further comprising:
    performing, via the processor, thematic development, tracked independently or along co-occurrences of the character, with single- or multi-dimensional shifts in a sentiment or emotion in the text.

5. The computer implemented method according to claim 3, the text having a text story, the method further comprising:
    determining, via the processor, a quality of the text story, using a scoring system calibrated to actual sales of a sold text having a sold text story.

6. The computer implemented method according to claim 1, the text having an associated individual, the method further comprising:
    generating, via the processor, a tool to improve the text for use by the individual.

7. The computer implemented method according to claim 1, the text comprising content, the content having a class, the method further comprising:
    matching the class of the content of the text, the content being selected from the group consisting of advertising content, non-advertising content, peer-reviewed content, non-peer-reviewed content, controversial court decisions, and non-controversial court decisions.

8. The computer implemented method according to claim 1, the computer analysis including a classification, a categorization or a sorting of the text according to a sentiment, the outputting being performed via a primary-color display module that indicates a dimension of the sentiment.

9. The computer implemented method according to claim 1, the computer analysis including a classification of the text into classes, the outputting being performed via a primary-color display module that indicates the classes.

10. The computer implemented method according to claim 1, further comprising:
    generating a quality measure of the text for informing potential readers of the quality of text.

11. The computer implemented method according to claim 1, further comprising:
    performing, via the processor, anaphor resolution of the text.

12. The computer implemented method according to claim 1, wherein the user interface is a conversation interface.

13. The computer implemented method according to claim 1, further comprising:
    performing an analysis of sentiment or emotion based on a measure of contextual sentiment and a contextual emotion similarity between rhetorically or ontologically similar texts.

14. A system for automatically generating a computer analysis of a text comprising a plurality of words, the system comprising a computer processor and a user interface, the system further comprising:
    a receiving module for receiving the text;
    a first performing module for performing, via the processor, token-by-token analysis by tagging tokens of the text, based on mappings of literary DNA, with one of a contextual sentiment and a contextual emotion, wherein each of the tokens comprises letters or phonemes mapped to numbers, used to map literary DNA;

a second performing module for performing, via the processor, a segmentation analysis of the text using one of a dimension of sentiment and an emotional analysis; and an output module for outputting, via the user interface, the computer analysis of the text;

wherein the computer analysis includes a classification, a categorization, a disambiguation of the text or a sorting of the text according to one of a sentiment, an emotion and an ontological similarity.

15. The system according to claim 14, further comprising:

an analysis module for analyzing sentiment or emotion based on a measure of contextual sentiment and a contextual emotion similarity between rhetorically or ontologically similar texts.

16. The system according to claim 14, the text comprising a character, the system further comprising:

a first performing module for performing, via the processor, character-arc development; and a second performing module for performing, via the processor, character resolution;

wherein the character-arc development and the character resolution are tracked along co-occurrences of the character with single- or multi-dimensional shifts in a sentiment or an emotions in the text.

17. A system for automatically generating a computer analysis of a text comprising a plurality of words, the system comprising:

a processor;

a user interface functioning via the processor; and a repository accessible by the processor;

wherein a text including a plurality of words is received;

wherein token-by-token analysis is performed via the processor by tagging tokens of the text, based on mappings of literary DNA, with one of a contextual sentiment and a contextual emotion, wherein each of the tokens comprises letters or phonemes mapped to numbers, used to map literary DNA;

wherein a segmentation analysis of the text is performed via the processor using one of a dimension of sentiment and an emotional analysis; and wherein the computer analysis of the text is outputted via the user interface, the computer analysis including a classification, a categorization, a disambiguation of the text or a sorting of the text according to one of a sentiment, an emotion and an ontological similarity.

18. The system according to claim 17, wherein an analysis of sentiment or emotion is performed based on a measure of contextual sentiment and a contextual emotion similarity between rhetorically or ontologically similar texts.

19. A computer program product comprising a non-transitory computer usable medium having control logic stored therein for causing a computer to automatically generate a computer analysis of a text comprising a plurality of words, the computer comprising a processor and a user interface, the control logic comprising:

first computer readable program code means for receiving the text;

second computer readable program code means for performing, via the processor, token-by-token analysis by tagging tokens of the text, based on mappings of literary DNA, with one of a contextual sentiment and a contextual emotion, wherein each of the tokens comprises letters or phonemes mapped to numbers, used to map literary DNA;

third computer readable program code means for performing, via the processor, a segmentation analysis of the text using one of a dimension of sentiment and an emotional analysis and a rhetorical structure analysis; and fourth computer readable program code means for outputting, via the user interface, the computer analysis of the text;

wherein the computer analysis includes a classification, a categorization or a sorting of the text according to one of a sentiment, an emotion, a rhetorical structure and an ontological similarity.

* * * * *